(12) United States Patent
Sugasaki

(10) Patent No.: US 8,822,126 B2
(45) Date of Patent: Sep. 2, 2014

(54) RESIN COMPOSITION FOR LASER ENGRAVING, RELIEF PRINTING PLATE PRECURSOR FOR LASER ENGRAVING, RELIEF PRINTING PLATE, AND METHOD OF MANUFACTURING RELIEF PRINTING PLATE

(75) Inventor: Atsushi Sugasaki, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 888 days.

(21) Appl. No.: 12/379,334

(22) Filed: Feb. 19, 2009

(65) Prior Publication Data

US 2009/0220752 A1 Sep. 3, 2009

(30) Foreign Application Priority Data

Feb. 28, 2008 (JP) ................. 2008-048109

(51) Int. Cl.
| | | |
|---|---|---|
| B32B 5/00 | (2006.01) | |
| C08G 79/08 | (2006.01) | |
| C08F 30/06 | (2006.01) | |
| G03F 7/004 | (2006.01) | |
| B29C 35/08 | (2006.01) | |
| G03F 7/20 | (2006.01) | |

(52) U.S. Cl.
USPC ..... 430/270.1; 430/306; 430/300; 430/287.1; 427/508; 427/510; 252/501.1; 428/411.1; 428/195.1; 264/400; 525/10; 525/457; 525/460; 524/460; 524/457

(58) Field of Classification Search
USPC ........ 428/411.1; 427/508, 510; 524/457, 460; 525/10
See application file for complete search history.

(56) References Cited

U.S. PATENT DOCUMENTS

| | | | |
|---|---|---|---|
| 5,607,814 A | 3/1997 | Fan et al. | |
| 5,798,202 A | 8/1998 | Cushner et al. | |
| 5,804,353 A * | 9/1998 | Cushner et al. | 430/306 |
| 6,020,108 A | 2/2000 | Goffing et al. | |
| 6,159,659 A | 12/2000 | Gelbart | |
| 6,194,125 B1 | 2/2001 | Goffing et al. | |
| 6,214,521 B1 | 4/2001 | Telser et al. | |
| 6,403,670 B1 * | 6/2002 | Ishidoya et al. | 522/6 |
| 2003/0180636 A1 | 9/2003 | Kanga et al. | |
| 2003/0180655 A1 | 9/2003 | Fan et al. | |
| 2004/0131971 A1 * | 7/2004 | Sugasaki et al. | 430/281.1 |
| 2006/0199097 A1 * | 9/2006 | Oda et al. | 430/270.1 |
| 2008/0038663 A1 * | 2/2008 | Sugasaki | 430/270.1 |

FOREIGN PATENT DOCUMENTS

| | | |
|---|---|---|
| JP | 09-171247 A | 6/1997 |
| JP | 2773847 B | 7/1998 |
| JP | 2846954 B | 1/1999 |
| JP | 11-170718 A | 6/1999 |
| JP | A 11-170718 | 6/1999 |
| JP | 11-338139 A | 12/1999 |
| JP | A 11-338139 | 12/1999 |
| JP | 2000-168253 A | 6/2000 |
| JP | A 2000-168253 | 6/2000 |
| JP | 2000298344 A | 10/2000 |
| JP | 2000-318330 A | 11/2000 |
| JP | 2002-357907 A | 12/2002 |
| JP | A 2002-357907 | 12/2002 |
| JP | 2004-262135 A | 9/2004 |
| JP | A 2004-262135 | 9/2004 |

OTHER PUBLICATIONS

Hiller M et al.:Materials Research Innovations, vol. 6, 2002,pp. 179-184, XP002532727.
Otsuka H et al: Macromolecules, vol. 32, 1999, pp. 9059-9061, XP002532728.
Otsuka H et al: "Novel Reactive Polymers Containing Hemiacetal Ester and Vinyl Moieties: Synthesis and Selective Polymerization of 1-Methoxyallyl Methacrylate Derived From Methacrylic Acid and Methoxyallene"Macromolecular:Rapid Communications, Wiley VCH Verlag, Weinheim, DE,vol. 22,No. 16, Nov. 7, 2001,pp. 1335-1339, XP001113462 ISSN:1022-1336.

* cited by examiner

Primary Examiner — Harold Pyon
Assistant Examiner — Katie L Hammer
(74) Attorney, Agent, or Firm — SOLARIS Intellectual Property Group, PLLC

(57) ABSTRACT

The invention provides a resin composition for laser engraving, having a binder polymer containing at least one of a structure unit represented by the following Formula (I) or a structure unit represented by the following Formula (II). In the Formulae, Q represents a partial structure which provides an acid group having an acid dissociation constant pKa of 0 to 20 when it is in the form of -Q-H; $R^1$ to $R^3$ each independently represent a hydrogen atom or a monovalent organic group; and A and B each independently represent a bivalent organic connecting group. The invention further provides a relief printing plate precursor having a relief forming layer containing the resin composition, a method for manufacturing a relief printing plate having crosslinking components of the relief forming layer and laser engraving the relief forming layer, and a relief printing plate formed thereby.

(I-1)
H-Q-A-Q-H

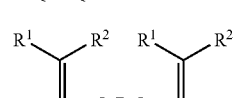

(II-1)

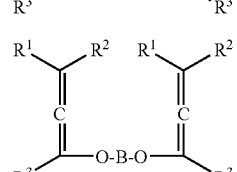

(II-2)

16 Claims, No Drawings

RESIN COMPOSITION FOR LASER ENGRAVING, RELIEF PRINTING PLATE PRECURSOR FOR LASER ENGRAVING, RELIEF PRINTING PLATE, AND METHOD OF MANUFACTURING RELIEF PRINTING PLATE

CROSS-REFERENCE TO RELATED APPLICATION

This application claims priority under 35 USC 119 from Japanese Patent Application No. 2008-048109 filed on Feb. 28, 2008, the disclosure of which is incorporated by reference herein.

BACKGROUND OF THE INVENTION

1. Technical Field

The present invention relates to a resin composition for laser engraving, a relief printing plate precursor for laser engraving, a relief printing plate, and a method of manufacturing a relief printing plate.

2. Description of the Related Art

As a method for forming a printing plate by forming a concave-convex structure on a photosensitive resin layer laminated over the surface of a support, a method of exposing a relief forming layer which has been formed using a photosensitive composition, to ultraviolet radiation through an original image film so as to selectively cure image areas, and removing uncured parts by means of a developer solution, that is, so-called "analogue plate making", is well known.

A relief printing plate is a letterpress printing plate having a relief layer with a concave-convex structure, and such a relief layer having a concave-convex structure may be obtained by patterning a relief forming layer formed from a photosensitive composition containing, as a main component, for example, an elastomeric polymer such as synthetic rubber, a resin such as a thermoplastic resin, or a mixture of a resin and a plasticizer, to thus form a concave-convex structure. Among such relief printing plates, a printing plate having a flexible relief layer is often referred to as a flexo plate.

In the case of producing a relief printing plate by analogue plate making, since an original image film using a silver salt material is needed in general, the plate making process requires time and costs for the production of original image films. Furthermore, since chemical treatments are required in the development of original image films, and also treatments of development waste water are necessary, investigations on simpler methods of plate making, for example, methods which do not use original image films or methods which do not necessitate development treatments, are being undertaken.

SUMMARY

In recent years, a method of making a plate having a relief forming layer by means of scanning exposure, without requiring an original image film, is being investigated.

As a technique which does not require an original image film, there has been proposed a relief printing plate precursor in which a laser-sensitive type mask layer element capable of forming an image mask is provided on a relief forming layer (see, for example, Japanese Patent No. 2773847 and Japanese Patent Application Laid-Open (JP-A) No. 9-171247). The method of making such a plate precursor is referred to as a "mask CTP method", because an image mask having the same function as the original image film is formed from the mask layer element by means of laser irradiation that is based on image data. This method does not require an original image film, but the subsequent plate making treatment involves a process of exposing the plate precursor to ultraviolet radiation through an image mask, and then removing uncured parts by development, and from the viewpoint of requiring a development treatment, the method has a room for further improvement.

As a method of plate making which does not require a development process, a so-called "direct engraving CTP method", in which plate making is carried out by directly engraving a relief forming layer using laser, has been proposed a number of times. The direct engraving CTP method is literally a method of forming a concave-convex structure which will serve as relief, by engraving the structure with laser. This method is advantageous in that the relief shape can be freely controlled, unlike the relief formation processes using original image films. For this reason, in the case of forming images like cutout characters, it is possible to engrave the image regions deeper than other regions, or for microdot images, to carry out shouldered engraving in consideration of resistance to the printing pressure, or the like.

However, in this method, since high energy is required to form a relief having a concave-convex structure which can withstand the printing pressure, on a relief forming layer having a predetermined thickness, and the speed of laser engraving is slow, the method has a problem of low productivity as compared to the methods in which image formation involves the use of a mask.

For this reason, it has been attempted to enhance the sensitivity of a relief printing plate precursor. For example, a flexographic printing plate precursor for laser engraving which includes an elastomer foam has been proposed (see JP-A Nos. 2002-357907 and 2000-318330). In this technology, an attempt is made to improve the engraving sensitivity by using a low density foamed material in a relief forming layer. However, due to being a foamed material having low density, there is a concern to the obtained printing plate with respect to lack of strength or the like, which might cause seriously impaired print durability.

Japanese Patent No. 2846954 and JP-A Nos. 11-338139 and 11-170718 disclose a flexographic plate precursor that can be processed by laser engraving or a flexographic plate obtained by laser engraving. In these documents, a flexographic plate is obtained by mixing a monomer with an elastomeric rubber as a binder, curing the mixture by a thermal polymerization mechanism or a photopolymerization mechanism, and then carrying out laser engraving.

Direct engraving CTP systems may exhibit a slow speed of laser engraving, because the thickness of the layer to be removed by the engraving is necessarily at least 100 μm in the direct engraving CTP system in view of the function of directly forming a relief, while the thickness of a mask layer element to be abraded is about 1 μm to 10 μm in the mask CTP systems. In view of addressing this, several proposals have been made for improving the sensitivity of a material to be engraved with respect to a laser (laser engraving sensitivity).

For example, a flexographic printing plate precursor for laser engraving containing microspheres in which a hydrocarbon-based gas is encapsulated has been proposed (US No. 2003/180636). This technique aims for improvement of the engraving sensitivity by a system of expanding the gas in the microsphere due to heat generated by a laser to collapse a material to be engraved. However, since the material system thereof contains bubbles, the strength thereof tends to be insufficient to be used as a printing plate. Further, a gas tends to expand due to heat compared with a solid, and change in its volume due to change in an external temperature is inevitable even when a microsphere of high thermal deformation starting temperature is selected. Therefore, use of a bubble-containing material is not suitable to a printing plate, which requires stability in the accuracy of depth.

A resin letterpress printing plate for laser engraving which contains a polymeric filler having a ceiling temperature of less than 600 K has also been proposed (see JP-A No. 2000-168253). In this technology, an attempt is made to improve the engraving sensitivity by adding a polymeric filler having a low depolymerization temperature. However, when such a polymeric filler is used, surface irregularities may be generated on the surface of the printing plate precursor, and may seriously affect the printing quality.

A composition which contains a hemiacetal ester compound as a unit configurating a resin of excellent thermal decomposability and inorganic porous fine particles and has good removability of engraving waste has been proposed (for example, in JP-A No. 2004-262135). The hemiacetal ester compound, which is shown as a unit configurating a resin of excellent thermal decomposability, is exemplified as a means for liquefying engraving waste. However, the decomposability of the composition obtained by the mere addition of the hemiacetal ester compound has been insufficient in view of increasing the engraving sensitivity, and improvement has been demanded.

As described above, various techniques have been proposed with respect to resin compositions that can be suitably used for a relief forming layer in a relief printing plate precursor for laser engraving, but a resin composition having high engraving sensitivity when subjected to laser engraving has not yet been provided at present.

The present invention has been achieved by taking the above circumstances into consideration. The present invention provides a resin composition for laser engraving which reveals high engraving sensitivity when subjected to laser engraving. The present invention further provides a relief printing plate precursor for laser engraving which reveals high engraving sensitivity and can be used for direct plate-making by laser engraving, a method of manufacturing a relief printing plate for laser engraving using the relief printing plate precursor, and a relief printing plate formed by the manufacturing method.

As a result of intensive research, the present inventors have found that the laser engraving sensitivity can be increased by utilizing a binder polymer having an acetal structure, which lead to the achievement of the present invention, Namely, a first aspect of the invention provides a resin composition for laser engraving, comprising a binder polymer comprising at least one of a structure unit represented by the following Formula (I) or a structure unit represented by the following Formula (II):

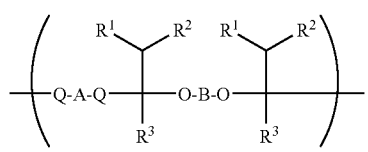

(I)

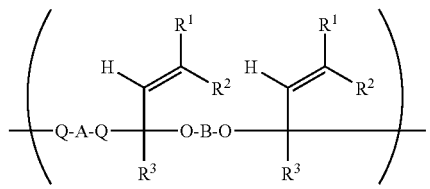

(II)

wherein Q represents a partial structure which provides an acid group having an acid dissociation constant pKa of 0 to 20 when it is in the form of -Q-H; $R^1$ to $R^3$ each independently represent a hydrogen atom or a monovalent organic group; and A and B each independently represent a bivalent organic connecting group.

The invention further provides, as a second aspect, a relief printing plate precursor for laser engraving, comprising a relief forming layer, the relief forming layer comprising the resin composition for laser engraving.

The invention further provides, as a third aspect, a method for manufacturing a relief printing plate, the method comprising: crosslinking at least a part of components of the relief forming layer of the relief printing plate precursor for laser engraving by at least one of light or heat; and laser engraving the relief forming layer subjected to the crosslinking to form a relief layer.

The invention further provides, as a fourth aspect, a relief printing plate, comprising a relief layer provided over a support and manufactured by the method for manufacturing a relief printing plate.

DETAILED DESCRIPTION

Resin Composition for Laser Engraving

The resin composition for laser engraving of the invention contains at least, as a binder polymer (A), a polymer containing a partial structure represented by the following Formula (I) and a partial structure represented by the following Formula (II). The resin composition for laser engraving of the invention may be hereinafter simply referred as a "resin composition of the invention".

The resin composition of the invention has high engraving sensitivity when subjected to laser engraving. Accordingly, when the resin composition of the invention is used, the laser engraving can be carried out at a high speed. Accordingly, the time necessary for engraving can be shortened, and thus the resin composition may be excellent in the productivity. Further, since the resin composition of the invention can form deeper impression than conventional resin compositions for laser engraving by application of a unit amount of energy, it may also be suitable for forming a highly precise image.

The resin composition of the invention, which has the characteristics as described above, can be used in a wide range of applications for resin-formed objects to be subjected to laser engraving without particular limitation. Specific examples of the application of the resin composition of the invention include a relief forming layer of a printing plate precursor from which a convex relief is formed by laser engraving, an intaglio printing plate, a stencil printing plate, and stamp, while the invention is not limited to these. The resin composition of the invention can be particularly preferably used for a relief forming layer of a printing plate precursor for laser engraving.

(A) Binder Polymer Having at Least One of Partial Structure Represented by Formula (I) and Partial Structure Represented by Formula (II)

The resin composition of the invention contains a binder polymer having at least one of the structure unit represented by the following Formula (I) and the structure unit represented by the following Formula (II).

The binder polymer is hereinafter sometimes referred to as a "specific polymer (A)". The specific polymer (A) used in the invention has a hemiacetal ester structure in the main chain thereof as understood from the structure shown below.

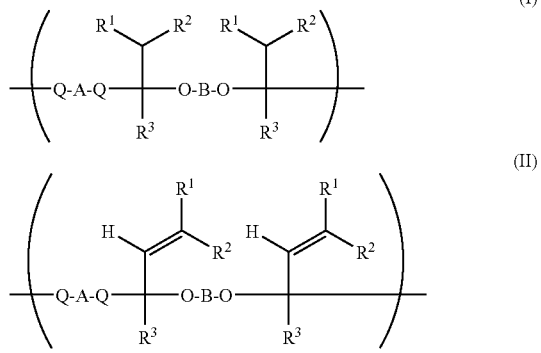

In Formula (I) and Formula (II), Q represents a partial structure which provides an acid group having an acid dissociation constant (pKa) of 0 to 20 when it is in the form of -Q-H.

$R^1$ to $R^3$ each independently represent a hydrogen atom or a monovalent organic group, and A and B each independently represent a bivalent organic connecting group.

It is remarked that there has been very few reports regarding polymers having a hemiacetal ester structure in its main chain. For example, Ohtsuka et al. have reported a thermal decomposition behavior of a polymer having a hemiacetal ester structure in its main chain (Macromolecules, Vol. 32, pp. 9059-9061 (1999)). However, there has been little information regarding the application of such a polymer, while JP-A No. 2000-298344 teaches a positive photosensitive resin composition which contains such a polymer in combination with a photoacid generator and an inorganic powder and has storage stability and high resolution.

JP-A No. 2007-316508 reports a decomposable composition containing, as essential ingredients, a hemiacetal ester compound as a non-polymer having a molecular weight of 500 to 3000 and a carboxylic acid. However, the composition has the alkali solubility which is changed by heating, and involves low film strength and insufficient engraving sensitivity for being applied to a relief forming layer as intended in the invention.

The invention provides a resin composition for laser engraving that can be suitably used to a recording layer of a relief printing plate precursor, specifically, a resin composition capable of attaining excellent laser engraving sensitivity by specifying the structure of the polymer, and preferably further containing a photothermal conversion agent, a polymerizable compound, and/or a polymerization initiator in combination.

In the resin composition for laser engraving of the invention, when near infrared laser engraving is carried out, a compound with a maximum absorption wavelength of which being in a range of about 700 nm to about 1300 nm absorbs light due to infrared laser irradiation and causes photothermal conversion so that a binder polymer present in a region which is exposed to the infrared laser is thermally decomposed and resultants of the decomposition are dissipated to achieve engraving.

While the reaction mechanism of the specific polymer (A) in the resin composition for laser engraving of the invention is not completely clarified, it is estimated as follows.

The specific polymer (A) according to the invention has, in the main chain thereof, a structure unit represented by Formula (I) or Formula (II), which is a hemiacetal ester structure which can be extremely easily thermally cleaved in view of organic chemistry. Accordingly, the specific polymer (A) can have excellent thermal decomposability at low temperature to result in the phenomenon of promoting thermal decomposition at high sensitivity. Further, most of low molecular weight compounds formed by the thermal decomposition can be dissipated at a relatively low temperature of lower than 250° C. Accordingly, the low molecular weight compounds formed in the region decomposed by thermal decomposition may rapidly dissipate. It is thus considered that the laser engraving of the resin composition for laser engraving of the invention extremely efficiently occurs. That is, the laser engraving sensitivity of the resin composition of the invention is considered to have been extremely increased because the resin composition of the invention is excellent in both of the thermal decomposability and the dissipation property of the compound formed by thermal decomposition.

Further, since activation energy for thermal decomposition of the polyhemiacetal ester is lower than that of general-purpose polymers such as PVA or polyurethane, it can be said from a kinetic viewpoint as well as a thermodynamical viewpoint that thermal decomposability of the polyhemiacetal ester is higher. Accordingly, as compared with PVA and polyurethane, which are usually used for the relief forming layer in the relief plate, the relief forming layer which is formed to contain the polyhemiacetal ester as a main ingredient of the binder polymer can perform recording at a high sensitivity to laser exposure, and can attain engraving to a deeper portion of the relief forming layer compared with that in conventional techniques for a unit amount of energy to be applied to achieve high engraving sensitivity.

The activation energy for the thermal decomposition of a compound can be easily calculated by a known method such as that described in "New edition, Thermal Analysis" edited by Hirotaro Kobe, Fumio Ozawa, and published from Kodansha Co. (1992), in pp. 57 to 86.

In the specific polymer (A) of the invention, the partial structure "Q" gives a most significant effect on the thermal decomposability of the structural unit represented by Formula (I) or Formula (II).

"Q" represents a partial structure which provides an acid group having an acid dissociation constant (pKa) of 0 to 20 when it is in the form of -Q-H. Examples of the functional group having -Q-H with pKa of 0 to 20 include aromatic alcohols and aliphatic alcohols having a substituent which has the electron donative property which is higher than that of a hydrogen atom. Examples of such substituent include an alkyl group and an alkoxy group.

With a viewpoint of achieving both of improvement in the engraving sensitivity and the thermal stability at a normal temperature, the pKa of -Q-H is preferably from 0 to 11, more preferably from 2 to 10, and particularly preferably from 3 to 6.

Specific examples of the acid group having pKa of -Q-H of 11 or less include the followings.

1. Acid Group Having Acid Dissociation Constant (pKa) of 0 or More and Less Than 5.5

Examples of the acid group having an acid dissociation constant (pKa) of 0 or more and less than 5.5 include a sulfonic acid group, a phosphoric acid group, and a carboxylic acid group, and particularly preferable examples thereof include the carboxylic group. Specific examples of the structure containing the carboxylic group include acrylic acid, methacrylic acid, itaconic acid, crotonic acid, isocrotonic acid, maleic acid, and p-carboxylstyrene. Particularly preferable are acrylic acid, methacrylic acid, and p-carboxylstyrene. One or more of them can be used in combination.

2. Acid Group Having Acid Dissociation Constant (pKa) of 5.5 or More and 11 or Less Specific examples of the acid group having an acid dissociation constant (pKa) of 5.5 to 11 include phenol group (pKa=9.99), 2-methoxyphenol group (pKa=9.99), 2-chlorophenol group (pKa=8.55), 2-methylhydroxy benzoate (pKa=9.87), 4-methylphenol group (pKa=10.28), 1,3-benzenediol group (pKa=9.20), 1-naphthol group (pKa=9.30), 1,2-benzenediol group (pKa=9.45), benzene sulfone amide group (pKa=10.00), N-acetylphenylbenzene sulfone amide group (pKa=6.94), 4-aminobenzene sulfone amide group (pKa=10.58), N-phenyl-4-aminobenzene sulfone amide group (pKa=6.30), N-(4-acetylphenyl)-4-aminobenzene sulfone amide group (pKa=7.61), and ethyl acetyl acetate group (pKa=10.68). Among them, phenol groups which may have a substituent on the aromatic group and benzene sulfone amide groups which may have a substituent on the aromatic group are more preferable.

The acid dissociation constant pKa shown in the specific examples are values described in "IONISATION CONSTANTS OF ORGANIC ACIDS IN AQUEOUS SOLUTION" written by E. P. Serjeant et al. and "LANGE'S HANDBOOK OF CHEMISTRY" written by John A. Dean.

Among the embodiments of Q-H having pKa of 3 to 6, most preferable embodiments include those in which Q is a carboxyl group (—C(=O)O—), that is, those in which -Q-H is a carboxylic acid group.

In Formulae (I) and (II), A and B each independently represent a bivalent organic connecting group, and more specific groups thereof include an aliphatic connecting group, an alicyclic connecting group, an aromatic connecting group, and a heterocyclic connecting group. These connecting groups may further have a substituent. Among them, the aliphatic connecting group, the alcyclic connecting group and the aromatic connecting group are preferable, and the aliphatic connecting group and the alicyclic connecting group are more preferable with a viewpoint of excellent heat decomposability of the specific polymer (A), excellent heat dissipation properly of the compound formed by decomposition of the specific polymer (A) to improve the engraving sensitivity. Particularly preferable embodiment of the invention may contain the alicyclic connecting group as a partial structure in at least one of A and B.

Examples of the substituent which can be introduced into the bivalent organic connecting group include a non-metallic atomic group other than a hydrogen atom, and specific examples thereof include: a halogen atom (—F, —Br, —Cl, —I), a hydroxyl group, an alkoxy group, an aryloxy group, a mercapto group, an alkylthio group, an aryl thio group, an alkyldithio group, an aryldithio group, an amino group, a N-alkylamino group, a N,N-dialkylamino group, a N-arylamino group, a N,N-diarylamino group, a N-alkyl-N-arylamino group, an acyloxy group, a carbamoyloxy group, a N-alkylcarbamoyloxy group, a N-aryl carbamoyloxy group, a N,N-dialkylcarbamoyloxy group, a N,N-diarylcarbamoyloxy group, a N-alkyl-N-aryl carbamoyloxy group, an alkylsulfoxy group, an arylsulfoxy group, an acylthio group, an acylamino group, a N-alkylacylamino group, a N-arylacylamino group, ureide group, a N'-alkylureide group, a N',N'-dialkylureide group, a N'-arylureide group, a N',N'-diarylureide group, an a N'-alkyl-N'-arylureide group, a N-alkylureide group, a N-arylureide group, a N'-alkyl-N-alkylureide group, a N'-alkyl-N-arylureide group, a N',N'-dialkyl-N-alkylureide group, a N',N'-dialkyl-N-arylureide group, a N'-aryl-N-alkylureide group, a N'-aryl-N-arylureide group, a N',N'-diaryl-N-alkylureide group, a N',N'-diaryl-N-arylureide group, a N'-Alkyl-N'-aryl-N-alkylureide group, a N'-alkyl-N'-aryl-N-arylureide group, an alkoxycarbonylamino group, an aryloxycarbonylamino group, a N-alkyl-N-alkoxycarbonylamino group, a N-alkyl-N-aryloxycarbonyl amino group, a N-aryl-N-alkoxycarbonylamino group, a N-aryl-N-aryloxycarbonylamino group, formyl group, an acyl group, carboxyl group, an and its conjugate base group, an alkoxycarbonyl group, an aryloxy carbonyl group, a carbamoyl group, a N-alkylcarbamoyl group, a N,N-dialkylcarbamoyl group, a N-arylcarbamoyl group, a N,N-diaryl carbamoyl group, a N-alkyl-N-arylcarbamoyl group, an alkylsulfinyl group, an arylsulfinyl group, an alkylsulfonyl group, an arylsulfonyl group, a sulfo group (—$SO_3H$) and its conjugate base group, an alkoxysulfonyl group, an aryloxysulfonyl group, a sulfinamoyl group, a N-sulfinamoyl group, a N,N-dialkylsulfinamoyl group, a N-aryl sulfinamoyl group, a N,N-diarylsulfinamoyl group, a N-alkyl-N-arylsulfinamoyl group, a sulfamoyl group, a N-alkylsulfamoyl group, a N,N-dialkylsulfamoyl group, a N-arylsulfamoyl group, a N,N-diarylsulfamoyl group, a N-alkyl-N-arylsulfamoyl group, a N-acylsulfamoyl group, an and its conjugate base group, a N-alkylsulfonylsulfamoyl group (—$SO_2NHSO_2$(alkyl)) and its conjugate base group, a N-arylsulfonylsulfamoyl group (—$SO_2NHSO_2$(aryl)) and its conjugate base group, a N-alkylsulfonylcarbamoyl group (—$CONHSO_2$(alkyl)) and its conjugate base group, a N-arylsulfonylcarbamoyl group (—$CONHSO_2$(aryl)) and its conjugate base group, an alkoxysilyl group (—Si(O-alkyl)$_3$), an aryloxysilyl group (—Si(O-aryl)$_3$), a hydroxysilyl group (—Si(OH)$_3$) and its conjugate base group, a phosphono group (—$PO_3H_2$) and its conjugate base group, a dialkylphosphono group (—$PO_3$(alkyl)$_2$), a diarylphosphono group (—$PO_3$(aryl)$_2$), an alkylarylphosphono group (—$PO_3$(alkyl)(aryl)), a monoalkylphosphono group (—$PO_3H$(alkyl)) and its conjugate base group, a monoarylphosphono group (—$PO_3H$(aryl)) and its conjugate base group, a phosphonooxi group (—$OPO_3H_2$) and its conjugate base group, a dialkylphosphonooxy group (—$OPO_3$(alkyl)$_2$), a diarylphosphono oxi group (—$OPO3$(aryl)$_2$), alkylarylphosphono oxy-group (—$OPO_3$(alkyl)(aryl)), a monoalkylphosphonooxy group (—$OPO_3H$(alkyl)) and its conjugate base group, a monoarylphosphonooxy group (—$OPO_3H$(aryl)) and its conjugate base group, a cyano group, a Nitro group, an aryl group, an alkenyl group, an alkynyl group.

Specific examples of the substituent further include a dialkylboryl group (—B(alkyl)$_2$), a diarylboryl group (—B(aryl)$_2$), an alkylarylboryl group (—B(alkyl)(aryl)), a dihydroxyboryl group (—B(OH)$_2$) and conjugated basic groups thereof, an alkylhydroxyboryl group (—B(alkyl)(OH)) and conjugated basic groups thereof, and an aryl hydroxyboryl group (—B(aryl)(OH)) and conjugated basic groups thereof.

In Formulae (I) and (II), $R^1$ and $R^2$ each independently represent a hydrogen atom or a monovalent organic group, and examples of the monovalent organic group include an aliphatic group, an alicyclic group, an aromatic group, and a heterocyclic group.

Among them, with a viewpoint of improving the engraving sensitivity and the adaptability in synthesis, $R^1$ and $R^2$ preferably each independently represent a hydrogen atom, a monovalent aliphatic group or a monovalent alicyclic group, and more preferably each independently represent a hydrogen atom or a monovalent aliphatic group, and particularly preferably each represent a hydrogen atom. While the plural $R^1$ and $R^2$ present in one molecule may be the same or different with each other, they are preferably the same with a viewpoint of the synthesis adaptability.

$R^3$ represents a hydrogen atom or a monovalent organic group, and examples of the monovalent organic group include an aliphatic group, an alicyclic group, an aromatic group, and a heterocyclic group. Among them, with a viewpoint of improving the engraving sensitivity and the adaptability in synthesis, $R^3$ is preferably a hydrogen atom, a monovalent aliphatic group, or an alicyclic group, more specifically a hydrogen atom or a monovalent aliphatic group, and particularly preferably a hydrogen atom.

The structural unit which is present in the specific polymer (A) may be either that represented by Formula (I) or that represented by Formula (II). With a viewpoint of the engraving sensitivity, a polymer containing the structural unit represented by Formula (I) is more preferable.

The specific polymer (A) of the invention can be synthesized, for example, by reacting a compound having two carboxyl groups with a compound having two vinyl ether groups under the presence of an appropriate catalyst at a temperature from normal temperature to 100° C. While such a synthesis reaction may proceed even under the condition where a catalyst is not present, it is preferable to use a trace amount of an acid catalyst when necessary. The acid catalyst used for the synthesis can be preferably pyridinium, p-toluene sulfonate, or p-toluene sulfonic acid with a viewpoint of preferably keeping balance between polyaddition and depolymerization.

The specific polymer (A) is preferably obtained by polymerizing: a compound represented by the following Formula (I-1); and one or more selected from the group consisting of a compound represented by the following Formula (II-1) and a compound represented by the following Formula (II-2).

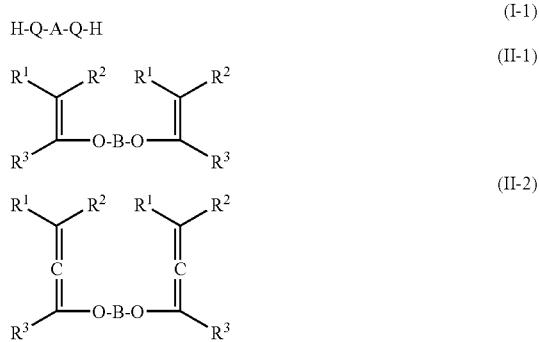

In Formula (I-1), Q represents a partial structure which provides an acid group having an acid dissociation constant pKa of 0 to 11 when it is in the form of -Q-H, and A represents a bivalent organic connecting group.

In Formula (II-1) and Formula (II-2), $R^1$ to $R^3$ each independently represent a hydrogen atom or a monovalent organic group, and B represents a bivalent organic connecting group.

Compounds which can be used in the synthesis of the specific polymer (A) are described below.

1. Compound Represented by Formula (I-1)

H-Q-A-Q-H (I-1)

In Formula (I-1), A represents a bivalent organic connecting group, and Q represents a partial structure forming an acid group having pKa of 11 or less when it is in the form of -Q-H.

Herein, A and Q respectively have the same meanings as those in Formula (I) or Formula (II), and preferable embodiment thereof are also respectively identical with the preferable embodiment for A and Q in Formula (I) or Formula (II).

-Q-H is an acid group having pKa of 0 to 20, and preferably has pKa of from 3 to 10. Q is preferably a hydrocarbon connecting group. Examples of the hydrocarbon group include a linear alkyl group, a branched alkyl group, a cyclic alkyl group and an aromatic group. Among them, those having pKa when hydrolyzed is within the above-described range can be selected. Usually, the pKa can be within the range by introducing an electron attractive substituent to such a bivalent- or higher-hydrocarbon group.

Preferable examples of the hydrocarbon group represented by Q include those containing an aromatic group, those containing a cyclic group, and those containing a carbonyl group.

More preferable examples of -Q-H include the following embodiment.

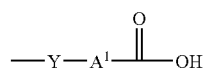

In the above formula, $A^1$ represents an aromatic group or a cyclic group. Y represents a single bond, —O—, or —$NR^5$—, in which $R^5$ represents a hydrogen atom or a hydrocarbon group.

Specific examples of the acid group shown by -Q-H and having pKa of 11 or less include those described in the explanation for Formulae (I) and (II).

Preferable examples of the bivalent organic connecting group represented by A in Formula (I-1) include those containing an ester group represented by —O(C═O)— in the structure thereof, which are preferably those having 5 to 20 atoms to configure the connecting group.

In view of the structure, the bivalent organic connecting group represented by A preferably has a chain-shaped structure and has an ester bond in the structure thereof. Further, the bivalent organic connecting group represented by A may have the monovalent substituent as exemplified above as long as it does not impair the effect of the invention.

Among all, the bivalent organic connecting group represented by A can be preferably an alicyclic structure, an aromatic ring, or the like with the viewpoint that the strength of the film formed from the resin composition for laser engraving of the invention can be improved.

Specific examples of the compound represented by Formula (I-1) are shown below, while the invention is not restricted therby.

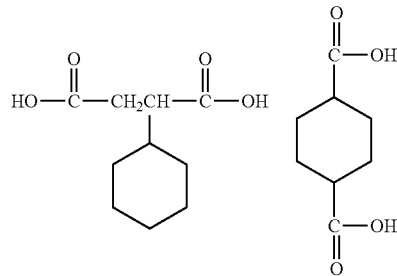

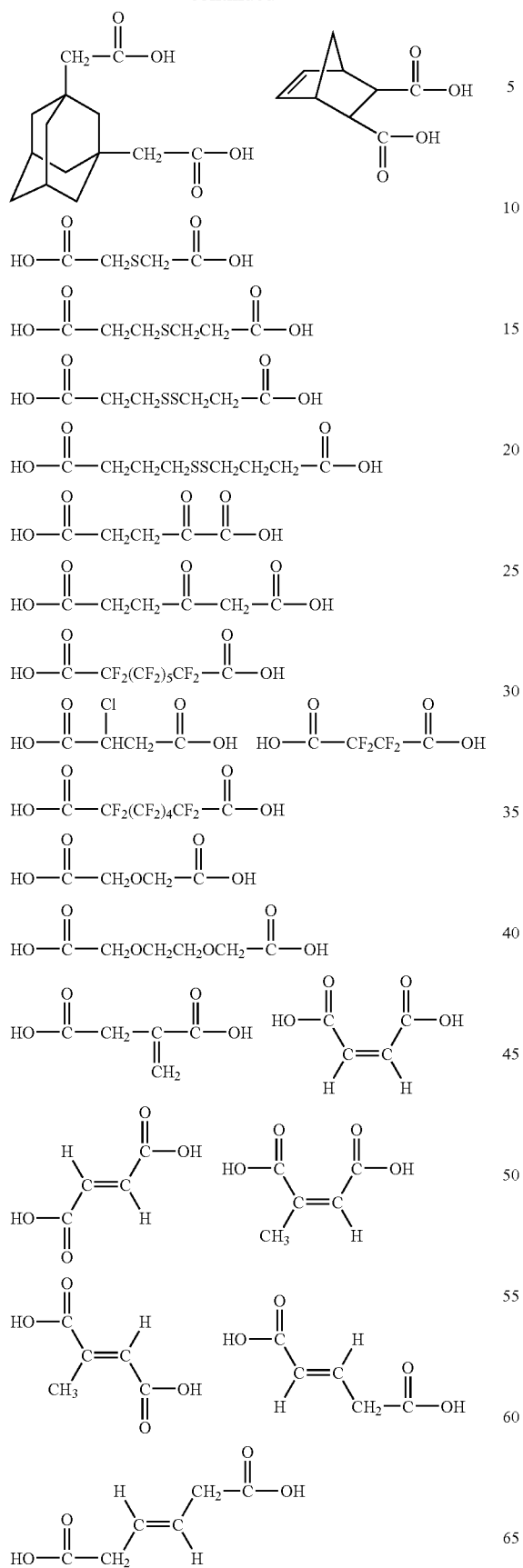
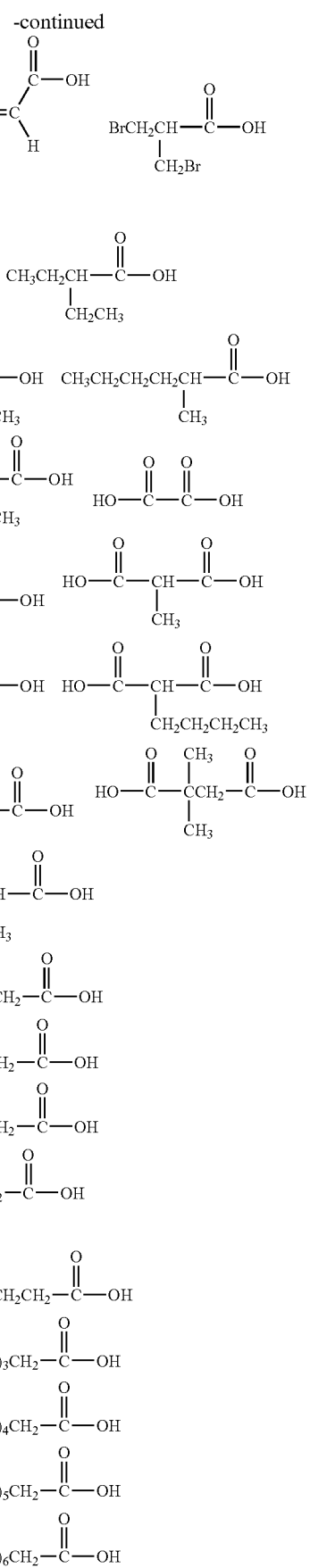

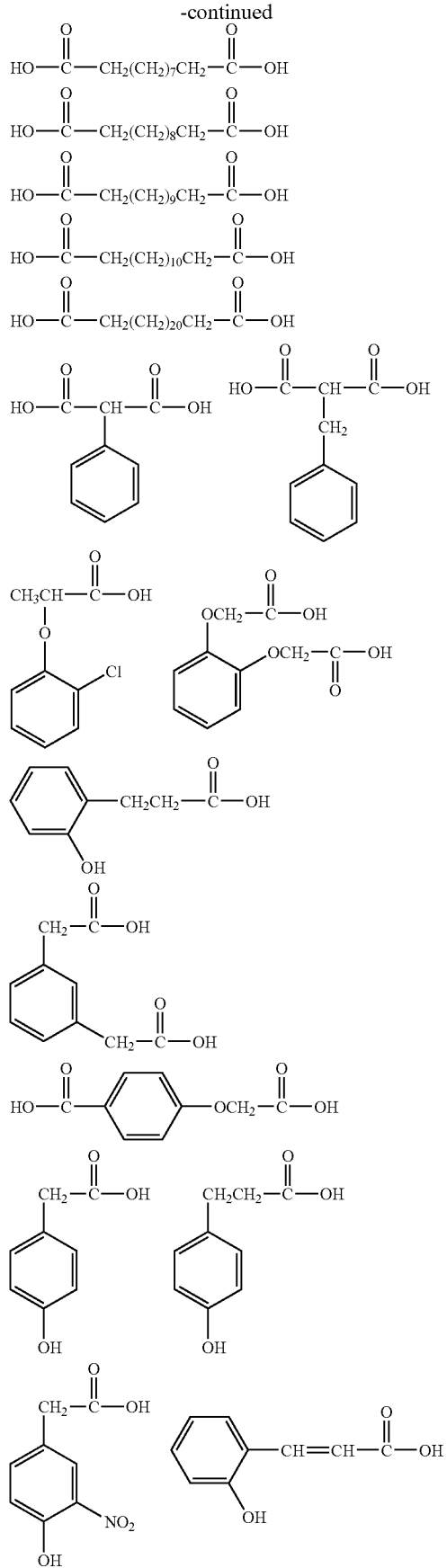
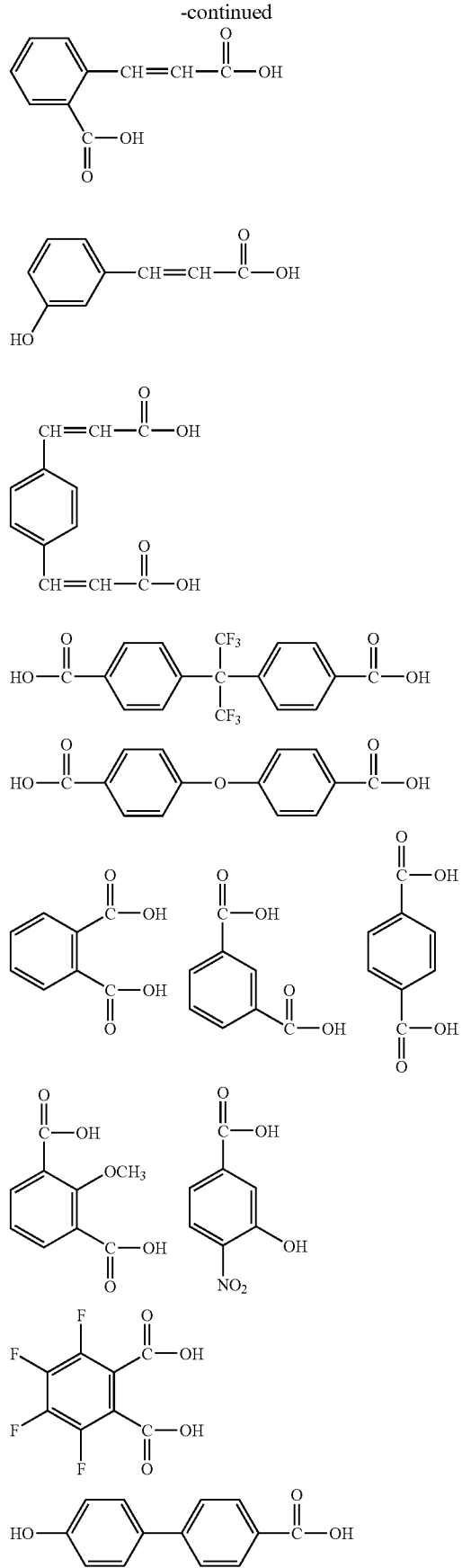

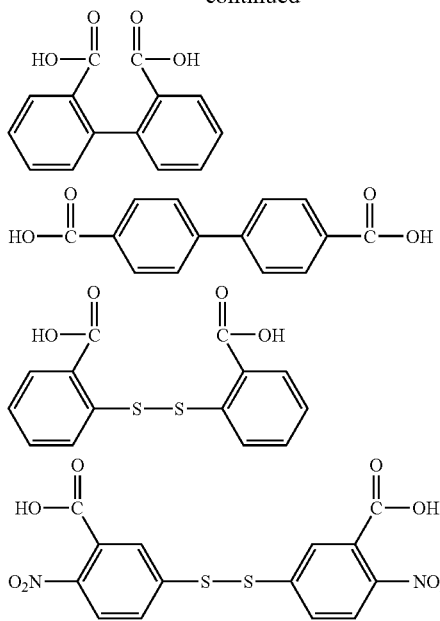
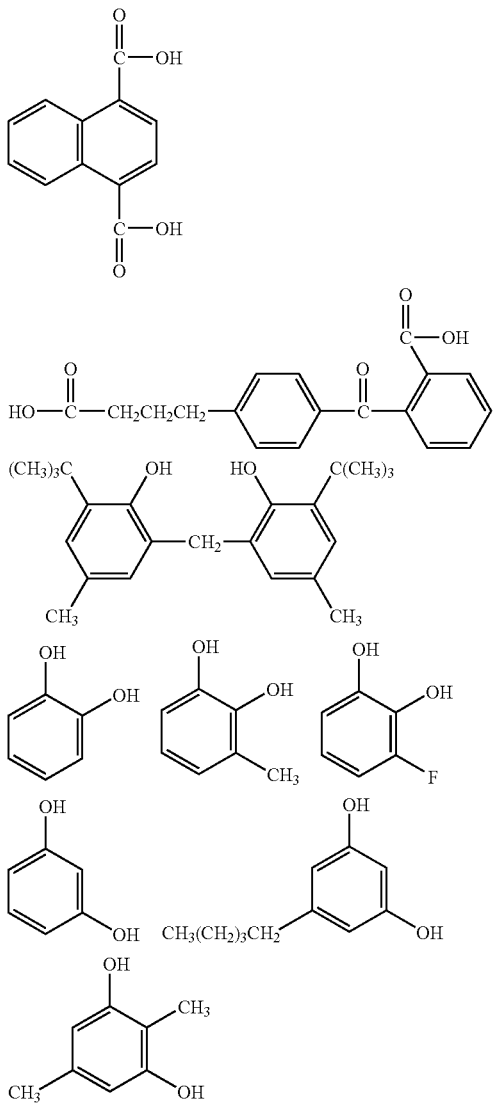
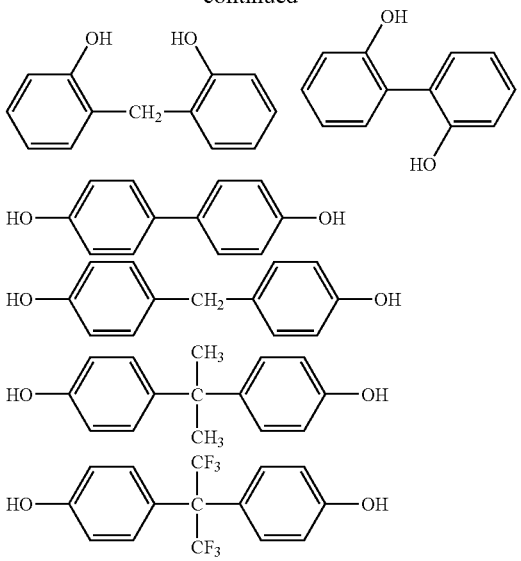

The compounds represented by Formula (I-1) are easily available as commercial products, and examples thereof include 1,4-cyclohexane dicarboxylic acid manufactured by Wako Pure Chemical Industries, Ltd.

Among the compounds represented by Formula (I-1), those having an alicyclic structure as a partial structure thereof are preferable in view of the film strength.

2. Compounds Represented by Formula (II-1) and Compounds Represented by Formula (II-2)

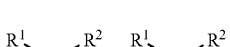 (II-1)

 (II-2)

In Formula (II-1) and Formula (II-2), B represents a bivalent organic connecting group.

B, that is the bivalent organic connecting group in Formulae ((II-1) and (II-2), has the same definition as A in Formula (I-1), and preferable embodiments thereof are identical with the preferable embodiments of A in Formula (I-1).

Specific examples of the compounds represented by Formula (II-1) or Formula (II-2) are shown below, while the invention is not limited thereby.

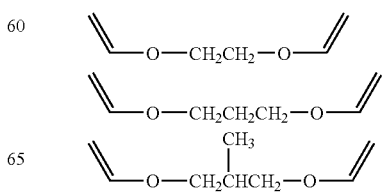

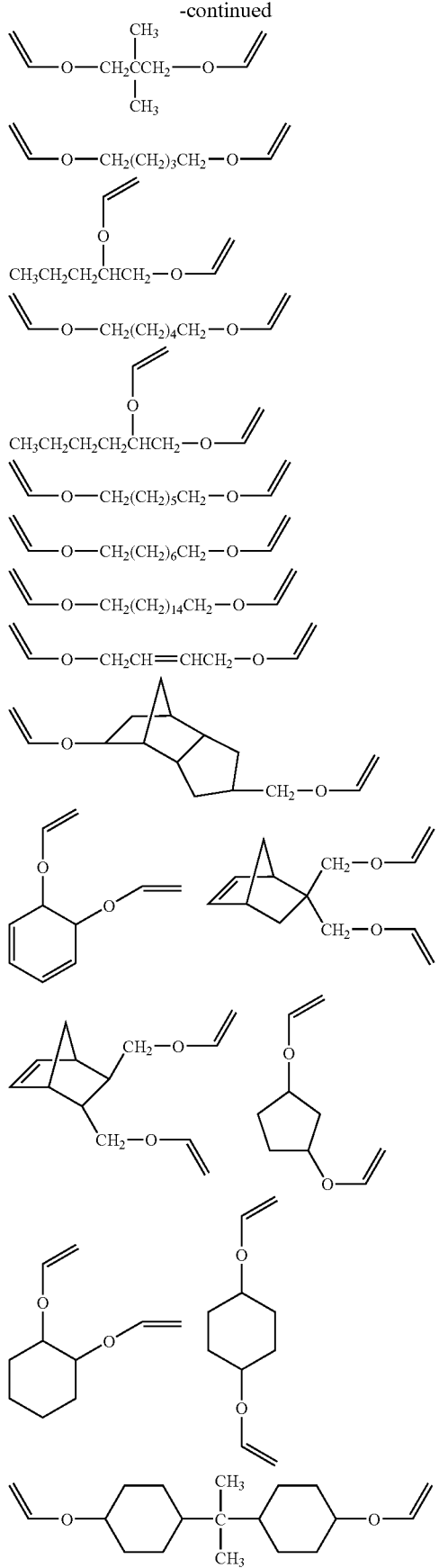
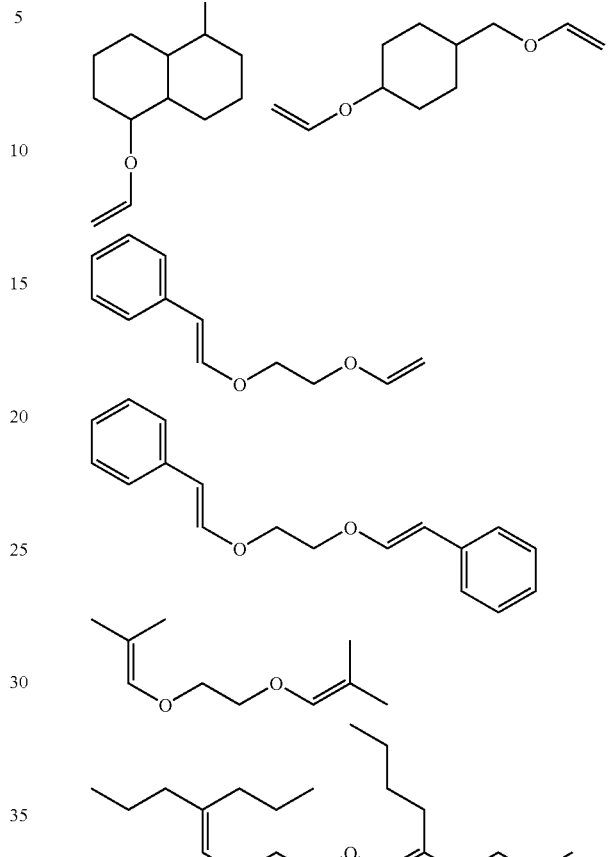

The compounds represented by Formula (II-1) or Formula (II-2) are easily available as commercial products and examples thereof include 1,4-cyclohexane dimethanol divinyl ether available from Aldrich Co.

Among the compounds represented by Formula (II-1) or (II-2), those having an alicyclic structure are preferable with a viewpoint of the film strength.

The specific polymer (A) which can be used in the invention is preferably a product formed from a reaction of a compound represented by Formula (I-1) with at least one compound represented by Formula (II-1) or Formula (II-2).

Upon synthesis of the specific polymer (A), one compound represented by Formula (I-1) and at least one compound represented by Formula (II-1) or Formula (II-2) may be used in combination. Plural kinds of the compounds represented by Formula (I-1) and plural kinds of compounds selected from the compounds represented by Formula (II-1) or Formula (II-2) may be used in combination to be copolymerized to form the specific polymer (A). It is preferable to use one compound represented by Formula (I-1) and one compound represented by Formula (II-1) or Formula (II-2) in combination with a viewpoint of the convenience in synthesis.

The specific polymer (A) can be obtained by using the two kinds of the compounds described above under known reaction conditions described, for example, in "Network Polymer" Vol. 22, No. 4, pp. 28 to 37 (2001) or "Macromolecules" Vol. 32, pp. 9059-9061 (1999).

A protonic acid catalyst or a Lewis acid catalyst can be preferably used in the synthesis of the specific polymer (A)

with a viewpoint of yield in the synthesis. When the compound represented by Formula (I-1) and at least one compound represented by Formula (II-1) or Formula (II-2) is reacted, zinc 2-ethylhexanoate, bismuth tris(2-ethylhexanoate), tin octylate, pyridinium p-toluene sulfonate, or p-toluene sulfonic acid can be preferably used as a catalyst for the reaction with a viewpoint of avoiding formation of a byproduct (such as an oligomer or a polymer formed by cationic polymerization of the compound represented by Formula (I-1)). More preferably, piridinium p-toluene sulfonate or p-toluene sulfonic acid can be used as the catalyst.

Specific examples of a solvent used in the reaction include tetrahydrofuran methylethylketone, and methylisobutyl ketone.

The ratio of the total amount of the compound represented by Formula (I-1) and the compound represented by Formula (II-1) or Formula (II-2) as the starting material in the reaction system (that is, the ratio of the total weight of the compounds relative to the total weight of components in the reaction system) is preferably from 30% to 100% by weight, more preferably from 45% to 100% by weight, and particularly preferably from 55% to 95% by weight, with a viewpoint of yielding the specific polymer (A) of a high molecular weight in a short time length.

The "ratio of the compounds in the reaction system is 100 mass %" means that the specific polymer (A) can be obtained by reacting the starting materials without solvent, that is, reaction proceeds with no particular addition of an initiator or a catalyst under the condition of not using the solvent. In the invention, such an embodiment can also be employed. In this regard, it is remarked that a catalyst may be arbitrarily added to the reaction system when the reaction is performed without a solvent, and addition of the catalyst to the reaction system can be preferable with a viewpoint of efficiency in synthesis.

Examples of the structure unit represented by Formula (I) or Formula (II) present in the specific polymer (A) of the invention are shown below, while the invention is not limited thereby.

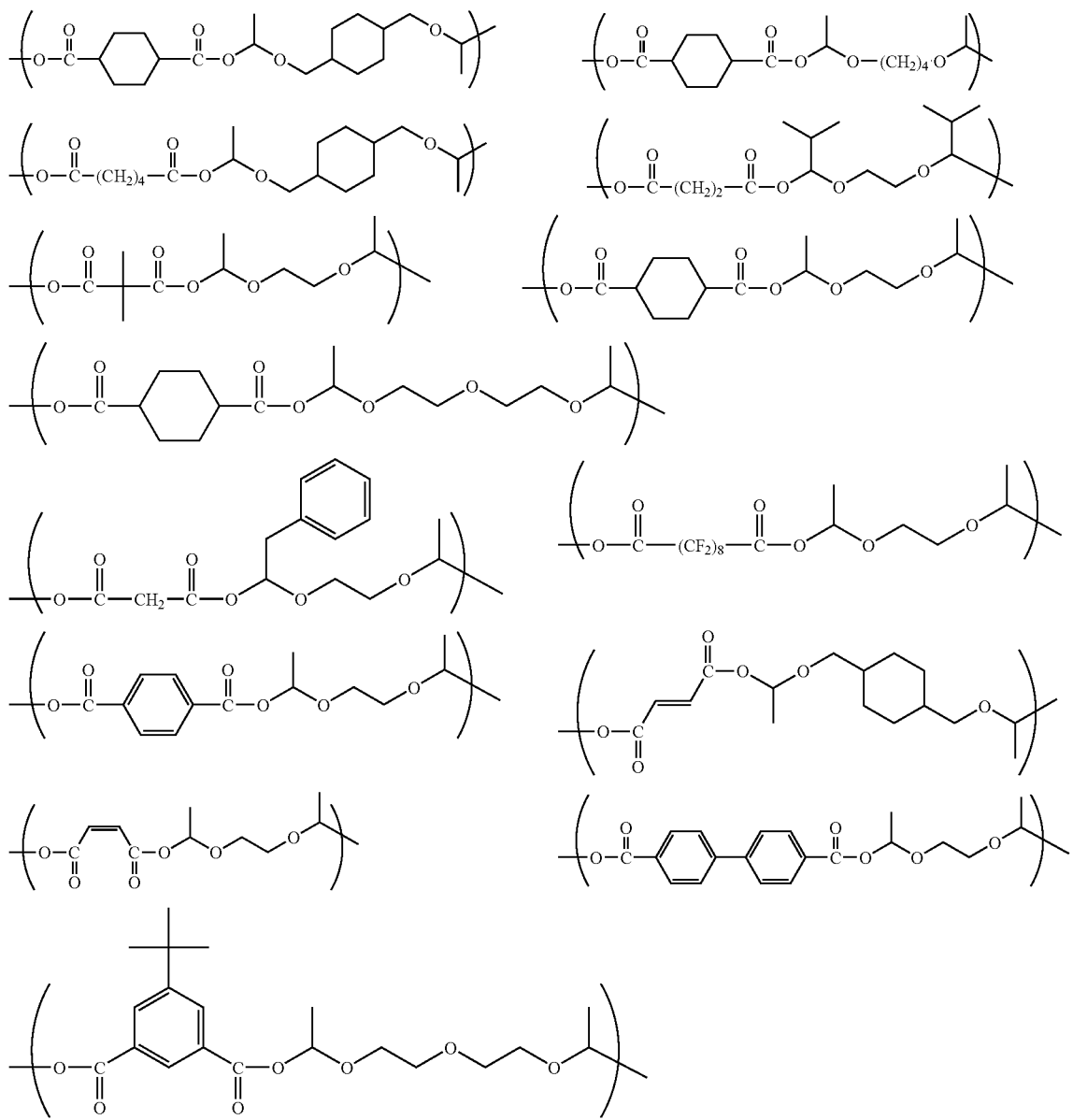

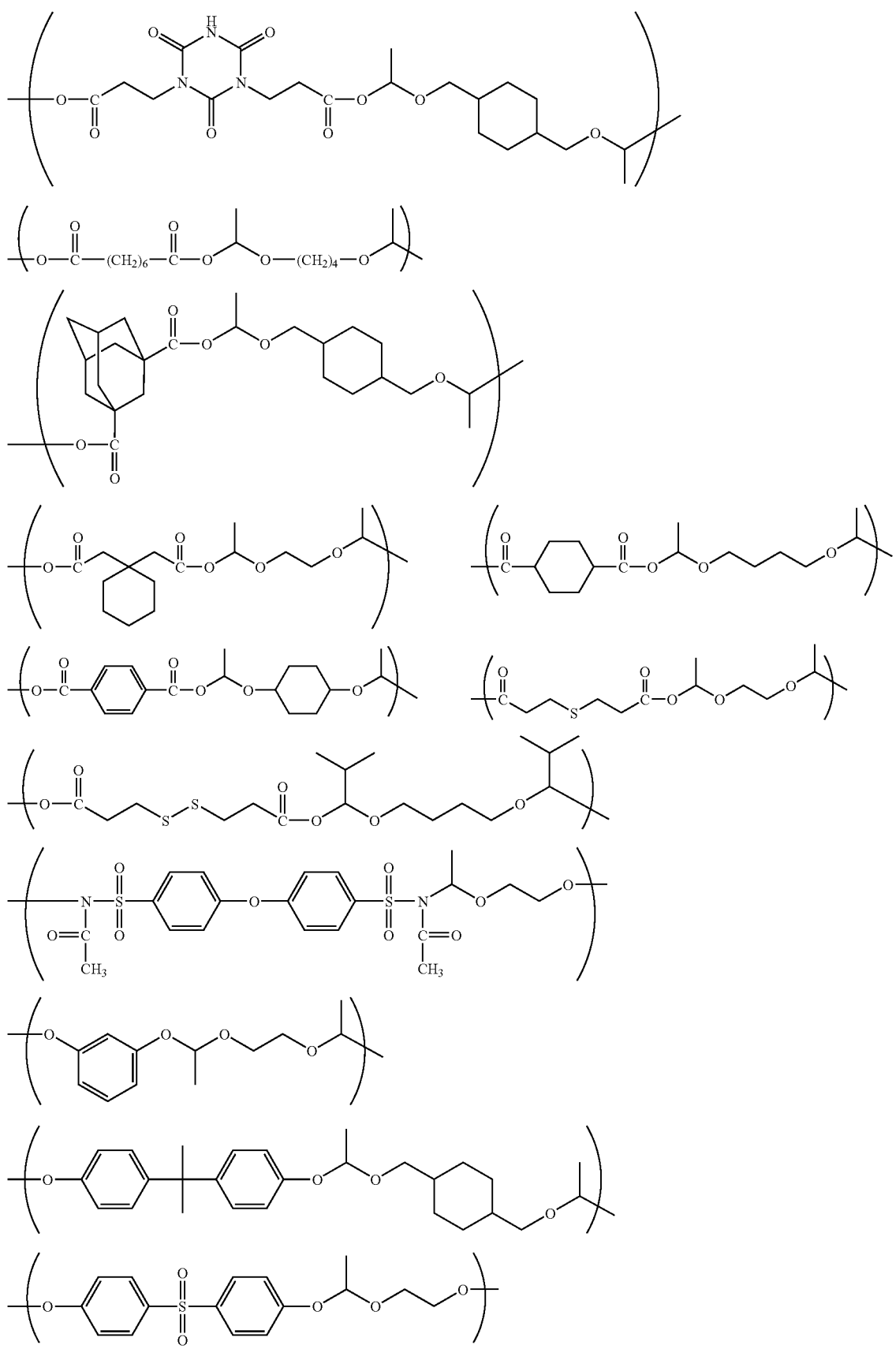

-continued

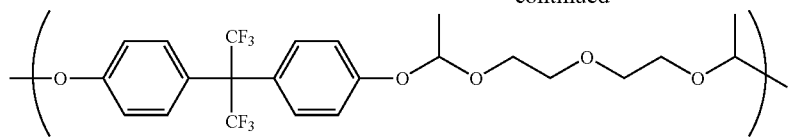

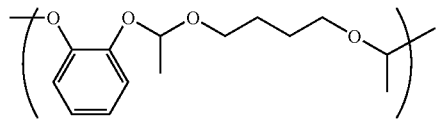

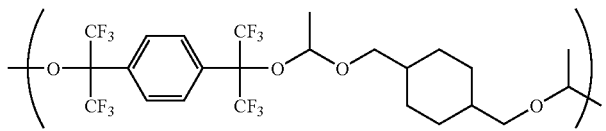

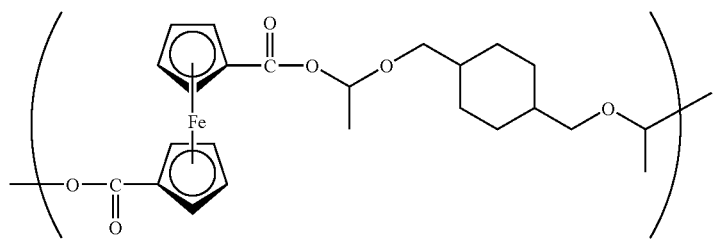

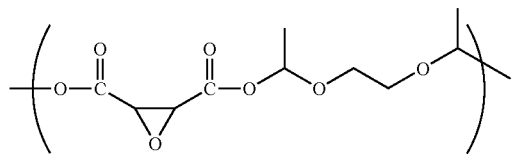

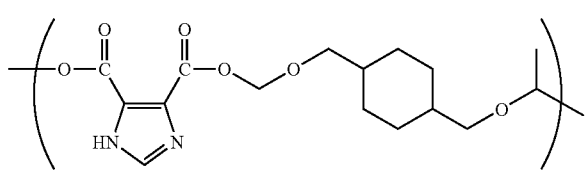

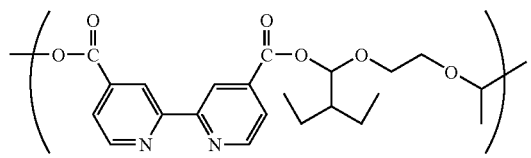

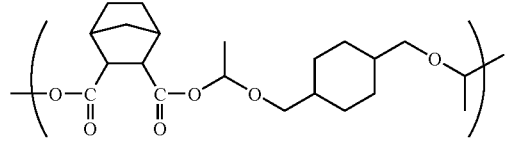

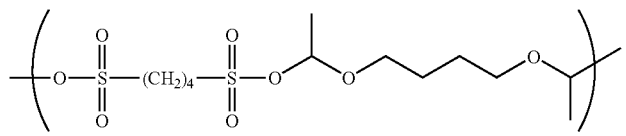

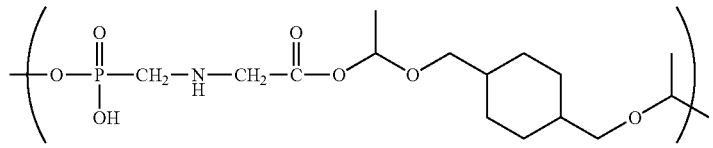

The inclusion of a polymer ingredient as exemplified above which is obtained by reacting the compound represented by Formula (I-1) and the compound represented by Formula (II-1) or Formula (II-2) in the specific polymer (A) of the invention can be confirmed by, for example, observation of a peak intensity ratio of methyl proton (about 1.4 ppm) and methine proton (about 6 ppm) derived from a hemiacetal ester unit being about 3:1 in $^1$H-NMR (solvent: deuterated chloroform), observation of a peak derived from a carbonyl group of a polyhemiacetal ester unit being at about 1732 cm$^{-1}$ in IR spectrum, and/or observation of the formation of an ingredient having a molecular weight which is higher than that of the compound represented by Formula (I-1) and that of the compound represented by Formula (II-1) or Formula (II-2) in gel permeation chromatography.

Specific polymers (P-1) to (P-10), which are the specific polymer of the invention, are shown together with weight average molecular weight (Mw) thereof, while the invention is not limited thereby. The molecular weight is a value measured by a GPC (gel permeation chromatography) method.

P-1
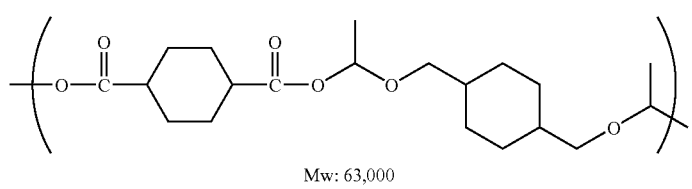
Mw: 63,000
P-2
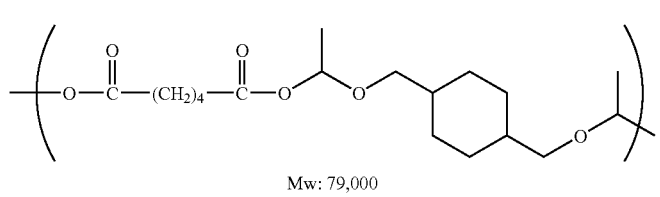
Mw: 79,000
P-3
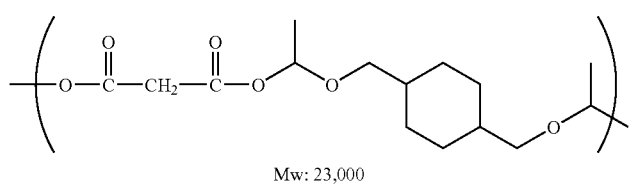
Mw: 23,000
P-4
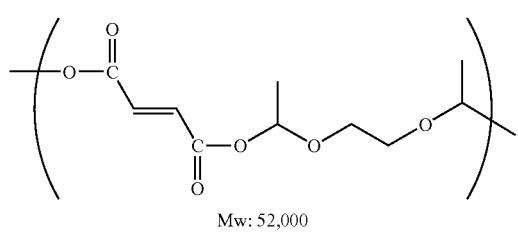
Mw: 52,000
P-5
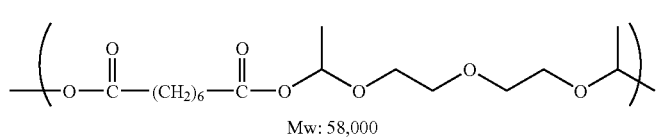
Mw: 58,000
P-6
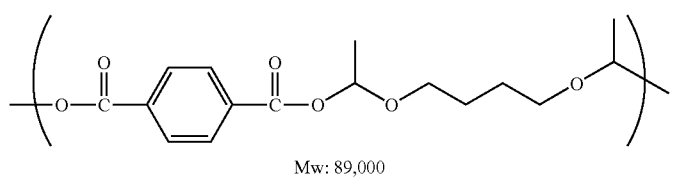
Mw: 89,000
P-7
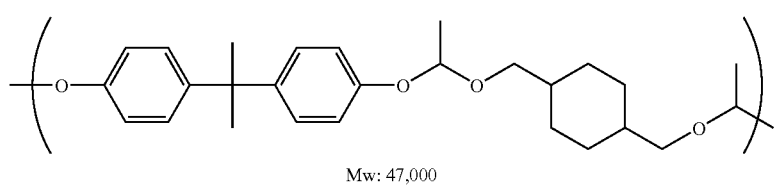
Mw: 47,000
P-8
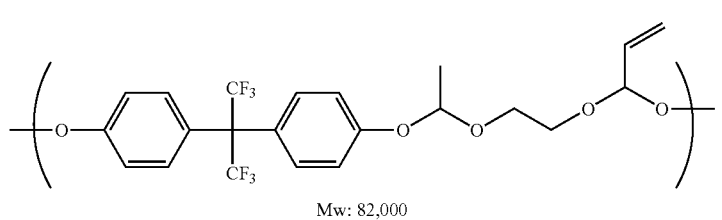
Mw: 82,000

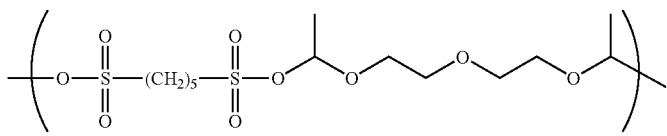

Mw: 56,000

P-9

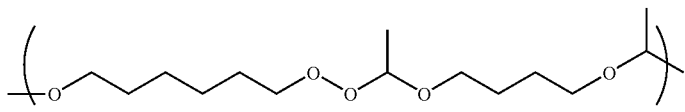

Mw: 20,000

P-10

With viewpoints of maintaining the property of the resin composition for laser engraving of the invention to form a film (filming property) being favorable and exhibiting high engraving sensitivity, the molecular weight of the specific polymer (A) of the invention is preferably in a range of from 3000 to 500000, more preferably from 8000 to 300000, and particularly preferably from 10000 to 200000.

The resin composition for laser engraving of the invention may contain either only one kind of or two or more kinds of the specific polymer (A).

The content of the specific polymer (A) in the resin composition for laser engraving of the invention is preferably from 5 mass % to 95 mass %, more preferably from 15 mass % to 85 mass % and, particularly preferably from 25 mass % to 70 mass % relative to the total amount of the resin composition in terms of a solid content with a viewpoint of improving the engraving sensitivity.

Among the exemplified compounds, P-1 to P-6 are more preferable, and P-1 to P-3 are particularly preferable with a viewpoint of the balance between the film strength and the engraving sensitivity.

(B) Other Binder Polymer

The resin composition for laser engraving of the invention may further contain, in addition to the specific polymer (A), a binder polymer (B) which can be generally used as long as they do not impair the effect of the invention.

Binder polymer is generally contained in a resin composition for laser engraving as a main ingredient thereof. Usually, thermoplastic resins, thermoplastic elastomers, or the like are used as the binder polymer depending on the purpose with a viewpoint of improving recording sensitivity to laser. In the invention, the specific polymer (A) can provide excellent the thermal reactivity, and various other binder polymers (B) can be used together in accordance with aimed physical properties.

In a case of using the resin composition for laser engraving of the invention as a recording layer of a flexographic printing plate for laser engraving, it is preferable to simultaneously satisfy applicability to printing such as ink resistance, abrasion resistance, resistance to printing, edge shape of engraved portion, or the like in addition to the engraving sensitivity. In view of providing such characteristics, other binder polymers (B) can be preferably in combination.

The "other binder polymer (B)" is an arbitrary ingredient that can be used together in the invention. In the invention, polymers other than the specific polymer (A) having the structure unit represented by Formula (I) or Formula (II) are referred to as the other binder polymer (B). For example, polymers having the polyhemiacetal ester structure in the molecule but not having the structure unit represented by Formula (I) or Formula (II) (specific examples thereof include polymers having a polyhemiacetal ester structure on the side chain) are also included in the scope of the other binder polymer (B) referred to in the invention.

For example, in the case of using the resin composition for laser engraving for the purpose of curing thereof by heating or exposure to enhance its strength, a polymer having carbon-carbon unsaturated bonds in the molecule can be selected as the other binder polymer (B). In the case of using the resin composition for laser engraving for the purpose of forming a pliable film having flexibility, a soft resin or a thermoplastic elastomer can be selected as the other binder polymer (B).

It is preferable to use a hydrophilic or alcoholphilic polymer as the other binder polymer (B) from the viewpoints of the ease of preparation of a composition for relief forming layer and/or improvement in the resistance to oily ink in a relief printing plate obtained from the resin composition.

Also, from the viewpoint of the laser engraving sensitivity, a polymer having a partial structure which thermally degrades by exposure or heating can be preferable as the other binder polymer (B).

As such, binder polymers may be selected as the other binder polymer (B) in this invention in accordance with the purpose, while taking into consideration of the properties according to the applications of the resin composition for laser engraving, and one species or a combination of two or more species of such binder polymers may be used.

The total amount of binder polymers is preferably in a range of 1% by mass to 99% by mass, and is more preferably in a range of 5% by mass to 80% by mass, relative to the total solid content of the resin composition for laser engraving of the invention.

Hereinafter, various polymers that may be used as the other binder polymer (B) in the invention will be described.

Polymer Having Carbon-Carbon Unsaturated Bond

A polymer having carbon-carbon unsaturated bonds in the molecule may be suitably used as the other binder polymer (B). The carbon-carbon unsaturated bonds may be present in either the main chain or the side chains, or may also be present in both of the chains. Hereinafter, the carbon-carbon unsaturated bond may also be simply referred to as an "unsaturated bond", and a carbon-carbon unsaturated bond present at an end of the main chain or side chain may also be referred to as a "polymerizable group".

In the case where the polymer has carbon-carbon unsaturated bonds in the main chain thereof, the polymer may have the unsaturated bonds at one terminal thereof, at both terminals thereof, and/or within the main chain thereof. Furthermore, in the case where the polymer has carbon-carbon unsaturated bonds in a side chain thereof, the unsaturated bonds may be directly attached to the main chain, and/or may be attached to the main chain via an appropriate linking group.

Examples of the polymer containing carbon-carbon unsaturated bonds in the main chain include SB (polystyrene-polybutadiene), SBS (polystyrene-polybutadiene-polystyrene), SIS (polystyrene-polyisoprene-polystyrene), SEBS (polystyrene-polyethylene/polybutylene-polystyrene), and the like.

In the case of using a polymer having a highly reactive polymerizable unsaturated group such as a methacryloyl group as the polymer having carbon-carbon unsaturated bonds in the side chain, a film having very high mechanical strength may be produced. Particularly, highly reactive polymerizable unsaturated groups may be relatively easily introduced into the molecule into polyurethane thermoplastic elastomers and polyester thermoplastic elastomers.

Any known method may be employed when introduce unsaturated bonds or polymerizable groups into the binder polymer. Examples of the method include: a method of copolymerizing the polymer with a structural unit having a polymerizable group precursor which is formed by attaching a protective group to the polymerizable group, and eliminating the protective group to restore the polymerizable group; and a method of producing a polymer compound having a plurality of reactive groups such as a hydroxyl group, an amino group, an epoxy group, a carboxyl group, an acid anhydride group, a ketone group, a hydrazine residue, an isocyanate group, an isothiacyanate group, a cyclic carbonate group or an ester group, subsequently reacting the polymer compound with a binding agent which has a plurality of groups capable of binding with the reactive group (for example, polyisocyanate and the like for the case of a hydroxyl group or an amino group), to thereby carry out adjustment of the molecular weight and conversion to a bindable group at the chain end, and then reacting this group which is capable of reacting with the terminal bindable group, with an organic compound having a polymerizable unsaturated group, to thus introduce a polymerizable group by means of a polymer reaction. When these methods are used, the amount of introduction of the unsaturated bond or the polymerizable group into the polymer compound may be controlled.

It is also preferable to use the polymer having an unsaturated bond in combination with a polymer which does not have an unsaturated bond. That is, since a polymer obtainable by adding hydrogen to the olefin moiety of the polymer having carbon-carbon unsaturated bonds, or a polymer obtainable by forming a polymer using as a raw material a monomer in which an olefin moiety has been hydrogenated, such as a monomer resulting from hydrogenation of butadiene, isoprene or the like, has excellent compatibility, the polymer may be used in combination with the polymer having unsaturated bonds, so as to regulate the amount of unsaturated bonds possessed by the binder polymer. In the case of using these in combination, the polymer which does not have unsaturated bonds may be used in a proportion of generally 1 parts by mass to 90 parts by mass, and preferably 5 parts by mass to 80 parts by mass, relative to 100 parts by mass of the polymer having unsaturated bonds.

As will be discussed later, in aspects where curability is not required for the binder polymer, such as in the case of using another polymerizable compound in combination, the binder polymer does not necessarily contain an unsaturated bond, and a variety of polymers which do not have unsaturated bonds may be solely used as the binder polymer in the relief forming layer. Examples of the polymer which does not have unsaturated bonds and can be used in such a case include polyesters, polyamides, polystyrene, acrylic resins, acetal resins, polycarbonates and the like.

The binder polymer suitable for the use in the invention, which may or may not have unsaturated bonds, has a number average molecular weight preferably in the range of from 1000 to 1,000,000, and more preferably in the range of from 5,000 to 500,000. When the number average molecular weight of the binder polymer is in the range of 1000 to 1,000,000, the mechanical strength of the film to be formed may be secured. Here, the number average molecular weight is a value measured using gel permeation chromatography (GPC), and reduced with respect to polystyrene standard products with known molecular weights.

Thermoplastic Polymer and Polymer Having Decomposability

Examples of the other binder polymer (B) which may be preferably used from the viewpoint of assuring laser engraving sensitivity include a thermoplastic polymer which can be liquefied by being imparted with energy by means of exposure and/or heating, and a polymer having a partial structure which can be decomposed by being imparted with energy by means of exposure and/or heating.

Examples of the polymer having decomposability include those polymers containing, as a monomer unit having in the molecular chain a partial structure which is likely to be decomposed and cleaved, styrene, α-methylstyrene, α-methoxystyrene, acryl esters, methacryl esters, ester compounds other than those described above, ether compounds, nitro compounds, carbonate compounds, carbamoyl compounds, hemiacetal ester compounds, oxyethylene compounds, aliphatic cyclic compounds, and the like.

Among these, polyethers such as polyethylene glycol, polypropylene glycol and polytetraethylene glycol, aliphatic polycarbonates, aliphatic carbamates, polymethyl methacrylate, polystyrene, nitrocellulose, polyoxyethylene, polynorbornene, polycyclohexadiene hydrogenation products, or a polymer having a molecular structure having many branched structures such as dendrimers, may be particularly preferably exemplified in terms of decomposability.

A polymer containing a number of oxygen atoms in the molecular chain is preferable from the viewpoint of decomposability. From this point of view, compounds having a carbonate group, a carbamate group or a methacryl group in the polymer main chain, may be suitably exemplified. For example, a polyester or polyurethane synthesized from a (poly)carbonate diol or a (poly)carbonate dicarboxylic acid as the raw material, a polyamide synthesized from a (poly)carbonate diamine as the raw material, and the like may be exemplified as the examples of polymers having good thermal decomposability. These polymers may also be those containing a polymerizable unsaturated group in the main chain or the side chains. Particularly, in the case of a polymer having a reactive functional group such as a hydroxyl group, an amino group or a carboxyl group, it is also easy to introduce a polymerizable unsaturated group into such a thermally decomposable polymer.

The thermoplastic polymer may be an elastomer or a non-elastomer resin, and may be selected according to the purpose of the resin composition for laser engraving of the invention.

Examples of the thermoplastic elastomer include urethane thermoplastic elastomers, ester thermoplastic elastomers, amide thermoplastic elastomers, silicone thermoplastic elastomers and the like. For the purpose of enhancing the laser engraving sensitivity of such a thermoplastic elastomer, an elastomer in which an easily decomposable functional group such as a carbamoyl group or a carbonate group has been introduced into the main chain, may also be used. A thermoplastic polymer may also be used as a mixture with the thermally decomposable polymer.

The thermoplastic elastomer is a material showing rubber elasticity at normal temperature, and the molecular structure includes a soft segment such as polyether or a rubber molecule, and a hard segment which prevents plastic deformation near normal temperature, as vulcanized rubber does. There exist various types of hard segments, such as frozen state, crystalline state, hydrogen bonding and ion bridging. Such thermoplastic elastomers may be suitable in the case of applying the resin composition for laser engraving of the invention to the production of, for example, relief printing plates requiring plasticity, such as flexo plates.

The kind of the thermoplastic elastomer can be selected according to the purpose. For example, in the case where solvent resistance is required, urethane thermoplastic elastomers, ester thermoplastic elastomers, amide thermoplastic elastomers and fluorine thermoplastic elastomers are preferable. In the case where thermal resistance is required, urethane thermoplastic elastomers, olefin thermoplastic elastomers, ester thermoplastic elastomers and fluorine thermoplastic elastomers are preferable.

Examples of the non-elastomeric resin include polyester resins include unsaturated polyester resins, polyamide resins, polyamideimide resins, polyurethane resins, unsaturated polyurethane resins, polysulfone resins, polyethersulfone resins, polyimide resins, polycarbonate resins, all aromatic polyester resins, and hydrophilic polymers containing hydroxyethylene units (for example, polyvinyl alcohol compounds).

The hydrophilic polymer may also be used in combination with a relatively hydrophobic binder polymer as described above. Polymers including the monomers shown below as a component of polymerization or copolymerization can be used as the relatively hydrophobic binder polymer so as to adjust the properties such as the film hardness or flexibility at the time of film formation, and compatibility with other components such as co-present polymerizable compounds or initiator.

Compounds having only one ethylenic unsaturated bond, such as: (meth)acrylates having a hydroxyl group, such as 2-hydroxyethyl(meth)acrylate, 2-hydroxypropyl(meth)acrylate, 2-hydroxybutyl(meth)acrylate, 3-chloro-2-hydroxypropyl(meth)acrylate and β-hydroxy-β'-(meth)acryloyloxyethyl phthalate; alkyl(meth)acrylates such as methyl(meth)acrylate, ethyl(meth)acrylate, propyl(meth)acrylate, butyl(meth)acrylate, isoamyl(meth)acrylate, 2-ethylhexyl(meth)acrylate, lauryl(meth)acrylate and stearyl(meth)acrylate; cycloalkyl(meth)acrylates such as cyclohexyl(meth)acrylate; halogenated alkyl(meth)acrylates such as chloroethyl(meth) acrylate and chloropropyl(meth)acrylate; alkoxyalkyl(meth) acrylates such as methoxyethyl(meth)acrylate, ethoxyethyl (meth)acrylate and butoxyethyl(meth)acrylate; phenoxyalkyl(meth)acrylates such as phenoxyethyl acrylate and nonylphenoxyethyl(meth)acrylate; alkoxyalkylene glycol(meth)acrylate such as ethoxydiethylene glycol(meth) acrylate, methoxytriethylene glycol(meth)acrylate and methoxydipropylene glycol(meth)acrylate; (meth)acrylamides such as (meth)acrylamide, diacetone(meth)acrylamide, and N,N'-methylenebis(meth)acrylamide; 2,2-dimethylaminoethyl(meth)acrylate, 2,2-diethylaminoethyl(meth)acrylate, N,N-dimethylaminoethyl(meth)acrylamide and N,N-dimethylaminopropyl(meth)acrylamide; compounds having two or more ethylenic unsaturated bonds, such as: di(meth)acrylate of polyethylene glycol, such as diethylene glycol di(meth)acrylate; polypropylene glycol di(meth)acrylate such as dipropylene glycol di(meth)acrylate; trimethylolpropane tri(meth)acrylate, pentaerythritol tri(meth)acrylate, pentaerythritol tetra(meth)acrylate, glycerol tri(meth)acrylate; polyvalent(meth)acrylates obtainable by subjecting a compound having an ethylenic unsaturated bond and active hydrogen, such as an unsaturated carboxylic acid or unsaturated alcohol, to addition reaction to ethylene glycol diglycidyl ether; polyvalent(meth)acrylates obtainable by subjecting an unsaturated epoxy compound such as glycidyl(meth) acrylate, and a compound having active hydrogen, such as a carboxylic acid or an amine, to addition reaction; polyvalent (meth)acrylamides such as methylenebis(meth)acrylamide; polyvalent vinyl compounds such as divinylbenzene; and the like may be mentioned. According to the invention, these may be used individually alone, or in combination of two or more species.

Examples of the monomer of the polymerization component which is preferable from the viewpoint of film formability include alkoxyalkylene glycol(meth)acrylates such as 2-hydroxyethyl(meth)acrylate, 2-hydroxypropyl(meth)acrylate, 2-hydroxybutyl(meth)acrylate, ethoxydiethylene glycol (meth)acrylate, methoxytriethylene glycol(meth)acrylate and methoxydipropylene glycol(meth)acrylate; (meth)acrylamide, diacetone(meth)acrylamide, cyclohexyl(meth)acrylate, benzyl(meth)acrylate, and N-acryloylmorpholine are preferable. Among these, acrylates are particularly preferable from the viewpoint of securing the flexibility of the obtainable polymers.

In addition to these, examples the polymer which may be used in combination as the hydrophilic polymer further include the following polymers.

A polymer containing at least either an olefin or a carbon-carbon triple bond in the main chain may be mentioned, and examples thereof include SB (polystyrene-polybutadiene), SBS (polystyrene-polybutadiene-polystyrene), SIS (polystyrene-polyisoprene-polystyrene), SEBS (polystyrene-polyethylene/polybutylene-polystyrene), which are raised as the polymer having a carbon-carbon double bond.

The content of the other binder polymer(B) is preferably 1% by mass to 50% by mass, more preferably 1% by mass to 30% by mass, and most preferably 1% by mass to 10% by mass, with respect to the total amount of binder polymers in the resin composition of the invention.

When the specific polymer (A) and the other binder (B) are used together, the content ratio between these (the amount of the specific polymer (A): that of other binder (B)) is preferably from 95:5 to 5:95, more preferably from 80:20 to 5:95, and particularly preferably from 50:50 to 10:90, in terms of the total mass of the binder polymer in the resin composition of the invention being 100, with a viewpoint of the engraving sensitivity.

When the resin composition of the invention forms a film, the specific polymer (A) may be contained in any one of a homogenous state, a particulate state or a fibrous state in the composition. The specific polymer (A) can be preferably contained in the homogeneous state or the particulate state to be subjected to film formation with a viewpoint of maintaining favorable hardness and wear resistance of the film to be formed.

The resin composition for laser engraving of the invention preferably contains, together with the specific binder polymer (A) as the essential ingredient, arbitrary ingredients such as the other binder polymer (B), and/or such as a polymerizable compound, a photothermal conversing agent, a polymerization initiator or a plasticizer. Each of the ingredients is more specifically explained below.

(C) Polymerizable Compound

The "polymerizable compound" in the invention means a compound having at least one carbon-carbon unsaturated bond capable of radical polymerization triggered by the generation of a starting radical derived from a polymerization initiator. More specific explanation will be given with taking an example of using an addition polymerizable compound as the polymerizable compound.

Examples of the polymerizable compound that can be preferably used in the invention include an addition polymerizable compound having at least one ethylenic unsaturated double bond. This addition polymerizable compound is preferably selected from compounds having at least one, preferably two or more, terminal ethylenic unsaturated bonds.

The family of such compounds is widely known in the pertinent industrial field, and these compounds may be used in the invention without any particular limitations. These compounds respectively have a chemical form such as a monomer, a prepolymer such as a dimer or a trimer, an oligomer, a copolymer thereof, or a mixture of any of these.

Examples of the monomer include unsaturated carboxylic acids (for example, acrylic acid, methacrylic acid, itaconic acid, crotonic acid, isocrotonic acid, maleic acid, and the like), esters thereof, and amides thereof. Preferable examples thereof include esters of an unsaturated carboxylic acid and an aliphatic polyhydric alcohol compound and amides of an unsaturated carboxylic acid and an aliphatic polyvalent amine compound. Further, unsaturated carboxylic acid esters having a nucleophilic substituent such as a hydroxyl group, an amino group or a mercapto group; adducts of an amide with a monofunctional or polyfunctional isocyanate or an epoxy compound; dehydration condensation reaction products of an amide with a monofunctional or polyfunctional carboxylic acid, and the like may also be suitably used. Unsaturated carboxylic acid esters having an electrophilic substituent such as an isocyanate group or an epoxy group; adducts of an amide with a monofunctional or polyfunctional alcohol, an amine or a thiol; unsaturated carboxylic acid esters having a detachable substituent such as a halogen group or a tosyloxy group; substitution reaction products of an amide with a monofunctional or polyfunctional alcohol, an amine or a thiol, are also suitable. A family of compounds formed by modifying the above-described compounds by introducing an unsaturated phosphonic acid, styrene, vinyl ether or the like in place of the unsaturated carboxylic acid may also be used.

Specific examples of the ester monomer formed of an aliphatic polyhydric alcohol compound and an unsaturated carboxylic acid include, as acrylic acid esters, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethyelne glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomers, and the like.

Specific examples of the ester monomer further include, as methacrylic acid esters, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, bis[p-(methacryloxyethoxy)phenyl]dimethylmethane, and the like.

Specific examples of the ester monomer further include, as itaconic acid esters, ethylene glycol diitaconate, propylene glycol diitaconate, 1,3-butanediol diitaconate, 1,4-butanediol diitaconate, tetramethylene glycol diitaconate, pentaerythritol diitaconate, sorbitol tetraitaconate, and the like.

Specific examples of the ester monomer further include, as crotonic acid esters, ethylene glycol dicrotonate, tetramethylene glycol dicrotonate, pentaerythritol dicrotonate, sorbitol tetracrotonate, and the like.

Specific examples of the ester monomer further include, as isocrotonic acid esters, e ethylene glycol diisocrotonate, pentaerythritol diisocrotonate, sorbitol tetraisocrotonate, and the like.

Specific examples of the ester monomer further include, as maleic acid esters, ethylene glycol dimaleate, triethylene glycol dimaleate, pentaerythritol dimaleate, sorbitol tetramaleate, and the like.

Specific examples of the ester monomer further include the aliphatic alcohol esters as described in Japanese Patent Application Publication (JP-B) Nos. 46-27926 and 51-47334, and JP-A No. 57-196231; the esters having an aromatic skeleton as described in JP-A Nos. 59-5240, 59-5241 and 2-226149; the esters containing an amino group as described in JP-A No. 1-165613; and the like.

Any of the ester monomers may also be used in combination as a mixture.

Specific examples of the amide monomer formed of an aliphatic polyvalent amine compound and an unsaturated carboxylic acid include methylenebisacrylamide, methylenebismethacrylamide, 1,6-hexamethylenebisacrylamide, 1,6-hexamethylenebismethacrylamide, diethylenetriamine trisacrylamide, xylenebisacrylamide, xylenebismethacrylamide, and the like.

Specific examples of the amide monomer further include the amides having a cyclohexylene structure as described in JP-B No. 54-21726.

Examples of the addition polymerizable compound which can be preferably used in the invention further include urethane-based addition polymerizable compounds that are produced using an addition reaction of an isocyanate and a hydroxyl group. Specific examples thereof include the vinylurethane compound containing two or more polymerizable vinyl groups in one molecule as described in JP-B No. 48-41708, which is obtained by adding a vinyl monomer containing a hydroxyl group represented by following Formula (V), to a polyisocyanate compound having two or more isocyanate groups in one molecule, and the like.

$$CH_2=C(R)COOCH_2CH(R')OH \quad (V)$$

In Formula (V) R and R' each independently represent H or $CH_3$.

The urethane acrylates described in JP-A No. 51-37193, JP-B Nos. 2-32293 and 2-16765; and the urethane compounds having an ethylene oxide skeleton as described in JP-B Nos. 58-49860, 56-17654, 62-39417 and 62-39418 are also suitable as the addition polymerizable compound.

When the addition polymerizable compounds having an amino structure or a sulfide structure in the molecule as described in JP-A Nos. 63-277653, 63-260909 and 1-105238, are used, a curable composition may be obtained in a short time.

Examples of the addition polymerizable compound further include polyester acrylates such as those described in JP-A No. 48-64183, and JP-B Nos. 49-43191 and 52-30490; and polyfunctional acrylates or methacrylates such as epoxy acrylates obtained by reacting an epoxy resin and (meth)acrylic acid. Examples of the addition polymerizable compound further include the specific unsaturated compounds described in JP-B Nos. 46-43946, 1-40337 and 1-40336; the vinylphosphonic acid compounds described in JP-A No. 2-25493; and the like. In certain cases, the structure containing a perfluoroalkyl group as described in JP-A No. 61-22048 can be suitably used. The compounds introduced in Journal of the Adhesion Society of Japan, Vol. 20, No. 7, pp. 300-308 (1984) as photocurable monomers and oligomers, may also be used as the addition polymerizable compound.

From the viewpoint of photosensitization speed, the addition polymerizable compound preferably has a structure having a high content of unsaturated groups per molecule, and in many cases, a bi- or higher functional structure is preferable. In order to enhance the strength of the image parts (that is, the strength of the cured film), the addition polymerizable compound preferably has a tri- or higher functional structure. A method of controlling both photosensitivity and strength by using plural compounds having different functionalities and different polymerizable groups (for example, acrylic acid esters, methacrylic acid esters, styrene compounds, or vinyl ether compounds) in combination can be also effective. The addition polymerizable compound can be used in a proportion in the range of preferably 10% by mass to 60% by mass, and more preferably 15% by mass to 40% by mass, based on the non-volatile components in the composition. The addition polymerizable compound may be used individually alone, or may also be used in combination of two or more species thereof. By using the polymerizable compound, the film properties such as brittleness and flexibility of the relief forming layer may also be adjusted.

In the invention, a polymerizable compound having a plurality of polymerizing groups and a polymerizable compound having only one polymerizing group can be preferably used in combination with a viewpoint of balancing the flexibility and the engraving sensitivity of the film formed from the resin composition.

The resin composition for laser engraving containing the polymerizable compound can be polymerized and cured by energy such as light or heat before and/or after decomposition by laser.

Preferable specific examples of the polymerizable compound usable in the resin composition for laser engraving of the invention are shown below, while the invention is not limited thereby.

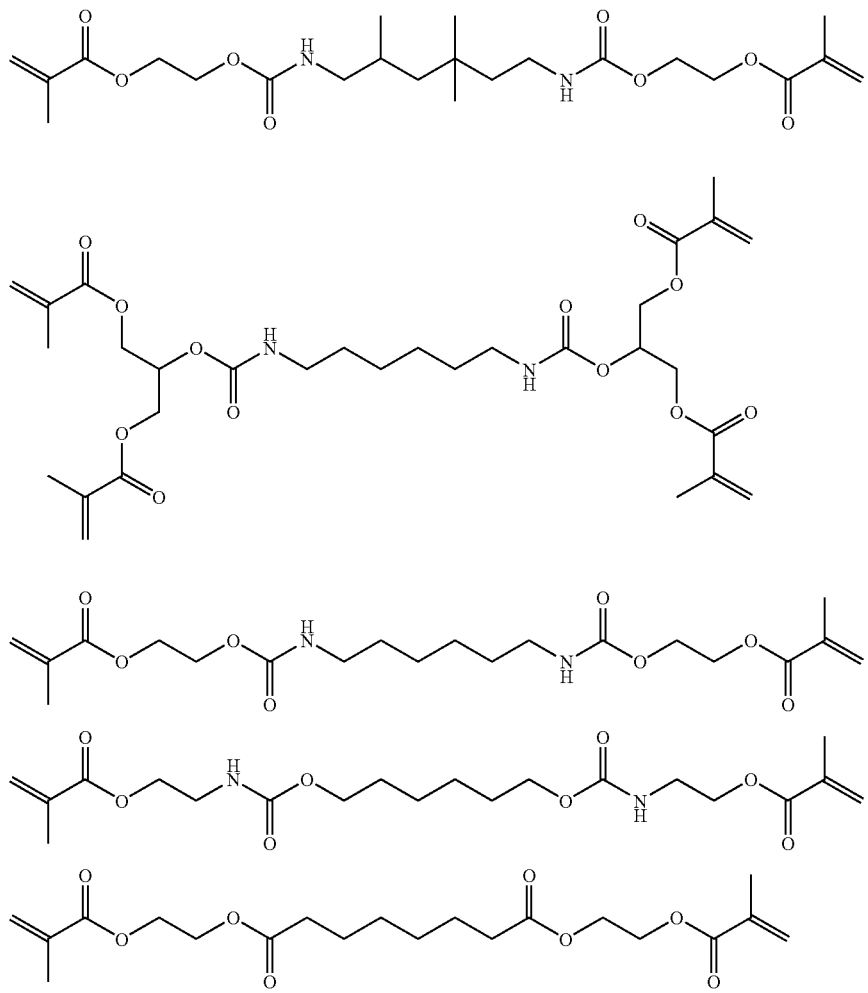

-continued

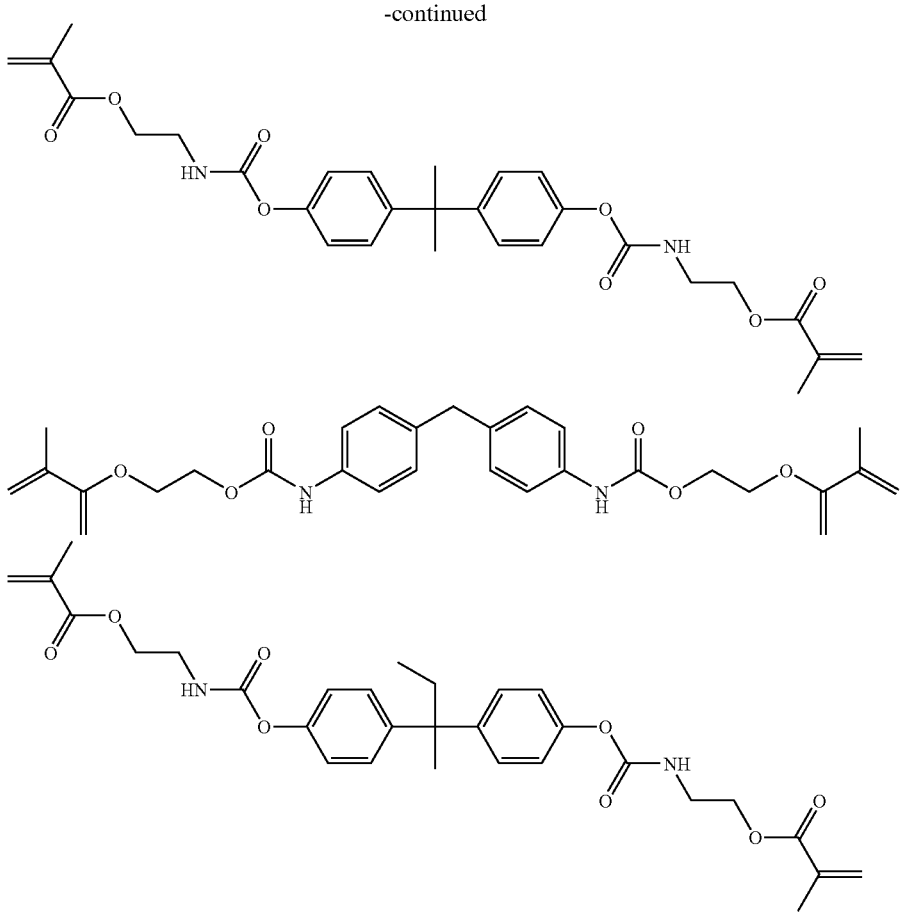

When the resin composition for laser engraving of the invention is used for a relief forming layer of a printing plate precursor for laser engraving, those containing a sulfur (S) atom are particularly preferable among the polymerizable compounds from the viewpoint that edge fusion of a relief formed from a relief forming layer containing thereof may hardly occur and thus provide sharp (well-defined) relief can be easily obtained. That is, the relief forming layer formed from the resin composition preferably contains a sulfur atom in a crosslinked network therein.

While a polymerizable compound which contains a sulfur atom and a polymerizable compound which does not contain a sulfur atom may also be used in combination, it is preferable to use the polymerizable compound containing a sulfur is singly used from the viewpoint that edge fusion of a relief formed from the relief layer containing thereof may hardly occur. A use of plural sulfur-containing polymerizable compounds having different characteristics in combination may contribute to the control of the film flexibility and the like.

Examples of the polymerizable compound containing a sulfur atom include the following compounds.

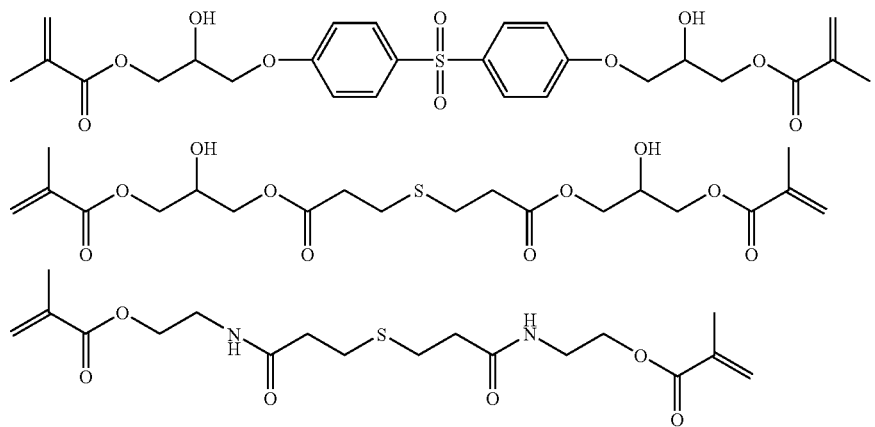

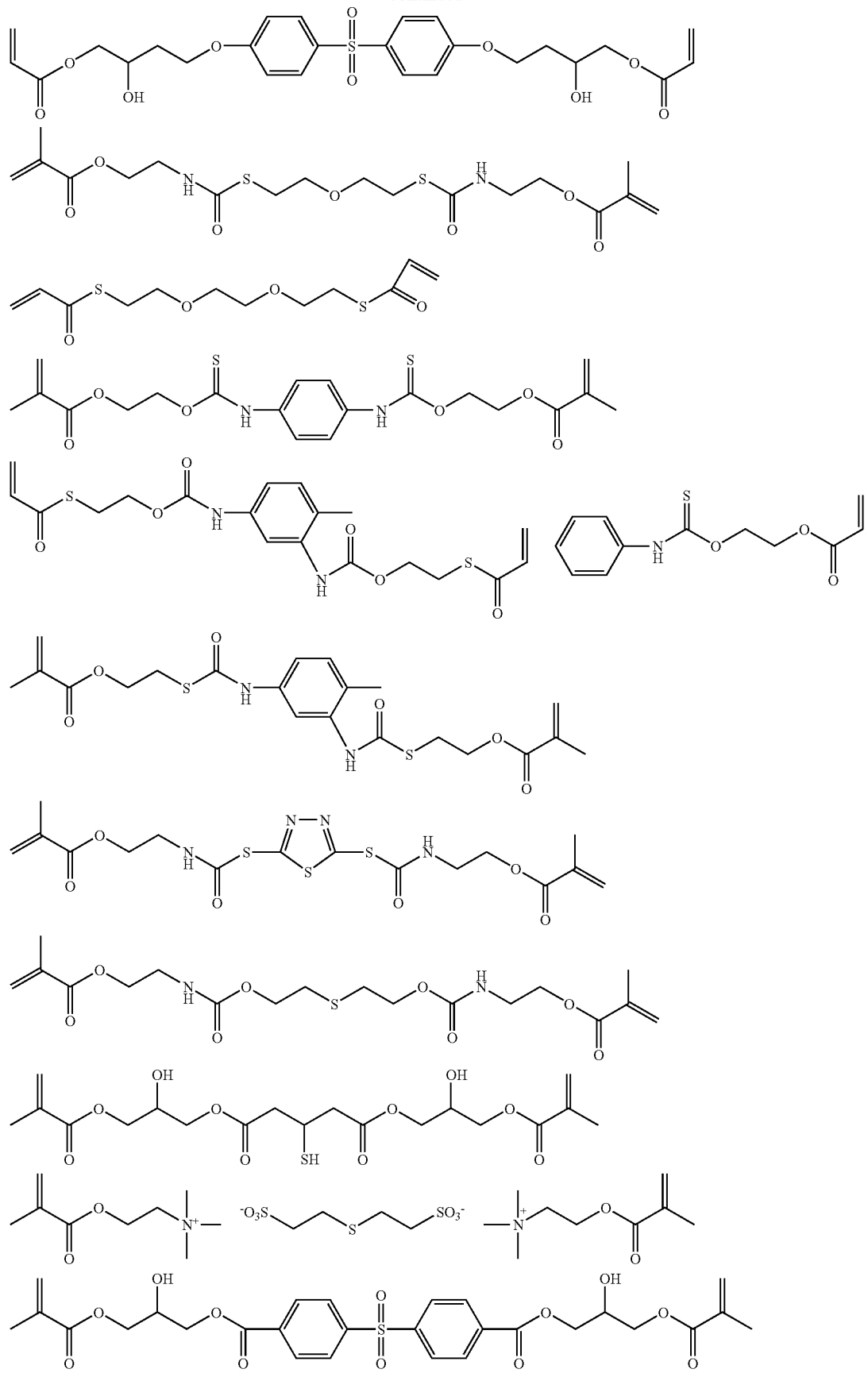

-continued

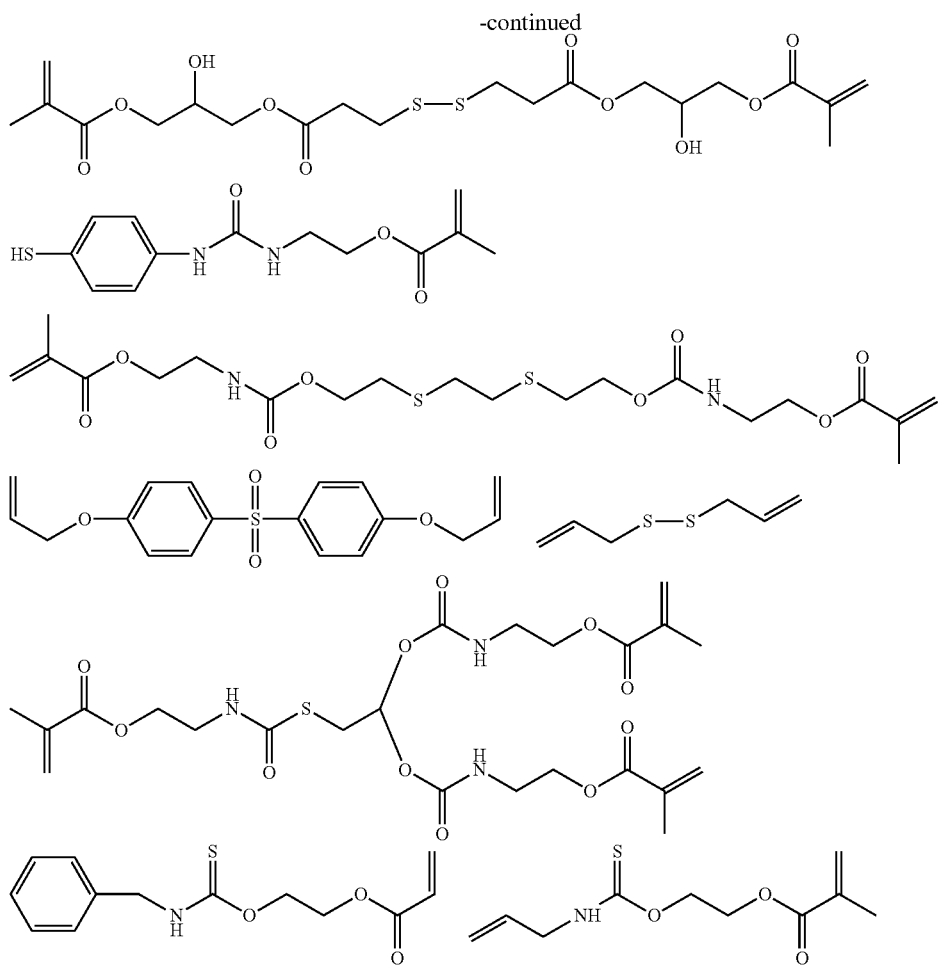

2. Photo-Thermal Conversion Agent

The composition for laser engraving of the invention preferably contains a photo-thermal conversion agent which absorbs light having a wavelength which is in a range of 700 nm to 1,300 nm. Namely, the photo-thermal conversion agent which can be used in the invention has a maximum absorption wavelength of 700 nm to 1,300 nm.

The photo-thermal conversion agent can be used as an infrared-ray absorbing agent when the composition for laser engraving of the invention is applied to laser engraving which uses a laser which emits light having a wavelength of 700 nm to 1,300 nm (such as a YAG laser, a fiber laser or a surface emitting laser) as a light source. The photo-thermal conversion agent absorbs laser light to generate heat, which enhances thermal decomposition of the resin composition. The photo-thermal conversion agent which can be used in the invention is preferably a dye or a pigment, the maximum absorption wavelength of which being in the range of 700 nm to 1,300 nm.

Commercially available dyes and known dyes that are described in literatures such as "Handbook of Dyes" (edited by the Society of Synthetic Organic Chemistry, Japan, 1970), may be used as for the dye. Specific examples thereof include azo dyes, metal complex azo dyes, pyrazolone azo dyes, naphthoquinone dyes, anthraquinone dyes, phthalocyanine dyes, carbonium dyes, diimmonium compounds, quinon-imine dyes, methine dyes, cyanine dyes, squarylium colorants, pyrylium salts, and metal thiolate complexes.

Preferable examples of the dye include the cyanine dyes described in JP-A Nos. 58-125246, 59-84356, 59-202829, 60-78787 and the like; the methine dyes described in JP-A Nos. 58-173696, 58-181690, 58-194595, and the like; the naphthoquinone dyes described in JP-A Nos. 58-112793, 58-224793, 59-48187, 59-73996, 60-52940, 60-63744 and the like; the squarylium colorants described in JP-A No. 58-112792 and the like; the cyanine dyes described in U.K. Patent No. 434,875; and the like Preferable examples of the dye further include the near-infrared absorption sensitizers described in U.S. Pat. No. 5,156,938, the substituted arylbenzo(thio)pyrylium salts described in U.S. Pat. No. 3,881,924; the trimethinethiapyry-lium salts described in JP-A No. 57-142645 (U.S. Pat. No. 4,327,169); the pyrylium-compounds described in JP-A Nos. 58-181051, 58-220143, 59-41363, 59-84248, 59-84249, 59-146063 and 59-146061; the cyanine dyes described in JP-A No. 59-216146; the pentamethinethiopyrylium salts and the like described in U.S. Pat. No. 4,283,475; and the pyrylium compounds described in JP-B Nos. 5-13514 and 5-19702. Preferable examples of the dye furthermore include the near-infrared absorption dyes represented by formulae (I) and (II) in U.S. Pat. No. 4,756,993.

Preferable examples of the photo-thermal conversion agent of the invention include the specific indolenine cyanine colorants described in JP-A No. 2002-278057.

Particularly preferable examples among these dyes include cyanine colorants, squarylium colorants, pyrylium salts, nickel thiolate complexes, and indolenine cyanine colorants. Cyanine colorants or indolenine cyanine colorants are even more preferable.

Specific examples of the cyanine colorants which may be suitably used in the invention include those described in paragraphs [0017] to [0019] of JP-A No. 2001-133969, paragraphs [0012] to [0038] of JP-A No. 2002-40638, and paragraphs [0012] to [0134] of JP-A No. 2002-23360.

The colorants represented by following Formula (d) or Formula (e) are preferable from the viewpoint of photo-thermal conversion property

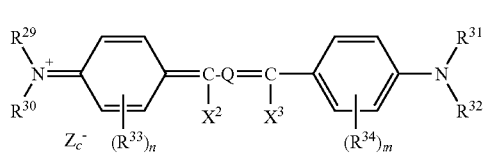

(d)

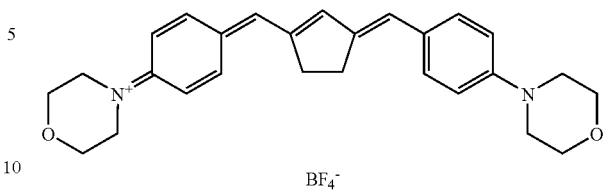

$BF_4^-$

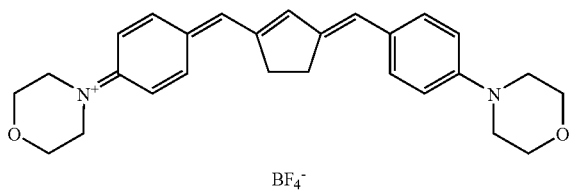

$PF_6^-$

In Formula (d), $R^{29}$ to $R^{31}$ each independently represent a hydrogen atom, an alkyl group or an aryl group; $R^{33}$ and $R^{34}$ each independently represent an alkyl group, a substituted oxy group, or a halogen atom; n and m each independently represent an integer from 0 to 4; $R^{29}$ and $R^{30}$, or $R^{31}$ and $R^{32}$ may be respectively be bound to each other to form a ring, and $R^{29}$ and/or $R^{30}$ may be bound to $R^{33}$, and $R^{31}$ and/or $R^{32}$ may be bound to $R^{34}$, to respectively form a ring; if a plurality of $R^{33}$ are present, the $R^{33}$s may be bound to each other to form a ring; if a plurality of $R^{34}$ are present, the $R^{34}$s may be bound to each other to form a ring; $X^2$ and $X^3$ each independently represent a hydrogen atom, an alkyl group or an aryl group, and at least one of $X^2$ and $X^3$ represents a hydrogen atom or an alkyl group; Q represents a trimethine group or pentamethine group which may be substituted, and may form a cyclic structure together with a divalent organic group; and $Zc^-$ represents a counter-anion. However, if the colorant represented by formula (d) has an anionic substituent in the structure and does not require charge neutralization, $Zc^-$ is not necessary. Preferably, $Zc^-$ is a halogen ion, a perchloric acid ion, a tetrafluoroborate ion, a hexafluorophosphate ion or a sulfonic acid ion, from the viewpoint of the storage stability of the photosensitive layer coating solution, and particularly preferably, $Zc^-$ is a perchloric acid ion, a hexafluorophosphate ion or an arylsulfonic acid ion.

Specific examples of the dyes represented by Formula (d), which may be suitably used in the invention, include those shown below.

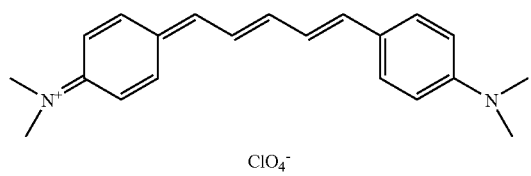

$ClO_4^-$

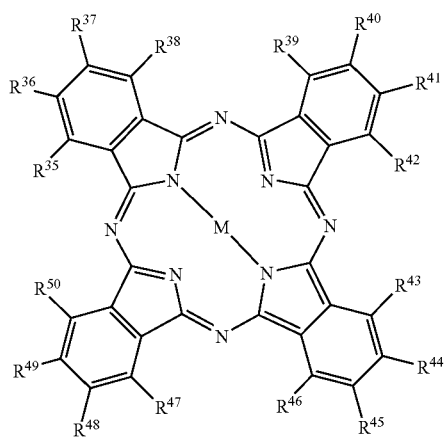

(e)

In Formula (e), $R^{35}$ to $R^{50}$ each independently represent a hydrogen atom, a halogen atom, a cyano group, an alkyl group, an aryl group, an alkenyl group, an alkynyl group, a hydroxyl group, a carbonyl group, a thio group, a sulfonyl group, a sulfinyl group, an oxy group, an amino group, or an onium salt structure, and if it is possible to introduce substituents to these groups, the groups may be substituted; M represents two hydrogen atoms or metal atoms, a halo-metal group, or an oxy-metal group, and as the metal atoms included therein, there may be mentioned the atoms of Groups IA, IIA, IIIB and IVB of the Period Table of Elements, the first-row, second-row and third-row transition metals, and lanthanoid elements. Among them, copper, magnesium, iron, zinc, cobalt, aluminum, titanium and vanadium are preferable.

Specific examples of the dyes represented by Formula (e), which may be suitably used in the invention, include those shown below.

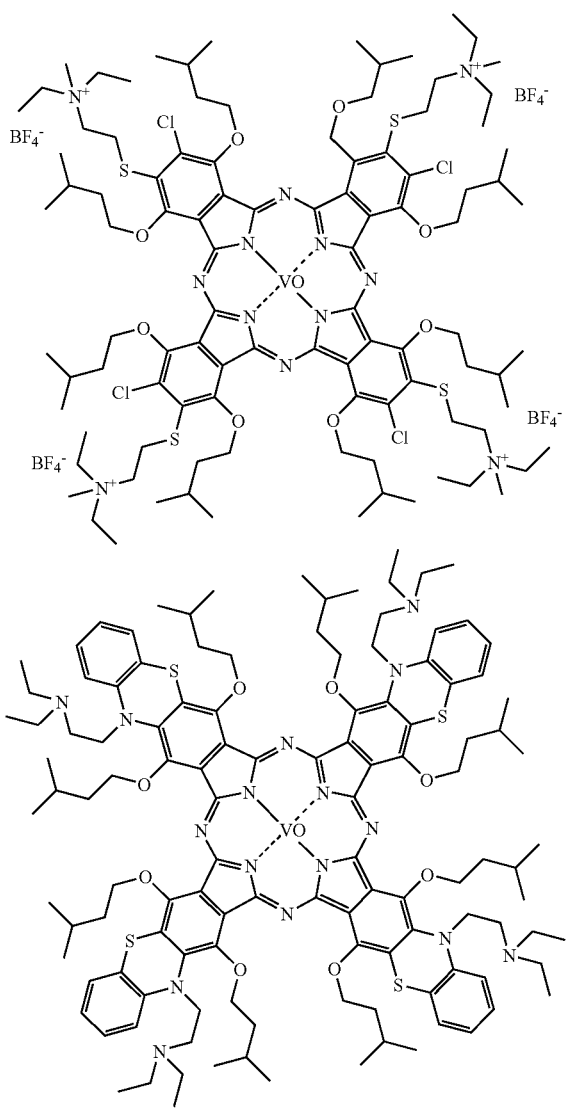

Examples of the pigment which may be used in the invention include commercially available pigments, and the pigments described in the Color Index (C.I.) Handbook, "Handbook of New Pigments" (edited by Japan Association of Pigment Technology, 1977), "New Pigment Application Technology" (published by CMC, Inc., 1986), and "Printing Ink Technology" (published by CMC, 1984).

Examples of the pigments include black pigments, yellow pigments, orange pigments, brown pigments, red pigments, magenta pigments, blue pigments, green pigments, fluorescent pigments, metal powder pigments, and other polymer-bound pigments. Specifically, insoluble azo pigments, azo lake pigments, condensed azo pigments, chelate azo pigments, phthalocyanine pigments, anthraquinone pigments, perylene- and perinone pigments, thio indigo pigments, quinacridone pigments, dioxazine pigments, isoindolinone pigments, quinophthalone pigments, dyed lake pigments, azine pigments, nitroso pigments, nitro pigments, natural pigments, fluorescent pigments, inorganic pigments, carbon black, and the like may be used. Among these pigments, carbon black is preferable.

These pigments may be used without being subjected to a surface treatment, or may be used after being subjected to a surface treatment. Examples of a method of the surface treatment include a method of coating the pigment surface with resin or wax, a method of adhering surfactants to the pigment surface, a method of binding a reactive substance (for example, a silane coupling agent, an epoxy compound, polyisocyanate, or the like) to the pigment surface, and the like. These surface treatment methods are described in "Properties and Applications of Metal Soaps" (published by Saiwai Shobo Co., Ltd.), "Printing Ink Technology" (published by CMC, Inc., 1984), and "New Pigment Application Technology" (published by CMC, Inc., 1986).

The particle size of the pigment is preferably in the range of 0.01 μm to 10 μm, more preferably in the range of 0.05 μm to 1 μm, and particularly preferably in the range of 0.1 μm to 1 μm. When the particle size of the pigment is 0.01 μm or larger, the dispersion stability of the pigment in the coating solution can be increased. Also, when the particle size is 10 μm or less, the uniformity of the layer formed from the resin composition can be improved.

Any known dispersing technologies that are used in the production of ink or in the production of toner may be used as the method for dispersing the pigment. Examples of the dispersing instrument used in the dispersing include an ultrasonic dispersing machine, a sand mill, an attritor, a pearl mill, a super mill, a ball mill, an impeller, a disperser, a KD mill, a colloid mill, Dynatron, a triple-roll mill, a pressurized kneader, and the like. Details are described in "New Pigment Application Technology" (published by CMC, Inc., 1986).

In embodiments, the photo-thermal conversion agent used in the invention can be at least one selected from cyanine compounds and phthalocyanine compounds, which are preferable from the viewpoint of high engraving sensitivity. The engraving sensitivity tends to be further increased and is thus preferable when at least one of these photo-thermal conversion agents are used in a combination under a condition that the thermal decomposition temperature of the photo-thermal conversion agent is equal to or higher than the thermal decomposition temperature of a hydrophilic polymer which is suitable as the binder polymer.

Specific examples of the photo-thermal conversion agent that may be used in the invention include a colorant which have a maximum absorption wavelength in the range of 700 nm to 1,300 nm and is selected from cyanine colorants such as heptamethine cyanine colorants, oxonol colorants such as pentamethine oxonol colorants, indolium colorants, benzindolium colorants, benzothiazolium colorants, quinolinium colorants, phthalide compounds reacted with a color developing agent, and the like. Photo-absorption properties of colorants greatly vary depending on the type and the intramolecular position of the substituent, the number of conjugate bonds, the type of counterion, the surrounding environment around the colorant molecule, or the like.

Commercially available laser colorants, hypersaturated absorption colorants, and near-infrared absorption colorants may also be used. Examples of the laser colorants include "ADS740PP", "ADS745HT", "ADS760MP", "ADS740WS", "ADS765WS", "ADS745HO", "ADS790NH" and "ADS800NH" (all trade names, manufactured by American Dye Source, Inc. (Canada)); and "NK-3555", "NK-3509" and "NK-3519" (all trade names, manufactured by Hayashibara Biochemical Labs, Inc.). Examples of the near-infrared absorption colorants include "ADS775MI", "ADS775MP", "ADS775PI", "ADS775PI", "ADS775PP", "ADS780MT", "ADS780BP", "ADS793EI", "ADS798MI", "ADS798MP", "ADS800AT", "ADS805PI", "ADS805PP", "ADS805PA", "ADS805PF", "ADS812MI", "ADS815EI", "ADS818HI", "ADS818HT", "ADS822MT", "ADS830AT", "ADS838MT", "ADS840MT", "ADS845BI", "ADS905AM", "ADS956BI", "ADS1040T", "ADS1040P", "ADS1045P", "ADS1050P", "ADS1060A", "ADS1065A", "ADS1065P", "ADS1100T", "ADS1120F", "ADS1120P", "ADS780WS", "ADS785WS", "ADS790WS", "ADS805WS", "ADS820WS", "ADS830WS", "ADS850WS", "ADS780HO", "ADS810CO", "ADS820HO", "ADS821NH", "ADS840NH", "ADS880MC", "ADS890MC" and "ADS920MC" (all trade names, manufactured by American Dye Source, Inc. (Canada)); "YKR-2200", "YKR-2081", "YKR-2900", "YKR-2100" and "YKR-3071" (all trade names, manufactured by Yamamoto Chemical Industry Co., Ltd.); "SDO-1000B" (trade name, manufactured by Arimoto Chemical Co., Ltd.); and "NK-3508" and "NKX-114" (both trade names, manufactured by Hayashibara Biochemical Labs, Inc.), while the examples are not intended to be limited to these.

Those described in Japanese Patent No. 3271226 may be used as the phthalide compound reacted with a color developing agent. Phosphoric acid ester metal compounds, for example, the complexes of a phosphoric acid ester and a copper salt described in JP-A No. 6-345820 and WO 99/10354, may also be used as the photo-thermal conversion agent. Further, ultramicroparticles having light absorption characteristics in the near-infrared region, and having a number average particle size of preferably 0.3 µm or less, more preferably 0.1 µm or less, and even more preferably 0.08 µm or less, may also be used as the photo-thermal conversion agent. Examples thereof include metal oxides such as yttrium oxide, tin oxide and/or indium oxide, copper oxide or iron oxide, and metals such as gold, silver, palladium or platinum. Also, compounds obtained by adding metal ions such as the ions of copper, tin, indium, yttrium, chromium, cobalt, titanium, nickel, vanadium and rare earth elements, into microparticles made of glass or the like, which have a number average particle size of 5 µm or less, and more preferably 1 µm or less, may also be used as the photo-thermal conversion agent.

In the case that the colorant may react with a component contained in the resin composition of the invention and causes a change in its maximum absorption wavelength of light absorption, the colorant may be encapsulated in microcapsules. In that case, the number average particle size of the capsules is preferably 10 µm or less, more preferably 5 µm or less, and even more preferably 1 mm or less. Compounds obtained by adsorbing metal ions of copper, tin, indium, yttrium, rare earth elements or the like on ion-exchanged microparticles, may also be used as the photo-thermal conversion agent. The ion-exchanged microparticles may be any of organic resin microparticles or inorganic microparticles. Examples of the inorganic microparticles include amorphous zirconium phosphate, amorphous zirconium phosphosilicate, amorphous zirconium hexametaphosphate, lamellar zirconium phosphate, reticulated zirconium phosphate, zirconium tungstate, zeolites and the like. Examples of the organic resin microparticles include generally used ion-exchange resins, ion-exchange celluloses, and the like.

Most preferably, the photothermal conversion agent in the invention can be a carbon black with a viewpoint of providing high engraving sensitivity. It is estimated that since the carbon black has higher heat resistance compared with organic dye or organic pigment, it is scarcely self-decomposed by the heat generated by photothermal conversion of its own during laser irradiation and can stably generate heat during laser irradiation. On the other hand, an organic dye or a organic pigment may have lower heat resistance in view of the nature that this is an organic compound and is self-decomposed by the heat generated by photothermal conversion of its own during laser irradiation and may be somewhat inferior when compared with the carbon black in view of stable heat generation during laser irradiation. Accordingly, the heat sensitivity is considered as particularly high when a carbon black is used.

Any kind of the carbon black may be used as long as the carbon black has stable dispersibility or the like in the resin composition. The carbon black may be a product classified according to American Society for Testing and Materials (ASTM) standard or may be those usually used in various applications such as coloring, rubber making, or batteries.

Examples of the carbon black include furnace black, thermal black, channel black, lamp black, acetylene black, and the like. In addition, black-colored colorants such as carbon black may be used in the form of color chips or color pastes, in which the colorants have been dispersed in advance in nitrocellulose, a binder or the like, to prepare the resin composition, using a dispersant which facilitates dispersing the ships or pastes in the resin composition if necessary. Such chips or pastes can be easily obtained as commercially available products.

The range of the carbon black which can be used in the invention is wide to include a carbon black having a relatively low specific surface area and a relatively low DBP absorption as well as a micronized carbon black having a large specific surface area.

Suitable examples of the carbon black include PRINTEX U, PRINTEX A, and SPEZIALSCHWARZ 4 (all registered trademarks, manufactured by Degussa GmbH).

A conductive carbon black having a specific surface area of at least 150 $m^2/g$ and the number of DBP of at least 150 ml/100 g is preferably used as the carbon black in the invention with a viewpoint of improving the engraving sensitivity due to its efficiency in conducting heat generated by photothermal conversion to the surrounding polymer and the like.

Preferably, the specific surface area is 250 or more, and particularly preferably 500 $m^2/g$ or more. The number of DBP is preferably 200 or more, and particularly preferably 250 ml/100 g or more. While the carbon black may be acidic or basic, it is preferably a basic carbon black. A mixture of different carbon blacks may of course be used.

Appropriate conductive carbon blacks having the specific surface area as high as about 1500 $m^2/g$ and the number of DBP as large as about 550 ml/100 g are commercially available under the names of KETJENNLACK (registered trade mark): EC300 J, KETJENNLACK (registered trade mark) EC600J (available from Akzo), PRINREX (registered trade mark) XE (available from Degussa) or BLACK PEARLS (registered trade mark) 2000 (available from Cabot), and KETJENBLACK (manufactured by Lion Co.).

While the content of the photothermal conversion agent in the resin composition for laser engraving may greatly vary depending on the magnitude of the molecular absorption coefficient thereof, it is preferably in a range from 0.01 mass % to 20 mass %, more preferably in a range from 0.05 mass % to 10 mass %, and particularly preferably in a range from 0.1 mass % to 5 mass %, based on the total solid content of the resin composition.

(E) Polymerization Initiator

The resin composition for laser engraving of the invention preferably contains a polymerization initiator. Any polymerization initiator that is known to those having ordinary skill in the art may be used in the invention without particular limitation. Specific examples thereof are extensively described in Bruce M. Monroe, et al., Chemical Revue, 93 435 (1993) or R. S. Davidson, Journal of Photochemistry and Biology A: Chemistry, 73, 81 (1993); J. P. Faussier, "Photoinitiated Polymerization—Theory and Applications": Rapra Review Vol. 9, Report, Rapra Technology (1998); M. Tsunooka et al., Prog. Polym. Sci., 21, 1 (1996); and the like. Also known is a family of compounds which oxidatively or reductively cause bond cleavage, such as those described in F. D. Saeva, Topics in Current Chemistry, 156, 59 (1990); G G Maslak, Topics in Current Chemistry, 168, 1 (1993); H. B. Shuster et al., JACS, 112, 6329 (1990); I. D. F. Eaton et al., JACS, 102, 3298 (1980); and the like.

Hereinafter, specific examples of preferable polymerization initiators will be discussed in detail, particularly with regard to a radical polymerization initiator which is a compound capable of generating a radical by the action of photo and/or thermal energy, and initiating and accelerating a polymerization reaction with a polymerizable compound, while the invention is not intended to be restricted thereby.

According to the invention, preferable examples of the radical polymerization initiator include (a) aromatic ketone, (b) onium salt compound, (c) organic peroxide, (d) thio compound, (e) hexaarylbiimidazole compound, (f) keto oxime ester compound, (g) borate compound, (h) azinium compound, (i) metallocene compound, (j) active ester compound, (k) compound having a carbon-halogen bond, (l) azo compound, and the like. Specific examples of the compounds of (a) to (l) will be shown in the followings, while the invention is not limited thereto.

(a) Aromatic Ketone

Examples of the (a) aromatic ketone which is preferable as the radical polymerization initiator usable in the invention include the compounds having a benzophenone skeleton and a thioxanthone skeleton as described in "RADIATION CURING IN POLYMER SCIENCE AND TECHNOLOGY", J. P. Fouassier and J. F. Rabek (1993), p. 77-117. For example, the following compounds may be mentioned.

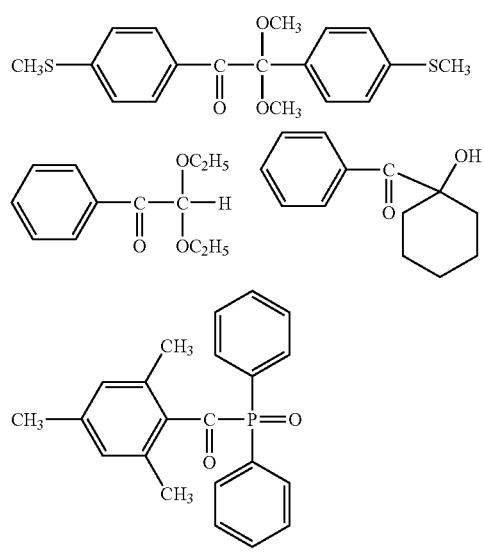

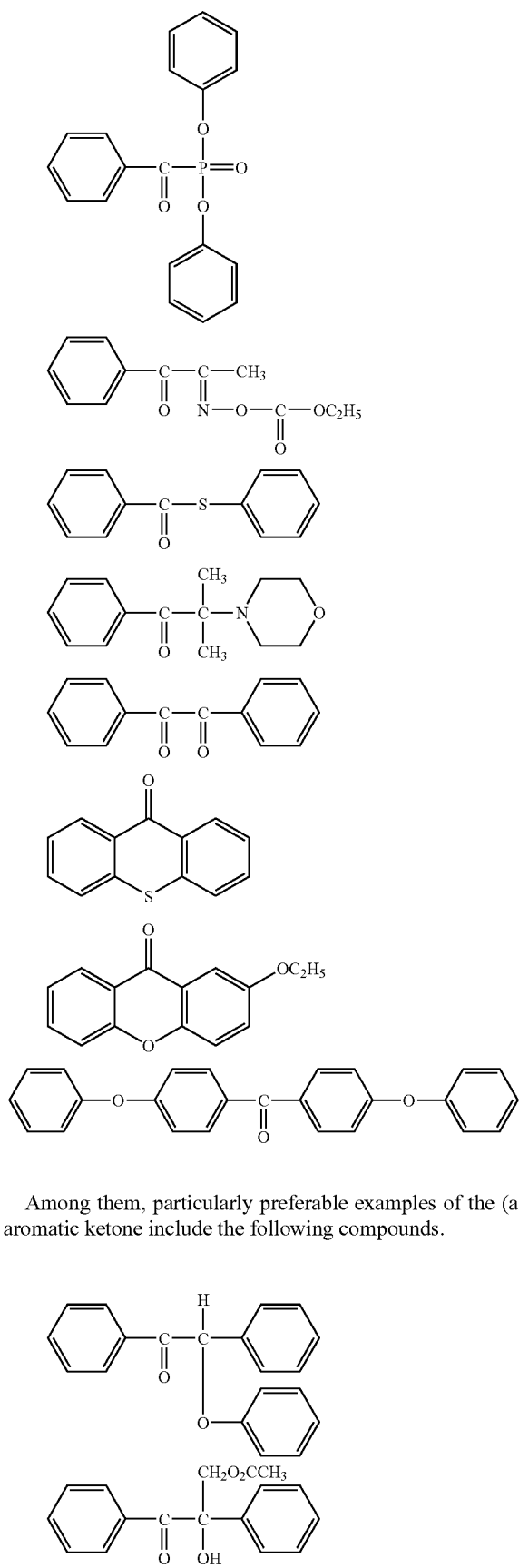

Among them, particularly preferable examples of the (a) aromatic ketone include the following compounds.

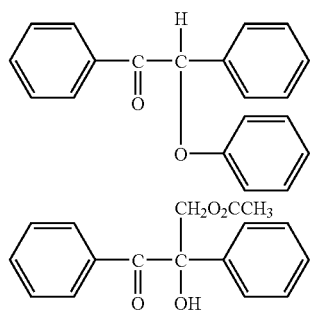

-continued

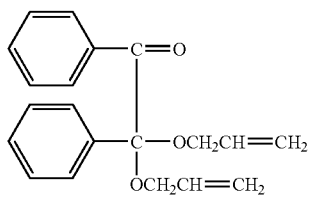
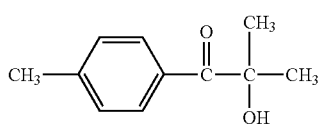
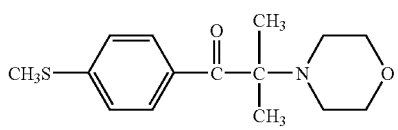
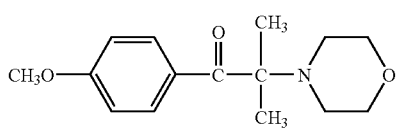
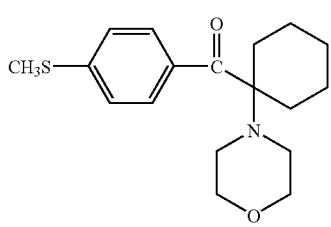
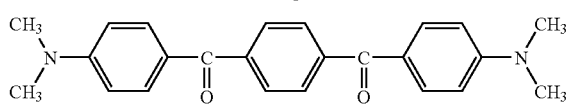
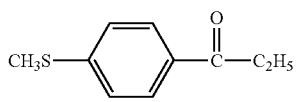
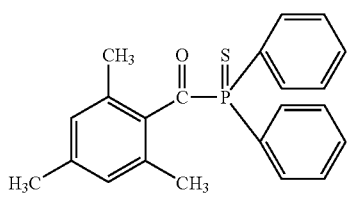
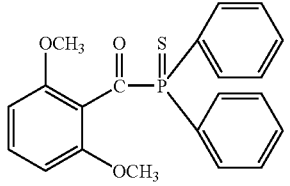
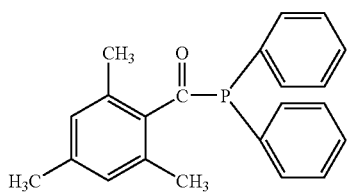

-continued

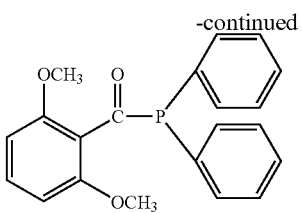

(b) Onium Salt Compound

Examples of the (b) onium salt compound which is preferable as the radical polymerization initiator usable in the invention include compounds represented by any one of the following Formulae (1) to (3).

In Formula (1), $Ar^1$ and $Ar^2$ each independently represent an aryl group having up to 20 carbon atoms, which may be substituted; and $(Z^2)^-$ represents a counterion selected from the group consisting of a halogen ion, a perchlorate ion, a carboxylate ion, a tetrafluoroborate ion, a hexafluorophosphate ion and a sulfonate ion, and is preferably a perchlorate ion, a hexafluorophosphate ion or an arylsulfonate ion.

In Formula (2), $Ar^3$ represents an aryl group having up to 20 carbon atoms, which may be substituted; and $(Z^3)^-$ represents a counterion which is defined in the same manner as $(Z^2)^-$.

In Formula (3), $R^{23}$, $R^{24}$ and $R^{25}$, which may be the same or different from each other, each represent a hydrocarbon group having up to 20 carbon atoms, which may be substituted; and $(Z^4)^-$ represents a counterion which is defined in the same manner as $(Z^2)^-$.

Specific examples of the onium salt which may be suitably used in the invention include those described in paragraphs [0030] to [0033] of JP-A No. 2001-133969 or those described in paragraphs [0015] to [0046] of JP-A No. 2001-343742, which have been previously suggested by the Applicant, and the specific aromatic sulfonium salt compounds described in JP-A Nos. 2002-148790, 2001-343742, 2002-6482, 2002-116539 and 2004-102031.

(c) Organic Peroxide

Example of the (c) organic peroxide which is preferable as the radical polymerization initiator usable in the invention include nearly all of organic compounds having one or more oxygen-oxygen bonds in the molecule. Specific examples thereof include t-butyl peroxy benzoate, methyl ethyl ketone peroxide, cyclohexanone peroxide, 3,3,5-trimethylcyclohexanon peroxide, methylcyclohexanone peroxide, acetylacetone peroxide, 1,1-bis(tertiary-butylperoxy)-3,3,5-trimethylcyclohexane, 1,1-bis(tertiary-butylperoxy)cyclohexane, 2,2-bis(tertiary-butylperoxy)butane, tertiary-butyl hydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, di-tertiary-butyl peroxide, tertiary-butylcumyl peroxide, dicumyl peroxide, bis(tertiary-butylperoxyisopropyl)benzene, 2,5-dimethyl-2,5-di(tertiary-butylperoxy)hexane, 2,5- xanoyl peroxide, succinic acid peroxide, benzoyl peroxide, 2,4-dichlorobenzoyl peroxide, meta-toluoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl)peroxydicarbonate, tertiary-butyl peroxyacetate, tertiary-butyl peroxypivalate, tertiary-butyl peroxyneodecanoate, tertiary-butyl peroxyoctanoate, tertiary-butyl peroxy-3,5,5-trimethylhexanoate, tertiary-butyl peroxylaurate, tertiary-carbonate, 3,3',4,4'-tetra(t-butlperoxycarbonyl)benzophenone, 3,3',4,4'-tetra(t-amylperoxycarbonyl)benzophenone, 3,3'4,4'-tetra(t-hexylperoxycarbonyl) benzophenone, 3,3'4,4'-tetra-(t-octylperoxycarbonyl) benzophenone, 3,3'4,4'-tetra-(cumylperoxycarbonyl) benzophenone, 3,3'4,4'-tetra-(p-isopropylcumylperoxycarbonyl)benzophenone, carbonyl di(t-butylperoxy dihydrogen diphthalate), carbonyl di(t-hexylperoxy dihydrogen diphthalate), and the like.

Among them, 3,3',4,4'-tetra(t-butylperoxycarbonyl)benzophenone, 3,3'4,4'-tetra-(t-amylperoxycarbonyl)benzophenone, 3,3',4,4'-tetra-(t-hexylperoxycarbonyl)benzophenone, 3,3'4,4'-tetra-(t-octylperoxycarbonyl)benzophenone, 3,3'4,4'-tetra-(cumylperoxycarbonyl)benzophenone, 3,3'4,4'-tetra-(p-isopropylcumylperoxycarbonyl)benzophenone, and di-t-butyl diperoxyisophthalate are preferable, and t-butyl peroxy benzoate and dicumyl peroxide are more preferable.

(d) Thio Compound

Examples of the (d) thio compound which is preferable as the radical polymerization initiator usable in the invention include compounds having a structure represented by following Formula (4).

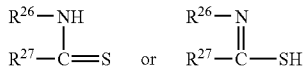

Formula (4)

In Formula (4), $R^{26}$ represents an alkyl group, an aryl group or a substituted aryl group; $R^{27}$ represents a hydrogen atom or an alkyl group; and $R^{26}$ and $R^{27}$ may be bound to each other to represent a non-metallic atomic group necessary for forming a 5- to 7-membered ring which may contain a heteroatom selected from an oxygen atom, a sulfur atom and a nitrogen atom.

Specific examples of the thio compound represented by Formula (4) include the compounds shown below.

| No. | $R^{26}$ | $R^{27}$ |
|---|---|---|
| 1 | —H | —H |
| 2 | —H | —CH₃ |
| 3 | —CH₃ | —H |
| 4 | —CH₃ | —CH₃ |
| 5 | —C₆H₅ | —C₂H₅ |
| 6 | —C₆H₅ | —C₄H₉ |
| 7 | —C₆H₄Cl | —CH₃ |
| 8 | —C₆H₄Cl | —C₄H₉ |
| 9 | —C₆H₄—CH₃ | —C₄H₉ |
| 10 | —C₆H₄—OCH₃ | —CH₃ |
| 11 | —C₆H₄—OCH₃ | —C₂H₅ |
| 12 | —C₆H₄—OC₂H₅ | —CH₃ |
| 13 | —C₆H₄—OC₂H₅ | —C₂H₅ |
| 14 | —C₆H₄—OCH₃ | —C₄H₉ |
| 15 | | —(CH₂)₂— |
| 16 | | —(CH₂)₂—S— |
| 17 | | —CH(CH₃)—CH₂—S— |
| 18 | | —CH₂—CH(CH₃)—S— |
| 19 | | —C(CH₃)₂—CH₂—S— |

-continued

| No. | $R^{26}$ | $R^{27}$ |
|---|---|---|
| 20 | | —CH₂—C(CH₃)₂—S— |
| 21 | | —(CH₂)₂—O— |
| 22 | | —CH(CH₃)—CH₂—O— |
| 23 | | —C(CH₃)₂—CH₂—O— |
| 24 | | —CH=CH—N(CH₃)— |
| 25 | | —(CH₂)₃—S— |
| 26 | | —(CH₂)₂—CH(CH₃)—S— |
| 27 | | —(CH₂)₃—O— |
| 28 | | —(CH₂)₅— |
| 29 | | —C₆H₄—O— |
| 30 | | —N=C(SCH₃)—S— |
| 31 | | —C₆H₄—NH— |
| 32 | |  |

(e) Hexaarylbiimidazole Compound

Examples of the (e) Hexaarylbiimidazole compound which is preferable as the radical polymerization initiator usable in the invention include the rofin dimers described in JP-B Nos. 45-37377 and 44-86516. Specific examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra (m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, 2,2'-bis(o-triflourophenyl)-4,4',5,5'-tetraphenylbiimidazole, and the like.

(f) Keto Oxime Ester Compounds

Examples of the (f) keto oxime ester compound which is preferable as the radical polymerization initiator in the invention include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, 2-ethoxycarbonyloxyimino-1-phenylpropan-1-one, and the like.

(g) Borate Compounds

Examples of the (g) Borate compounds which is preferable as the radical polymerization initiator usable in the invention include compounds represented by following Formula (5).

$$R^{28}\!-\!\underset{\underset{R^{30}}{|}}{\overset{\overset{R^{29}}{|}}{B^-}}\!-\!R^{31} \quad (Z^5)^+ \tag{5}$$

In Formula (5), $R^{28}$, $R^{29}$, $R^{30}$ and $R^{31}$, which may be the same or different from each other, each represent a substituted or unsubstituted alkyl group, a substituted or unsubstituted aryl group, a substituted or unsubstituted alkenyl group, a substituted or unsubstituted alkynyl group, or a substituted or unsubstituted heterocyclic group, and two or more groups among $R^{28}$, $R^{29}$, $R^{30}$ and $R^{31}$ may be bound with each other to form a cyclic structure, with the proviso that at least one among $R^{28}$, $R^{29}$, $R^{30}$ and $R^{31}$ is a substituted or unsubstituted alkyl group; and $(Z^5)^+$ represents an alkali metal cation or a quaternary ammonium cation.

Specific examples of the compound represented by Formula (5) include the compounds described in U.S. Pat. Nos. 3,567,453 and 4,343,891, and European Patent Nos. 109,772 and 109,773, and the compounds shown below.

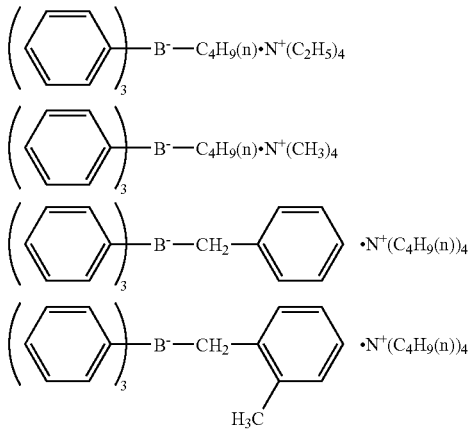

(h) Azinium Compounds

Examples of the (h) azinium salt compound which is preferable as the radical polymerization initiator usable in the invention include the compounds having an N—O bond as described in JP-A Nos. 63-138345, 63-142345, 63-142346 and 63-143537, and JP-B No. 46-42363.

(i) Metallocene Compounds

Examples of the (i) Metallocene compounds which is preferable as the radical polymerization initiator usable in the invention include the titanocene compounds described in JP-A Nos. 59-152396, 61-151197, 63-41484, 2-249 and 2-4705, and the iron arene complexes described in JP-A Nos. 1-304453 and 1-152109.

Specific examples of the titanocene compounds include dicyclopentadienyl-Ti-dichloride, dicyclopentadienyl-Ti-bisphenyl, dicyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,6-difluoro-3-(pyrr-1-yl)phenyltitaniumbis(cyclopentadienyl)bis[2,6-difluoro-3-(methylsulfonamido)phenyl]titanium, bis(cyclopentadienyl)bis[2,6-difluoro-3-(N-butylbiaroylamino)phenyl]titanium, bis(cyclopentadienyl)bis[2,6-difluoro-3-(N-butyl-(4-chloropbenzoyl)amino)phenyl]titanium, bis(cyclopentadienyl)bis[2,6-difluoro-3-(N-benzyl-2,2-dimehylpentanoylamino)phenyl]titanium, bis(cyclopentadienyl)bis[2,6-difluoro-3-(N-(2-ethylhexyl-4-tolylsulfonyl)amino)phenyl]titanium, bis(cyclopentadienyl)bis[2,6-difluoro-3-(N-(3-oxaheptyl)benzoylamino)phenyl]titanium, bis(cyclopentadienyl)bis[2,6-difluoro-3-(N-(3,6-dioxadecyl)benzoylamino)phenyl]titanium, bis(cyclopentadienyl)bis[2,6-difluoro-3-(trifluoromethylsulfonylamino)phenyl]titanium, bis(cyclopentadienyl)bis[2,6-difluoro-3-(trifluoroacetylamino)phenyl]titanium, bis(cyclopentadienyl)bis[2,6-difluoro-3-(2-chlorobenzoylamino)phenyl]titanium, bis(cyclopentadienyl)bis[2,6-difluoro-3-(4-chlorobenzoylamino)phenyl]titanium, bis(cyclopentadienyl)bis[2,6-difluoro-3-(N-(3,6-dioxadecyl)-2,2-dimethylpentanoylamino)phenyl]titanium, bis(cyclopentadienyl)bis[2,6-difluoro-3-(N-(3,7-dimethyl-7-methoxyoctyl)benzoylamino)phenyl]titanium, bis(cyclopentadienyl)bis[2,6-difluoro-3-(N-cyclohexylbenzoylamino)phenyl]titanium, and the like.

(j) Active Ester Compounds

Examples of the (j) active ester compound which is preferable as the radical polymerization initiator usable in the invention include the imidosulfonate compounds described in JP-A No. 62-6223, and the active sulfonates described in JP-B No. 63-14340 and JP-A No. 59-174831.

(k) Compounds having Carbon-Halogen Bond

Examples of the (k) compound having a carbon-halogen bond which is preferable as the radical polymerization initiator invention include compounds represented by following formulae (6) to (12).

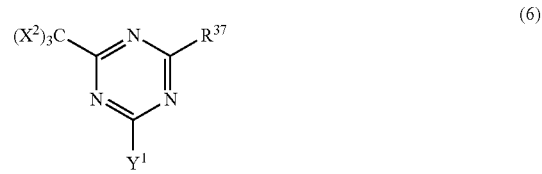

In Formula (6), $X^2$ represents a halogen atom; $Y^1$ represents $—C(X^2)_3$, $—NH_2$, $—NHR^{38}$, $—NR^{38}$, or $—OR^{38}$; $R^{38}$ represents an alkyl group, a substituted alkyl group, an aryl group or a substituted aryl group; and $R^{37}$ represents $—C(X^2)_3$, an alkyl group, a substituted alkyl group, an aryl group, a substituted aryl group, or a substituted alkenyl group.

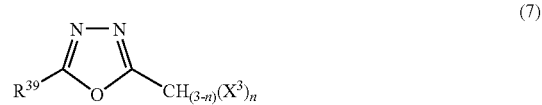

In Formula (7), $R^{39}$ represents an alkyl group, a substituted alkyl group, an alkenyl group, a substituted alkenyl group, an aryl group, a substituted aryl group, a halogen atom, an alkoxy group, a substituted alkoxy group, a nitro group, or a cyano group; $X^3$ represents a halogen atom; and n represents an integer from 1 to 3.

In Formula (8), $R^{40}$ represents an aryl group or a substituted aryl group; $R^{41}$ represents any one of the groups shown below, or a halogen atom; $Z^6$ represents $—C(=O)—$, $—C(=S)—$ or $—SO_2—$; $X^3$ represents a halogen atom; and m represents 1 or 2.

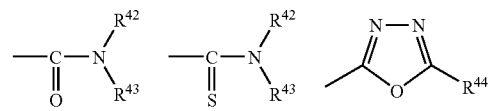

wherein $R^{42}$ and $R^{43}$ are each an alkyl group, a substituted alkyl group, an alkenyl group, a substituted alkenyl group, an aryl group or a substituted aryl group; and $R^{44}$ has the same meaning as defined for $R^{38}$ in Formula (6).

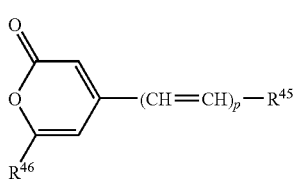
(9)

In Formula (9), $R^{45}$ represents an aryl group or a heterocyclic group, each of which may be substituted; $R^{46}$ represents a trihaloalkyl group or a trihaloalkenyl group, each having 1 to 3 carbon atoms; and p represents 1, 2 or 3.

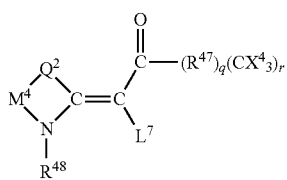
(10)

Formula (10) represents a carbonylmethylene heterocyclic compound having a trihalogenomethyl group. In Formula (10), $L^7$ represents a hydrogen atom or a substituent of formula: CO—$(R^{47})_q(C(X^4)_3)_r$; $Q^2$ represents a sulfur atom, a selenium atom, an oxygen atom, a dialkylmethylene group, an alken-1,2-ylene group, a 1,2-phenylene group, or an N—R group; $M^4$ represents a substituted or unsubstituted alkylene or alkenylene group, or represents a 1,2-arylene group; $R^{38}$ represents an alkyl group, an aralkyl group or an alkoxyalkyl group; $R^{47}$ represents a carbocyclic or heterocyclic divalent aromatic group; $X^4$ represents a chlorine atom, a bromine atom or an iodine atom; and either q=0 and r=1, or q=1 and r=1 or 2.

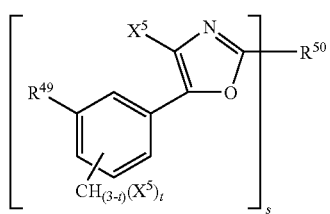
(11)

Formula (11) represents a 4-halogeno-5-(halogenomethylphenyl)oxazole compound. In Formula (11), $X^5$ represents a halogen atom; t represents an integer from 1 to 3; s represents an integer from 1 to 4; $R^{49}$ represents a hydrogen atom or a CH$_{3-t}$X$^{50}_t$ group; $R^{50}$ represents an unsaturated organic group which has a valency of s and may be substituted.

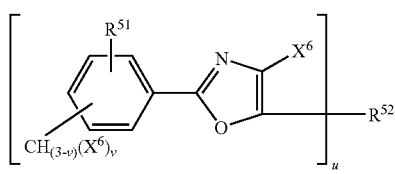
(12)

Formula (12) represents a 2-(halogenomethylphenyl)-4-halogeno-oxazole derivative. In Formula (12), $X^6$ represents a halogen atom; v represents an integer from 1 to 3; u represents an integer from 1 to 4; $R^{51}$ represents a hydrogen atom or a CH$_{3-v}$X$^6_v$ group; and $R^{52}$ represents an unsaturated organic group which has a valency of u and may be substituted.

Specific examples of the compounds having a carbon-halogen bond include the compounds described in Wakabayashi, et al., Bull. Chem. Soc. Japan, 42, 2924 (1969), for example, 2-phenyl-4,6-bis(trichlormethyl)-S-triazine, 2-(p-chlorphenyl)-4,6-bis(trichlormethyl)-S-triazine, 2-(p-tolyl)-4,6-bis(trichlormethyl)-3-triazine, 2-(p-methoxyphenyl)-4,6-bis(trichlormethyl)-S-triazine, 2-(2',4'-dichlorphenyl)-4,6-bis(trichlormethyl)-S-triazine, 2,4,6-tris(trichlormethyl)-S-triazine, 2-methyl-4,6-bis(trichlormethyl)-S-triazine, 2-n-nonyl-4,6-bis(trichlormethyl)-S-triazine, 2-(α,α,β-trichlorethyl)-4,6-bis(trichlormethyl)-S-triazine, and the like. In addition, the compounds described in U.K. Patent No. 1388492, for example, 2-styryl-4,6-bis(trichlormethyl)-S-triazine, 2-(p-methylstyryl)-4,6-bis(trichlormethyl)-S-triazine, 2-(p-methoxystyryl)-4,6-bis(trichlormethyl)-S-triazine, 2-(p-methoxystyryl)-4-amino-6-trichlormethyl-S-triazine, and the like; the compounds described in JP-A No. 53-133428, for example, 2-(4-methoxy-naphth-1-yl)-4,6-bis-trichlormethyl-S-triazine, 2-(4-ethoxy-naphth-1-yl)-4,6-bis-trichlormethyl-S-triazine, 2-[4-(2-ethoxyethyl)-naphth-1-yl]-4,6-bis-trichlormethyl-S-triazine, 2-(4,7-dimethoxy-naphth-1-yl)-4,6-bis-trichlormethyl-S-triazine, 2-(acenaphth-5-yl)-4,6-bis-trichlormethyl-S-triazine, and the like; the compounds described in German Patent No. 3337024, for example, the compounds shown below; and the like may also be mentioned. Furthermore, there may be mentioned a family of compounds as shown below, which can be easily synthesized by a person having ordinary skill in the art according to the synthesis method described in M. P. Hutt, E. F. Elslager and L. M. Herbel, "Journal of Heterocyclic Chemistry", Vol. 7, No. 3, p. 511-(1970), for example, the following compounds.

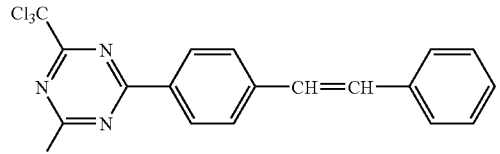

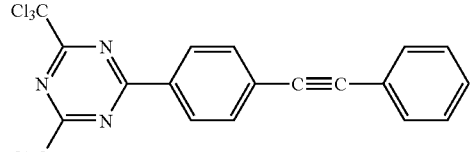

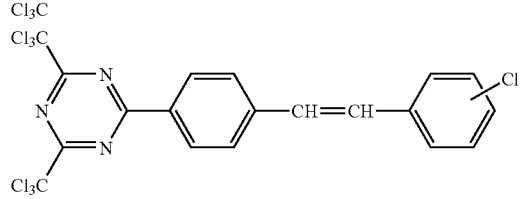

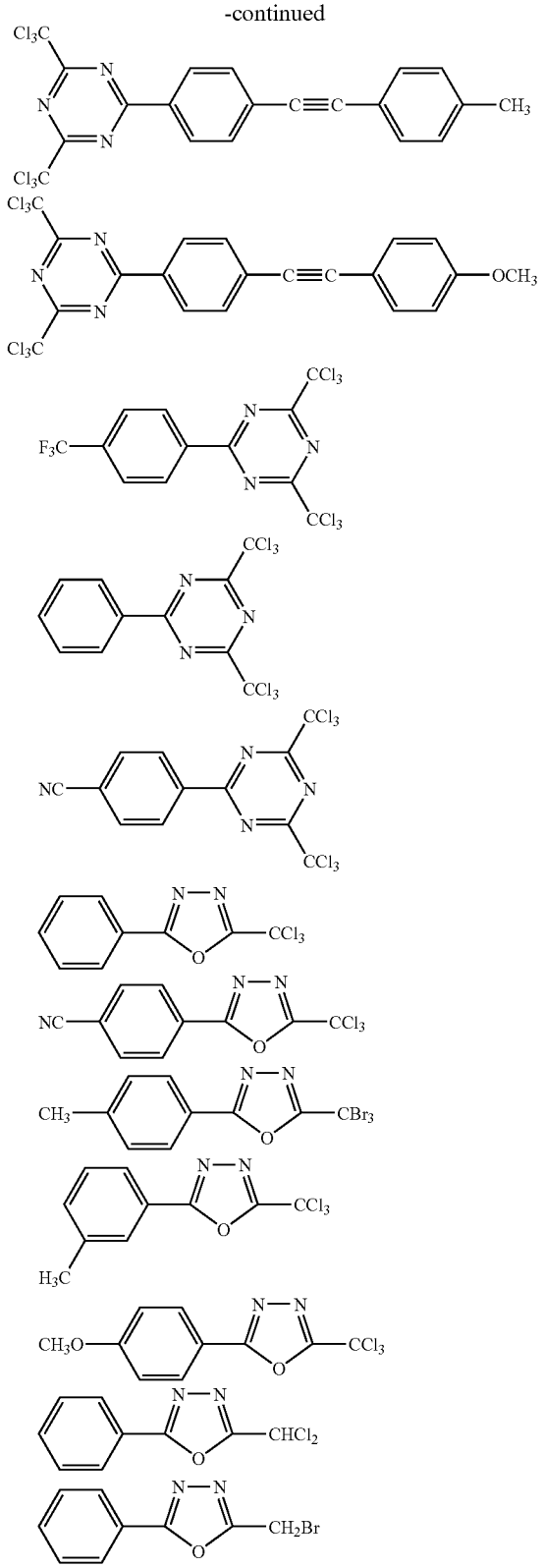

(1) Azo Compound

Examples of the (1) azo compound which is preferable as the radical polymerization initiator usable in the invention include 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobisisobutyrate, 2,2'-azobis(2-methylpropionamideoxime), 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide], 2,2'-azobis(2,4,4-trimethylpentane), and the like.

More preferable examples of the radical polymerization initiator for the invention include the (a) aromatic ketone, (b) onium salt compound, (c) organic peroxide, (e) hexaarylbiimidazole compound, (i) metallocene compound, and (k) compound having a carbon-halogen bond, and most preferable examples thereof include an aromatic iodonium salt, an aromatic sulfonium salt, a titanocene compound, and a trihalomethyl-S-triazine compound represented by Formula (6).

Among them, the organic peroxide (c) is particularly preferable as the polymerization initiator used for the resin composition of the invention with a viewpoint of the cross linking property and the engraving sensitivity of the relief forming layer formed from the resin composition.

While the function of improving the engraving sensitivity in a case of using the organic peroxide (c) as the polymerization initiator is not completely clarified, it is estimated as described below.

That is, it is considered that the organic peroxide (c) is not completely exhausted, and unreacted products remain to some extent when crosslinking is thermally formed by heating in a film formed from the resin composition containing the organic peroxide (c) as the polymerization initiator (that is, in the relief forming layer). The remaining organic peroxide functions as a self reacting additive and is pyrogenically decomposed in a region exposed to laser during laser engraving. As a result, a heat accompanying the decomposition of the organic peroxide can be further added to the irradiated laser energy, which amplifies the decomposition of the relief forming layer and scattering of decomposition products to further improve the engraving sensitivity.

The amount of the (E) polymerization initiator used in the invention may be preferably 0.01% by mass to 10% by mass, and more preferably 0.1% by mass to 3% by mass, relative to the total solid content of the resin composition for laser engraving containing the (C) polymerizable compound. The polymerization initiators are suitably used by using them individually alone, or in combination of two or more species.

(F) Plasticizer

The resin composition for laser engraving of the invention preferably contains a plasticizer.

Examples of the plasticizer include dioctyl phthalate, didodecyl phthalate, triethylene glycol dicaprylate, methyl glycol phthalate, tricresyl phosphate, dioctyl adipate, dibutyl sebacate, triacetylglycerin, and the like. Examples of the plasticizer further include polyethylene glycols, polypropylene glycol (mono-ol type, diol type and the like), and polypropylene glycol (mono-ol type, diol type and the like).

Since the plasticizer is expected to have an effect to soften the relief forming layer, the plasticizer is desired to have good compatibility with the binder polymer. In general, a highly hydrophilic compound has good compatibility with the binder polymer. Among highly hydrophilic compounds, an ether compound containing a heteroatom in a straight chain, or a compound having a structure in which a hydrophilic group such as secondary amine and a hydrophobic group are alternately repeated, can be preferably used. The presence of the hydrophilic group such as —O— or —NH— achieves the compatibility of such compounds with PVA compounds, and the other hydrophobic group weakens the intermolecular force of PVA compounds, to thereby contribute to the softening.

A compound having fewer hydroxyl groups which are capable of forming hydrogen bonding between PVA compounds can be also preferably used as the plasticizer. Examples of such compound include ethylene glycol, propylene glycol, and dimers, trimers, and homo-oligomers or co-oligomers such as tetramer or higher-mers of ethylene glycol and propylene glycol, and secondary amines such as diethanolamine and dimethylolamine. Among these, ethylene glycols (monomers, dimers, trimers and oligomers) having small steric hindrance, excellent compatibility and low toxicity, are particularly preferably used as the plasticizer.

Ethylene glycols are roughly classified into three types according to the molecular weight. The first group includes ethylene glycol, which is a monomer; the second group includes diethylene glycol, which is a dimer, and triethylene glycol, which is a trimer; and the third group includes polyethylene glycol, which is a tetramer or higher one. Polyethylene glycol is roughly classified into liquid polyethylene glycol having a molecular weight in the range of 200 to 700, and solid polyethylene glycol having a molecular weight of 1000 or greater, and those are commercially available under names followed by the average molecular weight in many cases.

As a result of intensive search, the present inventors have found that the lower molecular weight of the plasticizer is, the effect of the plasticizer to soften a resin is enhanced. In consideration of this, compounds which may be particularly preferably used as the plasticizer are ethylene glycol which belongs to the first group, diethylene glycol and triethylene glycol which belong to the second group, and tetraethylene glycol (tetramer) which belongs to the third group. Among them, diethylene glycol, triethylene glycol and tetraethylene glycol can be more preferably used as the plasticizer from the viewpoints of low toxicity, absence of extraction from the resin composition, and excellent handling property thereof. Mixtures of two or more of the plasticizers can be also preferably used.

The plasticizer may be added in a proportion of 10% by mass or less with respect to the total mass of the solid content of the resin composition for laser engraving.

Additives for Enhancing Engraving Sensitivity
Nitrocellulose

Examples of an additive for enhancing engraving sensitivity include nitrocellulose.

Nitrocellulose, that is a self-reactive compound, generates heat at the time of laser engraving to assist thermal decomposition of the co-existing hydrophilic polymer. The engraving sensitivity is assumed to be enhanced as a result thereof.

Any nitrocellulose can be used in the invention as long as it can be thermally decomposed, and can be any one of RS (regular soluble) nitrocellulose, SS (spirit soluble) nitrocellulose and AS (alcohol soluble) nitrocellulose. The content of nitrogen in the nitrocellulose is usually about 10% by mass to 14% by mass, preferably 11% by mass to 12.5% by mass, and more preferably about 11.5% by mass to 12.2% by mass. The degree of polymerization of the nitrocellulose may also be selected from a wide range of about 10 to 1500. The polymerization degree of the nitrocellulose is typically 10 to 900, and preferably about 15 to about 150. Preferable examples of the nitrocellulose include those having a solution viscosity of 20 seconds to 1/10 seconds, more preferably about 10 seconds to 1/8 seconds, measured according to the method of viscosity indication provided by Hercules Powder Company, that is also known as JIS K6703 "Nitrocelluloses for Industrial Use". The nitrocellulose which can be used in the invention typically has a solution viscosity of 5 seconds to 1/8 seconds, which is preferably about 1 second to 1/8 seconds.

The RS nitrocellulose (for example, a nitrocellulose having a nitrogen content of about 11.7% to 12.2%), which is soluble in a ester such as ethyl acetate, a ketone such as methyl ethyl ketone or methyl isobutyl ketone, or an ether such as cellosolve, can be used as a nitrocellulose which can be contained in the resin composition for laser engraving The nitrocellulose may be used singly or in combination of two or more thereof as necessary.

The content of nitrocellulose may be selected as long as decrease in the engraving sensitivity of the resin composition for laser engraving can be avoided, and the content is typically 5 parts by mass to 300 parts by mass, preferably 20 parts by mass to 250 parts by mass, more preferably 50 parts by mass to 200 parts by mass, and particularly preferably 40 parts by mass to 200 parts by mass, relative to 100 parts by mass of the binder polymer and the polymerizable compound.

Highly Thermally Conductive Substance

In view of improving the engraving sensitivity of the resin composition of the invention, a highly thermally conductive substance can be added to the resin composition as an additive for assisting heat transfer in the resin composition.

Examples of the highly thermally conductive substance include an inorganic compound such as a metal particle and an organic compound such as an electrically conductive polymer.

Preferable examples of the metal particle include gold microparticles, silver microparticles and copper microparticles, each having a particle size in the order of micrometers to a few nanometers.

Preferable examples of the organic compound include polymers which are generally known as electrically conductive polymers.

Preferable examples of the electrically conductive polymers include polyaniline, polythiophene, polyisothianaphthene, polypyrrole, polyethylene dioxythiophene, polyacetylene and modified compounds thereof. From the viewpoint of being highly sensitive, polyaniline, polythiophene, polyethylene dioxythiophene and modified compounds thereof are further preferable, and polyaniline is particularly preferable. While the polyaniline can be either in an emeraldine base form or in an emeraldine salt form when added to the resin composition, it can be preferably in an emeraldine salt form in view of higher heat transfer efficiency.

Specific examples of the metal particle and the electrically conductive polymer include commercially available products supplied by Sigma Aldrich Corp., Wako Pure Chemical Industries, Ltd., Tokyo Chemical Industry Co., Ltd., Mitsubishi Rayon Co., Ltd., Panipol Oy and the like. Specific examples which are particularly preferable in view of improving the heat transfer efficiency include AQUAPASS-01x (trade name, manufactured by Mitsubishi Rayon Co., Ltd.), and PANIPOL W and PANIPOL F (both trade names, manufactured by Panipol Oy).

Co-Sensitizer

The sensitivity required for photo-curing of the resin composition for laser engraving may be further enhanced by using a co-sensitizer. While the operating mechanism is not clear, it is thought to be largely based on the following chemical process. Namely, it is presumed that various intermediate active species (radicals and cations) generated in the course of a photoreaction initiated by a polymerization initiator and an addition polymerization reaction subsequent thereto, react with the co-sensitizer to generate new active radicals. These intermediate active species may be roughly classified into (a) compounds which are reduced and can generate active radicals; (b) compounds which are oxidized and can generate active radicals; and (c) compounds which react with less active radicals, and are converted to more active radicals or act as a chain transfer agent. However, in many cases, there is no general theory applicable on which individual compound belongs to which class.

Examples of the co-sensitizer which may be applied in the invention include the following compounds.

(a) Compounds Which Generate Active Radicals Upon Being Reduced

Compounds having a carbon-halogen bond are classified in this group. It is presumed that an active radical is generated when the carbon-halogen bond is reductively cleaved. Specific preferable examples of the compound include trihalomethyl-s-triazines and trihalomethyloxadiazoles.

Compounds having a nitrogen-nitrogen bond are also classified in this group. It is presumed that an active radical is generated when the nitrogen-nitrogen bond is reductively cleaved. Specific preferable examples of the compound include hexaarylbiimidazoles.

Compounds having an oxygen-oxygen bond are also classified in this group. It is presumed that an active radical is generated when the oxygen-oxygen bond is reductively cleaved. Specific preferable examples of the compound include organic peroxides.

Onium compounds are also classified in this group. It is presumed that an active radical is generated when a carbon-heteroatom bond or an oxygen-nitrogen bond in an onium compound is reductively cleaved. Specific preferable examples of the compound include diaryliodonium salts, triarylsulfonium salts, N-alkoxypyridinium salts (azinium) salts, and the like.

Ferrocenes and iron arene complexes are also classified in this group. It is presumed that an active radical is reductively generated therefrom.

(b) Compounds Which Generate Active Radicals Upon Being Oxidized

Alkylate complexes can be classified in this group. It is presumed that an active radical is generated when a carbon-heteroatom bond therein is oxidatively cleaved. Specific preferable examples thereof include triarylalkylborates.

Alkylamine compounds can be also classified in this group. It is presumed that an active radical is generated when a C—X bond on a carbon atom which is adjacent to a nitrogen atom therein is cleaved through oxidation. Preferable examples of the X include a hydrogen atom, a carboxyl group, a trimethylsilyl group, a benzyl group and the like. Specific preferable examples of the alkylamine compound include ethanolamines, N-phenylglycine, and N-trimethylsilylmethylanilines.

Sulfur-containing or tin-containing compounds, which are obtained by substituting the nitrogen atom of the above-mentioned alkylamine compounds by a sulfur atom or a tin atom, can be also classified in this group and may generate an active radical in a similar manner as the alkylamine compounds. Compounds having an S—S bond are also known to have sensitivity enhancing property by the S—S bond cleavage.

α-substituted methylcarbonyl compounds, which may generate an active radical by the cleavage of a bond between a carbonyl moiety and an α-carbon atom through oxidation, can be also classified in this group. Compounds obtained by converting the carbonyl moiety in the α-substituted methylcarbonyl compounds into an oxime ether also show an effect which is similar to that of the α-substituted methylcarbonyl compounds. Specific examples of the compounds include 2-alkyl-1-[4-(alkylthio)phenyl]-2-morpholinopronone-1's, and oxime ethers obtained by reacting a 2-alkyl-1-[4-(alkylthio)phenyl]-2-morpholinopronone-1 with a hydroxylamine and then etherifying the N—OH moiety in the resultant.

Sulfinic acid salts can be also classified in this group. An active radical may be reductively generated therefrom. Specific examples thereof include sodium arylsulfinate.

(c) Compounds Which Convert Less Active Radicals to More Active Radicals by Reacting Therewith, and Compounds Which Act as a Chain Transfer Agent Compounds having SH, PH, SiH or GeH within the molecule can be classified in this group. These compounds may generate a radical by donating hydrogen to a less active radical species, or may generate a radical by being oxidized and then deprotonated. Specific examples thereof include 2-mercaptobenzothiazoles, 2-mercaptobenzoxazoles, 2-mercaptobenzimidazoles, and the like.

More specific examples of these co-sensitizers are described in, for example, JP-A No. 9-236913, as additives for enhancing the sensitivity, and those may also be applied in the invention. Some examples thereof will be shown below, while the invention is not limited thereto. In the following formulae, "-TMS" represents a trimethylsilyl group.

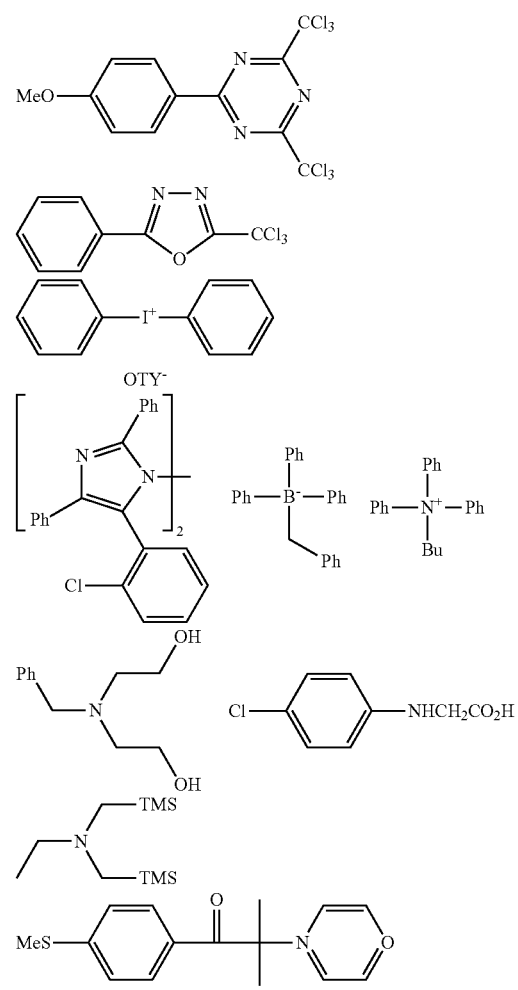

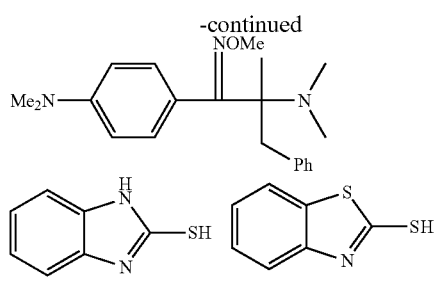

As is similar to the photo-thermal conversion agent, various chemical modifications for improving the properties of the resin composition for laser engraving may be carried out to the co-sensitizer. Examples of a method for the chemical modification include: bonding with the photo-thermal conversion agent (D), with the polymerizable compound (C) or with some other part; introduction of a hydrophilic site; enhancement of compatibility; introduction of a substituent for suppressing crystal precipitation; introduction of a substituent for enhancing adhesiveness; and conversion into a polymer.

The co-sensitizer may be used singly, or in combination of two or more species thereof. The content of the co-sensitizer in the resin composition for laser engraving is preferably 0.05 parts by mass to 100 parts by mass, more preferably 1 parts by mass to 80 parts by mass, and even more preferably 3 parts by mass to 50 parts by mass, relative to 100 parts by mass of the polymerizable compound.

Polymerization Inhibitor

A small amount of thermal polymerization inhibitor can be preferably added to the resin composition of the invention in view of inhibiting unnecessary thermal polymerization of the polymerizable compound during the production or storage of the resin composition. Suitable examples of the thermal polymerization inhibitor include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), N-nitrosophenylhydroxylamine cerium (I) salt, and the like.

Q-1301 (trade name, manufactured by Wako Pure Chemical Industries, Ltd., a 10% tricresyl phosphate solution) can be preferably used as the polymerization inhibitor from the viewpoint of excellent stability in storage of the relief printing plate precursor for laser engraving having the relief forming layer containing the resin composition for laser engraving of the invention. When Q-1301 is used in combination with the polymerizable compound, the storage stability of the relief printing plate precursor for laser engraving can be significantly excellent, and good laser engraving sensitivity may be obtained. The addition amount of the thermal polymerization inhibitor is preferably 0.01% by mass to 5% by mass with respect to the total mass of the resin composition for laser engraving. Also, if necessary, in order to prevent the inhibition of polymerization caused by oxygen, a higher fatty acid compound such as behenic acid or behenic acid amide may be added to the resin composition and can be localized at the surface of the relief forming layer during the course of drying of the relief forming layer performed after the resin composition is applied over (on or above) a support or the like. The addition amount of the higher fatty acid compound can be preferably 0.5% by mass to 10% by mass with respect to the total mass of the resin composition.

Colorant

A colorant such as a dye or a pigment may also be added to the resin composition for laser engraving for the purpose of coloring the resin composition. The addition of the dye or the pigment may enhance properties of the resin composition such as the visibility of the image part, suitability for image density measuring device and the like. A pigment is particularly preferably used as the colorant in the invention. Specific examples of the colorant include pigments such as phthalocyanine pigments, azo pigments, carbon black or titanium oxide; and dyes such as Ethyl Violet, Crystal Violet, azo dyes, anthraquinone dyes or cyanine dyes. The amount of addition of the colorant is preferably about 0.5% by mass to 5% by mass with respect to the total mass of the resin composition.

Other Additives

In order to improve the properties of a cured film formed of the resin composition for laser engraving, known additives such as a filler may also be added.

Examples of the filler include carbon black, carbon nanotubes, fullerene, graphite, silica, alumina, aluminum, calcium carbonate and the like, and these fillers can be used individually or as mixtures of two or more thereof.

Relief Printing Plate Precursor for Laser Engraving

The relief printing plate precursor for laser engraving of the invention has a relief forming layer which contains the resin composition and is provided over (on or above) a support.

The relief printing plate precursor for laser engraving may further have an arbitrary other layer, and examples of such an arbitrary other layer include an adhesive layer which resides between the support and the relief forming layer, and a slip coat layer and/or a protective layer which can be provided on the relief forming layer.

Relief Forming Layer

The relief forming layer is a layer formed of the resin composition for laser engraving of the invention. The relief forming layer can be obtained as a crosslinkable one by employing a crosslinkable resin composition as the resin composition for laser engraving. The relief printing plate precursor for laser engraving of the invention is preferably that having a crosslinkable relief forming layer.

In embodiments, a manufacturing method of a relief printing plate from the relief printing plate precursor for laser engraving preferably includes: crosslinking components of the relief forming layer; and laser engraving the crosslinked relief forming layer to form a relief layer. The crosslinking may enable to suppress wearing of the relief forming layer subjected to printing and provide a relief printing plate having a relief layer sharply-shaped by laser engraving.

The content of the binder polymer in the relief forming layer is preferably 30% by mass to 80% by mass, and more preferably 40% by mass to 70% by mass, with respect to the total mass of the solid content of the relief forming layer. When the content of the binder polymer is set to 30% by mass or more, the printing plate precursor having thereof can be prevented from causing a cold flow. Also, when the content of the binder polymer is set to 80% by mass or less, there can be no occurrence of the lack of other components, and a sufficient print durability as a printing plate may be provided to the relief printing plate resulting therefrom.

The content of the polymerization initiator is preferably 0.01% by mass to 10% by mass, and more preferably 0.1% by mass to 3% by mass, with respect to the total mass of the solid content of the relief forming layer. When the content of the polymerization initiator is set to 0.01% by mass or more, the crosslinking process of the crosslinkable relief forming layer rapidly progress. When the content of the polymerization initiator is set to 10% by mass or less, there can be no occurrence of the lack of other components, and a sufficient print durability as a printing plate may be provided to the relief printing plate resulting therefrom.

The content of the polymerizable compound is preferably 10% by mass to 60% by mass, and more preferably 15% by mass to 40% by mass, with respect to the total mass of the solid content of the relief forming layer. When the content of the polymerizable compound is set to 10% by mass or more, there can be no occurrence of the lack of other components, and a sufficient print durability as a printing plate may be provided to the relief printing plate resulting therefrom. When the content of the polymerizable compound is set to 60% by mass or less, a sufficient strength as a printing plate may be provided to the relief printing plate resulting therefrom.

The relief forming layer may be obtained by providing the resin composition for forming the relief forming layer to have a sheet shape or a sleeve shape over the surface of the support.

Support

The support which can be used in the relief printing plate precursor for laser engraving typically has a flat plate shape or a sheet shape. The material used in the support is not particularly limited, while a material having high dimensional stability is preferably used. Examples thereof include metals such as steel, stainless steel or aluminum; thermoplastic resins such as polyesters (for example, PET, PBT and PAN) or polyvinyl chloride; thermo-setting resins such as epoxy resin or phenolic resin; synthetic rubbers such as styrene-butadiene rubber; and fiber reinforced plastic (FRP) resins formed of resin materials such as epoxy resin or phenolic resin containing reinforcing fibers such as a glass fiber, a carbon fiber or the like. Among these, a polyethylene terephthalate (PET) film and a steel substrate is preferable in view of strength, durability and availability. The shape of the support depends on whether the relief forming layer is a sheet-shaped or a sleeve-shaped.

Adhesive Layer:

The relief printing plate precursor according to the invention may have an adhesive layer disposed between the relief forming layer and the support in view of reinforcing adhesive force working between these layers.

Any material that may enhance the adhesive force after the crosslinking in the relief forming layer can be employed, and a material which can also enhance the adhesive force before the crosslinking in the relief forming layer can be preferably employed. The "adhesive force" herein include both of that working between the support and the adhesive layer and that working between the adhesive layer and the relief forming layer.

The adhesive force between the support and the adhesive layer is preferably as follows. Namely, when a combination of the adhesive layer and the relief forming layer are going to peeled off, at a rate of 400 mm/min, from the support provided in a laminate having the support, the adhesive layer and the relief forming layer provided in this order, the peeling force per a unit width of 1 cm of the sample is preferably 1.0 N/cm or larger or the combination is unpeelable from the support under this condition, and is more preferably 3.0 N/cm or larger or the combination is unpeelable from the support under this condition.

The adhesive force between the adhesive layer and the relief forming layer is preferably as follows. Namely, when the adhesive layer is peeled off, at a rate of 400 mm/min, from the relief forming layer provided in a laminate of the adhesive layer and the relief forming layer, the peeling force per a unit width of 1 cm of the sample is preferably 1.0 N/cm or large or the adhesive layer is unpeelable from the relief forming layer under this condition, and is more preferably 3.0 N/cm or larger or the adhesive layer is unpeelable from the relief forming layer under this condition.

Examples of the material which configures the adhesive layer include generally used commercially available adhesives such as an industrial adhesive (e.g., trade name: EC-1368, manufactured by Sumitomo 3M; and trade name: EM123-1N, manufactured by Cemedine), a resin having a functional group exhibiting affinity to a resin which forms the support, a polyfunctional monomer having an unsaturated bond, a resin having the similar or same functional group with that of a binder polymer contained in the relief forming layer, and materials mentioned in Handbook of Adhesives, Second Edition (1977) edited by I. Skies.

In view of handling property of the relief printing plate (such as easiness in attaching to devices), thickness of the adhesive layer is preferably in a range of about 0.01 μm to about 500 μm, and more preferably in a range of 0.05 μm to 300 μm.

When an adhesive layer is disposed in the precursor of the invention, the adhesive layer is typically provided by a method including applying a composition for the adhesive layer on a surface of the support followed by drying.

Protective Film and Slip Coat Layer

The relief forming layer becomes the part at which a relief is formed after the laser engraving. The surface of the convex portion of the relief may generally function as an ink deposition portion. There is almost no concern for generation of damages or depressions on the surface of the relief forming layer which might affect printing when the relief forming layer is cured by crosslinking, since the thus-crosslinked relief forming layer has strength and hardness. However, the crosslink-curable relief forming layer which is not subjected to the crosslinking tend to have soft surfaces and are concerned for generation of damages or depressions on the surface thereof when they are handled. From the viewpoint of prevention of the damages or depressions, a protective film may be provided over (on or above) the relief forming layer.

If the protective film is too thin, the effect of preventing damages and depressions may not be obtained, and if the protective film is too thick, inconvenience may arise upon the handling thereof and production costs therefor may become higher. In consideration of these, the thickness of the protective film is preferably 25 μm to 500 μm, and more preferably 50 μm to 200 μm.

Films formed of known materials as that for a protective film of a printing plate, for example can be used in the invention, and examples thereof include polyester films such as those of PET (polyethylene terephthalate), and polyolefin films such as those of PE (polyethylene) or PP (polypropylene). The surface of the film may be plain (smooth), or may also be mattified to have very minute irregularities.

The protective film is required to be capable of being easily removed from the surface of the relief forming layer if desired as well as be capable of stably adhered to the surface of the relief forming layer, since the protective film is peeled off from the surface of the relief forming layer when the laser engraving is performed.

When the protective film is unpeelable or when the protective film cannot be easily adhered to the relief forming layer, a slip coat layer can be provided on a surface of the protective film to which the relief forming layer contacts.

The material for forming the slip coat layer preferably contains, as the main component, a water-soluble or water-dispersible and less tacky resin such as polyvinyl alcohol, polyvinyl acetate, a partially saponified polyvinyl alcohol, a hydroxyalkylcellulose, an alkylcellulose or a polyamide resin. Among these, a partially saponified polyvinyl alcohol having a degree of saponification of 60% by mole to 99% by mole, a hydroxyalkylcellulose with an alkyl group having 1 to 5 carbon atoms and an alkylcellulose with an alkyl group having 1 to 5 carbon atoms can be particularly preferably used from the viewpoint of lesser tackiness.

In the case where the protective film is peeled off, at a rate of 200 mm/min, from a laminate of the relief forming layer (and the slip coat layer) and the protective film, the peeling force per a unit width of 1 cm of the sample is preferably 5 mN/cm to 200 mN/cm, and more preferably 10 mN/cm to 150 mN/cm. When the peeling force is 5 mN/cm or more, the relief printing plate precursor can be subjected to operation without the removal of the protective film in the middle of the operation, and when the peeling force is 200 mN/cm or less, the protective film may be removed comfortably.

Method for Manufacturing Relief Printing Plate Precursor for Laser Engraving

There is no particular limitation to the preparation of a relief forming layer of a relief printing plate precursor for laser engraving according to the invention. Examples of the method for preparing the relief forming layer include: a method including removing the solvent from the application solution composition for forming a relief forming layer prepared as described above and fusion extruding the composition to on or above a support; and a method including flowing the application solution composition for forming a relief forming layer over a support and drying the resultant in an oven to remove the solvent from the composition.

A protective film may be laminated on the surface of the thus-formed relief forming layer in accordance with necessity. When a protective film is provided on a relief forming layer, the protective film and the relief forming layer are typically layered followed by laminating. Examples of a method for the lamination includes: a method in which a body in which the protective film and the relief forming are layered is passed through a space, which resides between a pair of calendar rolls, at least one of which is heated during the passage, so that the protective film and the relief forming layer can be press-contacted with heat to be laminated (attached with each other); and a method in which a surface of the relief forming layer, in which a small amount of solvent is impregnated, is prepared and the relief forming layer is tightly attached to the protective film via the surface so that the protective film and the relief forming layer can be laminated.

In relation thereto, examples of the method for the preparation of the relief forming layer further include a method which includes firstly laminating a relief forming layer on a protective film, and then laminating a support and the relief forming layer. Herein, an adhesive layer can be provided by using a support having the adhesive layer, and a slip coat layer can be provided by using a protective film having the slip coat layer.

An application solution composition for forming a relief forming layer may be prepared, for example, by dissolving or dispersing the specific polymer (A) and the optional other binder polymer (B), the optional photothermal conversion agent (D) and/or the optional plasticizer to an appropriate solvent, and further dissolving the polymerization initiator and the polymerizable compound to the resulted solution.

It is necessary that most of the solvent component used for preparing the application solution is removed during the preparation of the printing plate precursor. Therefore, it is preferable that a lower alcohol which has a low-boiling solvent such as ethanol is used and that the addition amount of the solvent is small. It is possible to suppress the amount of the solvent added to the application solution by warming the system to form the application solution. However, when the temperature resulted by the warming is too high, polymerizable compound and/or the like in the system may tend to cause polymerization. In consideration of this, when the application solution composition for forming a relief forming layer has a formulation including a polymerizable compound and/or a polymerization initiator, the temperature for preparation of the composition is preferably adjusted to be within a range of 30° C. to 80° C.

A thickness of the relief forming layer of the relief printing plate precursor for laser engraving which is before and after being subjected to the crosslinking is preferably 0.05 mm to 10 mm, more preferably 0.05 mm to 7 mm and, particularly preferably, 0.05 mm to 0.3 mm.

Method of Manufacturing Relief Printing Plate

The method of manufacturing a relief printing plate according to the invention has at least (1) crosslinking at least a part of components of the relief forming layer of the relief printing plate precursor for laser engraving of the invention by light (by means such as exposure to actinic ray) and/or by heat and (2) laser engraving the relief forming layer subjected to the crosslinking to form a relief layer. The method can provide the relief printing plate according to the invention having a relief layer over a support.

Further, a process of (3) rinsing, in which the surface of a relief layer after engraving is rinsed, a process of (4) drying, in which the relief layer which has been engraved is dried, and/or a process of (5) post-crosslinking, in which energy is applied to the relief layer which has been engraved to form a crosslinking structure, can be carried out after the process of (2) laser engraving if necessary.

Cross linking in the relief forming layer during the process (1) is carried out by irradiation of actinic rays and/or heat.

In the crosslinking of the relief forming layer during the process (1), in a case that both of crosslinking using light crosslinking using heat are used in combination in the process (1) of crosslinking, these processes may be performed simultaneously or separately.

The process (1) is a process to crosslinking crosslinkable components of the relief forming layer of the relief printing plate precursor for laser engraving by light and/or heat.

The relief forming layer preferably contains a binder polymer, an acetylene compound, a photothermal conversion agent, a polymerization initiator, and a polymerizable compound. The process (1) preferably includes polymerizing the polymerizable compound to form crosslinking by the effect of the polymerization initiator.

The polymerization initiator is preferably a radical generator. Radical generators are roughly classified into photopolymerization initiators and thermal polymerization initiators, depending on whether the trigger of the respective generating radical is light or heat.

When the relief forming layer contains a photopolymerization initiator, a crosslinked structure can be formed in the relief forming layer by irradiating the relief forming layer with actinic ray which serves as the trigger of the photopolymerization initiator (crosslinking by light).

The irradiation of actinic ray is generally carried out over the entire surface of the relief forming layer. Examples of the actinic ray include visible light, ultraviolet radiation and an electron beam, but ultraviolet radiation is most generally used. While it is acceptable to perform the irradiation of the actinic ray only to a front surface of a support, which is the opposite side of a rear surface of the relief forming layer which faces the support, it is preferable to irradiate the actinic ray also from the rear surface as well as from the front surface when the support is a transparent film which transmits actinic ray. When the protective film is present, the irradiation from the front surface may be carried out with the protective film being provided, or may be carried out after the protective film has been removed. Considering the presence of oxygen which may cause a polymerization inhibition, the irradiation with actinic ray may be carried out after coating the crosslinkable relief forming layer with a vinyl chloride sheet under vacuum.

When the relief forming layer contains a thermal polymerization initiator, a crosslinked structure can be formed in the relief forming layer by heating the relief printing plate precursor for laser engraving (crosslinking by heat). Examples of the method of heating include a method of heating the printing plate precursor in a hot air oven or a far-infrared oven for a predetermined time and a method of contacting the printing plate precursor with a heated roll for a predetermined time.

The crosslinking by light in the process (1) may require a device for irradiation of active ray which is relatively expensive, it is preferable in that there is almost no limitation to the material to form the relief printing plate precursor, because the temperature of the relief printing plate precursor may not be greatly affected by the irradiation of active ray.

On the other hand, temperature of the printing plate precursor may rise in the crosslinking by heating, which may result in deformation of a thermoplastic polymer and/or denaturation of compound having small stability against heat. Accordingly, cares may be necessarily taken to select a compound used in the relief forming layer.

A thermal polymerization initiator can be added upon the crosslinking by heat. Commercially-available thermal polymerization initiator for free radical polymerization can be used as the thermal polymerization initiator. Examples of the thermal polymerization initiator include an appropriate peroxide, a hydroperoxide, and a compound containing an azo group. Typical vulcanizers can also be used for crosslinking. Crosslinking by heat can be also carried out by adding, as a crosslinking ingredient, a thermally crosslinkable resin (heat-curable resin) such as an epoxy resin to the relief forming layer.

The crosslinking by heat can be preferable as a crosslinking method for the relief forming layer in the process (1) with a viewpoint that the relief forming layer can be uniformly cured (crosslinked) from the surface to the inside.

The crosslinking in the relief forming layer has a first advantage that a relief formed after the laser engraving can become sharp as well as a second advantage that stickiness of engraving wastes formed upon laser engraving can be suppressed. When a relief forming layer which is not subjected to crosslinking is laser-engraved, a portion which is not intended to be engraved tends to be melted or deformed by remaining heat prevailing to the periphery of a portion irradiated with the laser to prevent obtaining a sharp relief layer in some cases. Further, In general, the lower a molecular weight of a material, the more the material tends to be liquid rather than solid to increase the stickiness of the material. Stickiness of engraving wastes formed upon engraving the relief forming layer tends to increase as the amount of using the low molecular weight material increases. Since the polymerizable compound, which is a low molecular material, can be formed into a high molecular weight material by crosslinking, the stickiness of the engraving wastes to be formed from the crosslinked relief forming layer tends to be decreased.

In the process (2) of engraving, the relief forming layer subjected to the crosslinking is engraved with laser to form a relief layer. More specifically, a relief layer is formed in the process (2) by irradiating the relief forming layer with a laser light and corresponding to a desired image to be formed. The engraving preferably includes controlling the laser head with a computer based on the digital data of a desired image to be formed, and performing scanning irradiation over the relief forming layer. When an infrared laser is irradiated, molecules in the relief forming layer undergo molecular vibration, and thus heat is generated. When a high power laser such as a carbon dioxide laser or a YAG laser is used as the infrared laser, a large amount of heat is generated at the laser-irradiated areas, and the molecules in the photosensitive layer undergo molecular breakage or ionization, so that selective removal (that is, engraving) can be achieved.

An advantage of the laser engraving is the ability to three-dimensionally control the structure of the engraved portion since the depth of engraving can be arbitrarily set thereby, For example, when areas for printing fine dots are engraved shallowly or with a shoulder, the relief may be prevented from collapsing under printing pressure. When groove areas for printing cutout characters are engraved deeply, the grooves may be hardly filled with ink, and collapse of the cutout characters may be thus suppressed.

When the engraving is performed with an infrared laser which corresponds to the maximum absorption wavelength of the photo-thermal conversion agent, a more sensitive and well-defined (sharp) relief layer can be obtained.

If engraving remnants remain and adhere to the engraved surface, the process (3) of rinsing, in which the engraved surface is rinsed with water or with a liquid containing water as a main component to wash away the engraving remnants, may be further performed.

Examples of the method of the rinsing include a method of spraying water at high pressure, or a method of brush rubbing the engraved surface, mainly in the presence of water, using a batch type- or conveyor type-brush washout machine known as a developing machine for photosensitive resin letterpress plates, and the like. If the viscous liquid of the engraving remnants cannot be removed by simply washing with the water or the liquid, a rinsing solution containing soap may be used.

When the process (3) of rinsing the engraved surface is performed, it is preferable to further perform the process (4) of drying, in which the relief layer which has been engraved is dried to volatilize the rinsing solution.

Further, the process (5) of post-crosslinking, in which a crosslinked structure is formed in the relief layer, can be carried out if necessity. By carrying out the process (5) of post-crosslinking, the relief formed by engraving may be further strengthened.

The relief printing plate according to one aspect of the invention, that has a relief layer over a support, can be thus obtained.

A thickness of the relief layer of the relief printing plate is preferably in a range of 0.05 mm to 10 mm, more preferably in a range of 0.05 mm to 7 mm, and particularly preferably in a range of 0.05 mm to 3 mm in view of satisfying various applicability to flexographic printing such as wearing resistance or ink transfer property.

The Shore A hardness of the relief forming layer subjected to the crosslinking is preferably from 50° to 90°. When the Shore A hardness of the relief layer is 50° or more, the fine dots formed by engraving may not be fall and break even under the high printing pressure of a letterpress printing machine, and proper printing may be achieved. When the Shore A hardness of the relief layer is 90° or less, print scratches at solid parts may be prevented even in flexographic printing with a kiss-touch printing pressure.

The "Shore A hardness" herein means a value measured by a durometer (spring type rubber hardness meter), which impinges a presser (referred to as a penetration needle or an indenter) to a surface of an object to cause deformation of the surface, and measures the amount of the deformation (penetration depth) of the surface and expresses the result in a numerical value.

The Shore A hardness of the relief layer of the relief printing plate of the invention is preferably similar to the preferable Shore A hardness of the relief forming layer subjected to the crosslinking in the process (1) in the manufacturing method, that is, in the range of 50° to 90°.

The relief printing plate produced by the method of the invention allows printing with a letterpress printing machine using oily ink or UV ink, and also allows printing with a flexographic printing machine using UV ink.

EXAMPLES

The invention will be hereinafter described in more detail by way of Examples, while the invention is not limited thereto.

Synthesis Example 1

Synthesis of Specific polymer (P-1)

Into a 500 ml volume three-necked flask equipped with a stirring blade and a cooling tube, 52.6 g of 1,4-cyclohexane dicarboxylic acid (isomer mixture, manufactured by Wako Pure Chemical Industries, Ltd.), 59.4 g of 1,4-cyclohexane dimethanol divinyl ether (mixture of cis and trans, manufactured by Aldrich Co.), 0.1 g of piridinium p-toluene sulfonate (manufactured by Tokyo Chemical Co.), and 35 g of tetrahydrofuran (dehydrated, manufactured by Wako Pure Chemical Industries, Ltd.) were put and stirred at 60° C. for 7 hrs. Then, 1 g of 1,8-diazabicyclo[5.4.0]undeca-7-ene (manufactured by Wako Pure Chemical Industries, Ltd.) was charged and stirred at 60° C. for 1 hr, and 30 g of tetrahydrofuran (dehydrated, manufactured by Wako Pure Chemical Industries, Ltd.) was further charged and allowed to be cool to be at a room temperature. The solution was poured little by little to 3 L of water under vigorous stirring and precipitates were separated by filtration to obtain white solids (95 g) of the specific polymer (P-1), the structure of which is shown above.

The specific polymer (A)(P-1) was identified by observation of the peak intensity ratio between methyl proton (1.40 ppm) and methine proton (5.96 ppm) derived from the hemiacetal ester unit at 3:1 ratio in $^1$H-NMR (solvent: deuterated chloroform), and observation of the peak derived from the carbonyl group of the polyhemiacetal ester unit at 1732 cm$^{-1}$ in IR spectrum. The weight average molecular weight of (P-1) was confirmed to be 63,000 by gel permeation chromatography (eluate: tetrahydrofuran).

Synthesis Examples 2 to 10

Synthesis of Specific Polymers (P-2) to (P-10)

The specific polymers (P-2) to (P-10), the structures of which are shown above, were synthesized in the same manner as the specific polymer (P-1) in the synthesis example 1 except for changing the starting substances.

Example 1

1. Preparation of Crosslinkable Resin Composition for Laser Engraving

In a three necked flask equipped with a stirring blade and a cooling tube, 50 g of the specific polymer (P-1) obtained in the Synthesis Example 1 as the specific polymer (A), 2.5 g of carbon black (trade name: HYDRIC FT S-802 (black) (E), manufactured by Dainichiseika Color & Chemicals Mfg. Co., Ltd.) as the photothermal conversion agent (E), 20 g of diethylene glycol as the plasticizer, and 50 g of tetrahydrofuran as the solvent were charged and heated while stirring at 40° C. for 120 min to dissolve the specific polymer (A). Further, 28 g of an ethylenically unsaturated monomer DPHA (dipentaerythritol hexaacrylate) (manufactured by Toagosei Co., Ltd.) as the polymerizable compound (C) and 1.6 g of t-butyloxybenzoate (trade name: PERBUTYL Z, manufactured by NOF Corp.) as the polymerization initiator (E) were added and stirred for 30 min to obtain a coating solution 1 for forming a crosslinkable relief forming layer (crosslinkable resin composition for laser engraving) having fluidity.

2. Preparation of Relief Printing Plate Precursor for Laser Engraving

A spacer of a predetermined thickness was placed on a PET substrate to form a frame, and the coating solution 1 for the crosslinkable relief forming layer was quietly cast into the frame to such an extent as not flowing out of the spacer and dried in an oven at 40° C. for 3 hrs to dispose a relief forming layer of about 1 mm thickness, so that a relief printing plate precursor 1 for laser engraving was manufactured.

The thickness of the relief forming layer present in the relief printing plate precursor was about 1 mm. The Shore A hardness of the relief layer calculated by a durometer (spring type rubber hardness meter: described above) was 75°. The measurement for the Shore A hardness was also carried out in the same manner in each of the following examples and comparative examples.

3. Production of Relief Printing Plate

The thus-obtained relief forming layer of the relief printing plate precursor was heated at 100° C. for 3 hrs to subject the relief forming layer to crosslinking by heat.

Further, the relief forming layer subjected to the crosslinking was engraved to form a 2 cm square solid image-shaped engraved portion by using a near infrared laser engraving machine (trade name: FD-100, manufactured by Tosei Electrobeam Co., Ltd.) having a semiconductor laser at a maximum power of 16 W (laser oscillation wavelength: 840 nm) while setting the engraving conditions to a laser power at 15 W, a scanning speed at 100 mm/sec, and a pitch distance at 0.15 mm to obtain a relief printing plate 1 having a relief forming layer.

4. Evaluation

The physical properties and the engraving sensitivity of the relief forming layer of the thus-obtained relief printing plate precursor were evaluated according to the following criteria. The results are shown in the following Table 1.

(I) Evaluation of Thermal Decomposition Temperature and Dissipation Property

The thermal decomposition temperature of the relief forming layer was measured under the following conditions. 5 mg of a sample was weighed and it was heated from 40° C. to 500° C. at a temperature elevation rate of 20° C./min by using a thermal mass analyzer (manufactured by T.A. Instrument Japan Co.).

Herein, the temperature at which the mass the sample was decreased by 10% ($T_{d10}$) was defined as "thermal decomposition temperature" in the thermogravimetry. The lower the thermal decomposition temperature is, the lower the temperature at which the thermal decomposition starts is and the more excellent the sample is in terms of the thermal decomposability. The evaluation was carried out under the following criteria.

A: $T_{d10}$<250° C.
B: $T_{d10}$ is in a range of 250° C. to 300° C.
X: $T_{d10}$>300° C.

Further, in the thermogravimetry, the difference ($T_{d80}-T_{d10}$) between the temperature where mass was decreased by 80% ($T_{d80}$) and the temperature where the mass was decreased by 10% ($T_{d10}$) was defined as "dissipation property". The smaller the ($T_{d80}-T_{d10}$) is, the more abruptly the weight of the sample decreases after thermal decomposition and the more excellent the sample is in terms of the dissipation property.

$(T_{d80}-T_{d10})$<100° C.     A:

$(T_{d80}-T_{d10})$ is in a range of 100° C. to 180° C.     B:

$(T_{d80}-T_{d10})$>180° C.     X:

(II) Evaluation of Engraving Depth

"Engraving depth" of the relief layer of in the relief printing plate 1 was measured as described below. The "engraving depth" herein means a distance between an engraved position (height) and a not-engraved position (height) observed in a cross section of the relief layer. The engraving depth was measured by observing the cross section of the relief layer by a super depth color 3D measuring microscope (trade name: VK9510, manufactured by Keyence Corporation). The engraving depth observed thereby was 570 nm, and it was understood that the relief forming layer is excellent in the engraving sensitivity.

It is estimated that the engraving sensitivity is more excellent as the graving depth is larger.

Examples 2 to 10

1. Preparation of Crosslinkable Resin Composition for Laser Engraving

Coating solutions 2 to 10 for forming a crosslinkable relief forming layer were prepared in the same manner as the coating solution 1 for forming a crosslinkable relief forming layer in Example 1, except that the specific polymers (P-2) to (P-10) were respectively used as shown in Table 1 in place of the specific polymer (P-1).

2. Preparation of Relief Printing Plate Precursor for Laser Engraving

Relief printing plate precursors 2 to 10 for laser engraving were prepared in the same manner as the precursor 1 in Example 1, except that the coating solutions 2 to 10 for forming a crosslinkable relief forming layer were respectively used in place of the coating solution 1.

3. Production of Relief Printing Plate

The relief forming layer of each of the relief printing plate precursors 2 to 10 was subjected to crosslinking by heat and engraving to form a relief layer in the same manner as the relief printing plate in Example 1 so as to provide relief printing plates 2 to 10.

The thickness of the relief layer present in each of the relief printing plates 2 to 10 was about 1 mm. The Shore A hardness and the engraving depth of the relief layers were also evaluated in the same manner as Example 1. The results of the evaluation are shown in Table 1.

Example 11

1. Preparation of Crosslinkable Resin Composition for Laser Engraving

Coating solution 11 for forming a crosslinkable relief forming layer was prepared in the same manner as the coating solution 1 for forming a crosslinkable relief forming layer in Example 1, except that the addition amount of the specific polymer (P-1) was changed to 10 g, and 40 g of polyvinyl alcohol compound (trade name: GOHSENOL T-215, manufactured by Nippon Synthetic Chemical Industry) was further added as the other binder polymer (B)

Example 12

1. Preparation of Crosslinkable Resin Composition for Laser Engraving

Coating solution 12 for forming a crosslinkable relief forming layer was prepared in the same manner as the coating solution 11 for forming a crosslinkable relief forming layer in Example 11, except that a monomer having the following structure was used in place of the DPHA as the polymerizable compound (C).

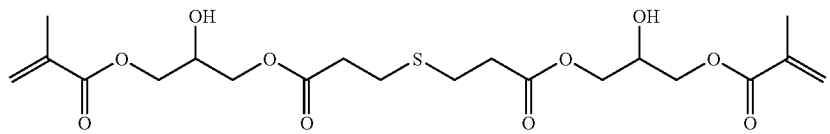 [SMILES: C=C(C)C(=O)OCC(O)COC(=O)CCSCCC(=O)OCC(O)COC(=O)C(=C)C]

Example 13

1. Preparation of Crosslinkable Resin Composition for Laser Engraving

Coating solution 13 for forming a crosslinkable relief forming layer was prepared in the same manner as the coating solution 11 for forming a crosslinkable relief forming layer in Example 11, except that a cyanine compound (trade name: ADS820HO, manufactured by American Dye Source Inc.) was used in place of the carbon black as the photothermal conversion agent (D).

Example 14

1. Preparation of Crosslinkable Resin Composition for Laser Engraving

Coating solution 14 for forming a crosslinkable relief forming layer was prepared in the same manner as the coating solution 11 for forming a crosslinkable relief forming layer in Example 11, except that a phthalocyanine compound (trade name: D99-009, manufactured by Yamamoto Chemicals Inc.) was used in place of the carbon black as the photothermal conversion agent (D).

Example 15

1. Preparation of Crosslinkable Resin Composition for Laser Engraving

Coating solution 15 for forming a crosslinkable relief forming layer was prepared in the same manner as the coating solution 12 for forming a crosslinkable relief forming layer in Example 12, except that PANIPOL W (trade name, manufactured by Panipol Oy)) was further added with an amount of 2 mass % relative to the total solid content of the coating solution 15.

2. Preparation of Relief Printing Plate Precursor for Laser Engraving

Relief printing plate precursors 11 to 15 for laser engraving were prepared in the same manner as the precursor 1 in Example 1, except that the coating solutions 11 to 15 for forming a crosslinkable relief forming layer were respectively used in place of the coating solution 1.

3. Production of Relief Printing Plate

The relief forming layer of each of the relief printing plate precursors 11 to 15 was subjected to crosslinking by heat and engraving to form a relief layer in the same manner as the relief printing plate in Example 1 so as to provide relief printing plates 11 to 15.

The thickness of the relief layer present in each of the relief printing plates 11 to 15 was about 1 mm. The Shore A hardness and the engraving depth of the relief layers were also evaluated in the same manner as Example 1. The results of the evaluation are shown in Table 1.

Comparative Example 1

1. Preparation of Crosslinkable Resin Composition for Laser Engraving

Coating solution C-1 for forming a crosslinkable relief forming layer was prepared in the same manner as the coating solution 11 for forming a crosslinkable relief forming layer in Example 11, except that the specific polymer (P-1) was not used, and the amount of GOHSENOL T-215 (described above) as the other binder polymer (B) was changed to 50 g.

Comparative Example 2

1. Preparation of Crosslinkable Resin Composition for Laser Engraving

Coating solution C-2 for forming a crosslinkable relief forming layer was prepared in the same manner as the coating solution 11 for forming a crosslinkable relief forming layer in Example 11, except that the specific polymer (P-1) was not used, and a styrene-butadiene rubber (trade name: TR-2000, manufactured by JSR) was used in place of the GOHSENOL T-215 (described above) as the other binder polymer (B).

Comparative Example 3

1. Preparation of Crosslinkable Resin Composition for Laser Engraving

Coating solution C-3 for forming a crosslinkable relief forming layer was prepared in the same manner as the coating solution 11 for forming a crosslinkable relief forming layer in Example 11, except that the specific polymer (P-1) was not used, and a polyurethane which is formed by polymerizing tolylene diisocyanate and polycarbonate diol and terminals of a main chain of which is blocked with 2-methacryloyloxy isocyanate was used in place of the GOHSENOL T-215 (described above) as the other binder polymer (B).

2. Preparation of Relief Printing Plate Precursor for Laser Engraving

Relief printing plate precursors C-1 to C-3 for laser engraving for comparative examples were prepared in the same manner as the precursor 11 in Example 11, except that the coating solutions C-1 to C-3 for forming a crosslinkable relief forming layer were respectively used in place of the coating solution 11.

3. Production of Relief Printing Plate

The relief forming layer of each of the relief printing plate precursors C-1 to C-3 was subjected to crosslinking by heat and engraving to form a relief layer in the same manner as the relief printing plate in Example 11 so as to provide relief printing plates C-1 to C-3.

The thickness of the relief layer present in each of the relief printing plate C-1 to C-3 was about 1 mm. The Shore A hardness and the engraving depth of the relief layers were also evaluated in the same manner as Example 1. The results of the evaluation are shown in Table 1.

TABLE 1

| | Relief forming layer | Physical properties of Relief forming layer | | | | Result of Evaluation Depth of |
|---|---|---|---|---|---|---|
| | (A) Specific polymer | Thermal decomposability | Dissipation property | Shore A hardness | Laser engraving | engraving (μm) |
| Example 1 | (P-1) | A | A | 75 | Semiconductor laser | 570 |
| Example 2 | (P-2) | A | A | 78 | Semiconductor laser | 540 |
| Example 3 | (P-3) | A | A | 79 | Semiconductor laser | 540 |
| Example 4 | (P-4) | A | A | 74 | Semiconductor laser | 515 |
| Example 5 | (P-5) | A | A | 77 | Semiconductor laser | 515 |
| Example 6 | (P-6) | A | A | 82 | Semiconductor laser | 500 |
| Example 7 | (P-7) | A | A | 86 | Semiconductor laser | 475 |

TABLE 1-continued

| | Relief forming layer | Physical properties of Relief forming layer | | | | Result of Evaluation Depth of |
|---|---|---|---|---|---|---|
| | (A) Specific polymer | Thermal decomposability | Dissipation property | Shore A hardness | Laser engraving | engraving (μm) |
| Example 8 | (P-8) | A | A | 68 | Semiconductor laser | 460 |
| Example 9 | (P-9) | A | A | 74 | Semiconductor laser | 445 |
| Example 10 | (P-10) | A | A | 69 | Semiconductor laser | 440 |
| Example 11 | (P-1) | A | A | 74 | Semiconductor laser | 610 |
| Example 12 | (P-1) | A | A | 73 | Semiconductor laser | 635 |
| Example 13 | (P-1) | A | A | 76 | Semiconductor laser | 610 |
| Example 14 | (P-1) | A | A | 78 | Semiconductor laser | 610 |
| Example 15 | (P-1) | A | A | 79 | Semiconductor laser | 660 |
| Comparative Example 1 | PVA compound (*1) | B | X | 98 | Semiconductor laser | 400 |
| Comparative Example 2 | SBR (*2) | X | B | 43 | Semiconductor laser | 385 |
| Comparative Example 3 | Polyurethane (*3) | B | X | 46 | Semiconductor laser | 400 |

Details for comparative binder polymers used in Comparative Examples 1 to 3 shown in Table 1 and in Comparative Examples 4 to 6 shown in the following Table 2 are as follows.

1: PVA compound: "GOHSENOL T-215" (described above)

2: SBR Styrene-butadiene rubber: "TR-2000" (described above)

3: Polyurethane: Polyurethane obtained by polymerizing tolylene diisocyanate and polycarbonate diol and blocking terminal ends of its main chain with 2-methacryloyloxy isocyanate.

From the result shown in Table 1, it can be understood that the relief printing plate precursors of Examples 1 to 15 having the relief forming layer formed of the resin composition for laser engraving of the invention have relief forming layers which are excellent in the thermal decomposability and the dissipation property comparing to the comparative examples. Further, the engraving depths achieved by Examples 1 to 15 are significantly deeper comparing to that of the comparative examples, which mean the examples of the invention are excellent in the engraving sensitivity.

Examples 16 to 30 and Comparative Examples 4 to 6

Relief printing plates 16 to 30 of Examples 16 to 30 and relief printing plates C-4 to C-6 of Comparative examples 4 to 6 were prepared in the same manner as in Examples 1 to 15, except that the laser engraving of the relief forming layers subjected to the crosslinking was performed by using a $CO_2$ gas laser with the following condition in place of the semiconductor laser. The thickness of the relief layers present in each of the relief printing plates 16 to 30 and C-4 to C-6 was about 1 mm.

Namely, the engraving of the relief forming layer subjected to the crosslinking was carried out to form a 2 cm square solid image-shaped engraved portion by using a $CO_2$ gas laser engraving machine (trade name: $CO_2$ LASER MARKER ML-Z9500, manufactured by Keyence Corporation) equipped with a $CO_2$ gas laser having a maximum power of 30 W, while setting engraving conditions to a laser power at 15 W, a scanning speed at 100 mm/sec, and a pitch distance at 0.15 mm.

The Shore A hardness and the engraving depth of the relief layers were also evaluated in the same manner as Example 1. The results of the evaluation are shown in Table 2.

TABLE 2

| | Relief forming layer (A) Specific polymer | Laser engraving | Result of Evaluation Depth of Engraving (μm) |
|---|---|---|---|
| Example 16 | (P-1) | $CO_2$ laser | 400 |
| Example 17 | (P-2) | $CO_2$ laser | 380 |
| Example 18 | (P-3) | $CO_2$ laser | 380 |
| Example 19 | (P-4) | $CO_2$ laser | 360 |
| Example 20 | (P-5) | $CO_2$ laser | 360 |
| Example 21 | (P-6) | $CO_2$ laser | 340 |
| Example 22 | (P-7) | $CO_2$ laser | 330 |
| Example 23 | (P-8) | $CO_2$ laser | 315 |
| Example 24 | (P-9) | $CO_2$ laser | 300 |
| Example 25 | (P-10) | $CO_2$ laser | 300 |
| Example 26 | (P-1) | $CO_2$ laser | 415 |
| Example 27 | (P-1) | $CO_2$ laser | 425 |
| Example 28 | (P-1) | $CO_2$ laser | 415 |
| Example 29 | (P-1) | $CO_2$ laser | 415 |
| Example 30 | (P-1) | $CO_2$ laser | 435 |
| Comparative Example 4 | PVA compound(*1) | $CO_2$ laser | 270 |
| Comparative Example 5 | SBR(*2) | $CO_2$ laser | 240 |
| Comparative Example 6 | Polyurethane (*3) | $CO_2$ laser | 265 |

From the results shown in Table 2, it can be understood that the relief printing plates of the Examples manufactured by using the resin compositions for laser engraving containing, as the binder polymer, the specified polymers (A) according to the invention have a larger engraving depth than the relief printing plates of comparative examples which contain usual binder polymers even in the case of impressing was performed by using a $CO_2$ gas laser as well as in the case of impressing was performed by using a semiconductor laser. From the results, it can be understood that the resin composition for laser engraving prepared in the Examples have high engraving sensitivity even in a case that any laser engraving apparatus is used.

What is claimed is:

1. A resin composition for laser engraving, comprising a polymerizable compound, a radical polymerization initiator, and a binder polymer, the binder polymer comprising a main chain that comprises at least one of a structure unit represented by the following Formula (I) or a structure unit represented by the following Formula (II):

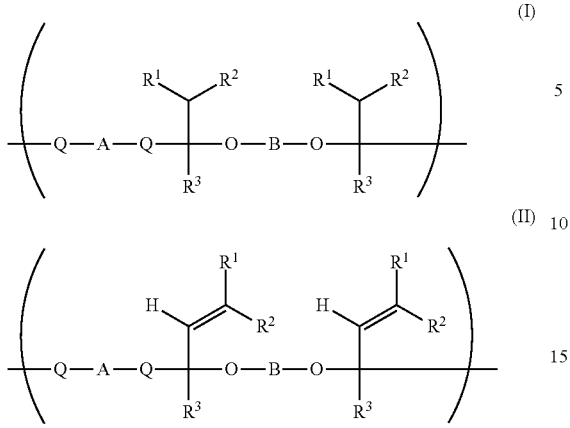

(I)

(II)

wherein Q represents a partial structure which provides an acid group when it is in the form of -Q-H, the acid group being selected from the group consisting of a sulfonic acid group, a phosphoric acid group, a carboxylic acid group, a phenol group, a 2-methoxyphenol group, a 2-chlorophenol group, a 2-methylhydroxy benzoate group, a 4-methylphenol group, a 1,3-benzenediol group, a 1-naphthol group, a 1,2-benzenediol group, a benzene sulfone amide group, a N-acetylphenylbenzene sulfone amide group, a 4-aminobenzene sulfone amide group, a N-phenyl-4-aminobenzene sulfone amide group, a N-(4-acetylphenyl)-4-aminobenzene sulfone amide group, and an ethyl acetyl acetate group;

wherein $R^1$ to $R^3$ each independently represent a hydrogen atom, an aliphatic group, an alicyclic group, an aromatic group or a heterocyclic group, and wherein A and B each independently represent an aliphatic connecting group, an alicyclic connecting group, an aromatic connecting group, or a heterocyclic connecting group.

2. The resin composition for laser engraving of claim 1, wherein the binder polymer is obtained by polymerizing: a compound represented by the following Formula (I-1); and one or more selected from the group consisting of a compound represented by the following Formula (II-1) and a compound represented by the following Formula (II-2):

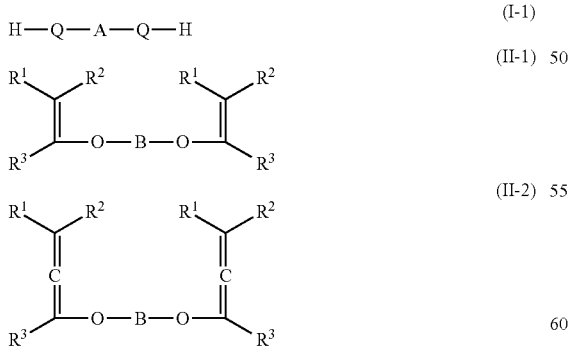

(I-1)

(II-1)

(II-2)

wherein Q represents a partial structure which provides an acid group when it is in the form of -Q-H, the acid group being selected from the group consisting of a sulfonic acid group, a phosphoric acid group, a carboxylic acid group, a phenol group, a 2-methoxyphenol group, a 2-chlorophenol group, a 2-methylhydroxy benzoate group, a 4-methylphenol group, a 1,3-benzenediol group, a 1-naphthol group, a 1,2-benzenediol group, a benzene sulfone amide group, a N-acetylphenylbenzene sulfone amide group, a 4-aminobenzene sulfone amide group, a N-phenyl-4-aminobenzene sulfone amide group, a N-(4-acetylphenyl)-4-aminobenzene sulfone amide group, and an ethyl acetyl acetate group;

wherein $R^1$ to $R^3$ each independently represent a hydrogen atom, an aliphatic group, an alicyclic group, an aromatic group or a heterocyclic group, and wherein B represents an aliphatic connecting group, an alicyclic connecting group, an aromatic connecting group, or a heterocyclic connecting group.

3. A relief printing plate precursor for laser engraving, comprising a relief forming layer, the relief forming layer comprising the resin composition for laser engraving of claim 1.

4. A relief printing plate, comprising a relief layer that is produced by providing a relief printing plate precursor for laser engraving, comprising a relief forming layer, the relief forming layer comprising a resin composition comprising a polymerizable compound, a radical polymerization initiator, and a binder polymer, the binder polymer comprising a main chain that comprises at least one of a structure unit represented by the following Formula (I) or a structure unit represented by the following Formula (II):

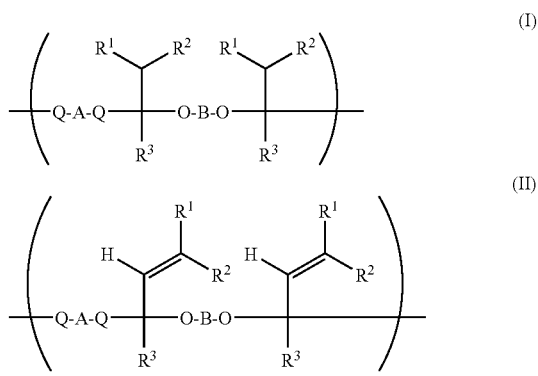

(I)

(II)

wherein Q represents a partial structure which provides an acid group when it is in the form of -Q-H, the acid group being selected from the group consisting of a sulfonic acid group, a phosphoric acid group, a carboxylic acid group, a phenol group, a 2-methoxyphenol group, a 2-chlorophenol group, a 2-methylhydroxy benzoate group, a 4-methylphenol group, a 1,3-benzenediol group, a 1-naphthol group, a 1,2-benzenediol group, a benzene sulfone amide group, a N-acetylphenylbenzene sulfone amide group, a 4-aminobenzene sulfone amide group, a N-phenyl-4-aminobenzene sulfone amide group, a N-(4-acetylphenyl)-4-aminobenzene sulfone amide group, and an ethyl acetyl acetate group;

wherein $R^1$ to $R^3$ each independently represent a hydrogen atom, an aliphatic group, an alicyclic group, an aromatic group or a heterocyclic group, and wherein A and B each independently represent an aliphatic connecting group, an alicyclic connecting group, an aromatic connecting group, or a heterocyclic connecting group;

performing a crosslinking treatment by applying at least one of light or heat to the relief forming layer of the relief printing plate precursor; and laser engraving the relief forming layer subjected to the crosslinking to form a relief layer.

5. The relief printing plate of claim 4, wherein the thickness of the relief layer is in the range of 0.05 mm to 10 mm.

6. The relief printing plate of claim 4, wherein the Shore A hardness of the relief layer is in the range of 50° to 90°.

7. The resin composition for laser engraving of claim 1, wherein the polymerizable compound has at least one ethylenic unsaturated double bond.

8. The resin composition for laser engraving of claim 1, wherein the polymerizable compound has a bi- or higher functional structure.

9. The resin composition for laser engraving of claim 1, wherein the radical polymerization initiator is an organic peroxide.

10. The resin composition for laser engraving of claim 1, wherein the binder polymer comprises a structure unit represented by Formula (I).

11. The resin composition for laser engraving of claim 2, wherein the one or more selected from the group consisting of a compound represented by Formula (II-1) and a compound represented by Formula (II-1) comprises a compound represented by Formula (II-1).

12. The resin composition for laser engraving of claim 1, wherein the binder polymer comprises a structure unit represented by Formula (I), and each of A and B represents an alicyclic connecting group.

13. The resin composition for laser engraving of claim 1, wherein the binder polymer comprises a structure unit represented by Formula (I), each of Q represents —C(=O)O—, each of $R^1$, $R^2$ and $R^3$ represents a hydrogen atom, and each of A and B represents an alicyclic connecting group.

14. A method for manufacturing a relief printing plate, the method comprising:

providing a relief printing plate precursor for laser engraving, comprising a relief forming layer, the relief forming layer comprising a resin composition comprising a polymerizable compound, a radical polymerization initiator, and a binder polymer, the binder polymer comprising a main chain that comprises at least one of a structure unit represented by the following Formula (I) or a structure unit represented by the following Formula (II):

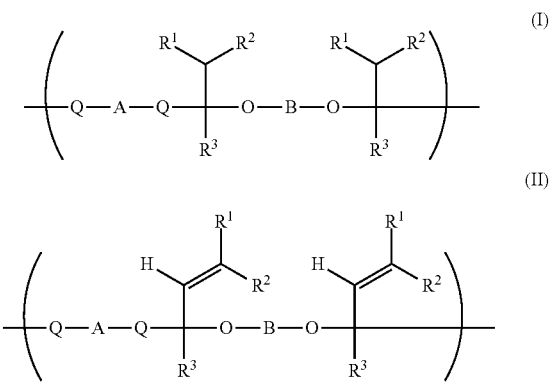

wherein Q represents a partial structure which provides an acid group when it is in the form of -Q-H, the acid group being selected from the group consisting of a sulfonic acid group, a phosphoric acid group, a carboxylic acid group, a phenol group, a 2-methoxyphenol group, a 2-chlorophenol group, a 2-methylhydroxy benzoate group, a 4-methylphenol group, a 1,3-benzenediol group, a 1-naphthol group, a 1,2-benzenediol group, a benzene sulfone amide group, a N-acetylphenylbenzene sulfone amide group, a 4-aminobenzene sulfone amide group, a N-phenyl-4-aminobenzene sulfone amide group, a N-(4-acetylphenyl)-4-aminobenzene sulfone amide group, and an ethyl acetyl acetate group;

wherein $R^1$ to $R^3$ each independently represent a hydrogen atom, an aliphatic group, an alicyclic group, an aromatic group or a heterocyclic group, and wherein A and B each independently represent an aliphatic connecting group, an alicyclic connecting group, an aromatic connecting group, or a heterocyclic connecting group;

crosslinking at least a part of components of the relief forming layer of the relief printing plate precursor by at least one of light or heat; and laser engraving the relief forming layer subjected to the crosslinking to form a relief layer.

15. The method for manufacturing a relief printing plate of claim 14, wherein the crosslinking comprises application of heat to the relief forming layer.

16. A method of forming an image by laser engraving the resin composition for laser engraving of claim 1.

* * * * *